(12) United States Patent
Srinivasan

(10) Patent No.: US 7,210,145 B2
(45) Date of Patent: Apr. 24, 2007

(54) TECHNOLOGY FOR INTEGRATED COMPUTATION AND COMMUNICATION; TICC

(75) Inventor: Chitoor V. Srinivasan, Port Saint Lucie, FL (US)

(73) Assignee: EDSS, Inc., Port St. Lucie, FL (US)

( * ) Notice: Subject to any disclaimer, the term of this patent is extended or adjusted under 35 U.S.C. 154(b) by 875 days.

(21) Appl. No.: 10/265,575

(22) Filed: Oct. 7, 2002

(65) Prior Publication Data

US 2004/0044794 A1    Mar. 4, 2004

Related U.S. Application Data

(60) Provisional application No. 60/329,454, filed on Oct. 15, 2001.

(51) Int. Cl.
| | |
|---|---|
| G06F 15/16 | (2006.01) |
| G06F 9/46 | (2006.01) |
| G06F 9/54 | (2006.01) |
| G06F 9/45 | (2006.01) |
| G06F 9/48 | (2006.01) |

(52) U.S. Cl. ............. 718/100; 717/140; 717/107; 717/168; 709/202; 709/234; 709/203; 709/239; 709/244; 719/317; 719/314; 719/313

(58) Field of Classification Search ........ 717/100–178; 719/310–332
See application file for complete search history.

(56) References Cited

U.S. PATENT DOCUMENTS

| 5,297,285 | A | * | 3/1994 | Abrahamsson et al. | 719/331 |
|---|---|---|---|---|---|
| 5,339,430 | A | * | 8/1994 | Lundin et al. | 719/332 |
| 5,386,568 | A | * | 1/1995 | Wold et al. | 717/162 |
| 5,410,703 | A | * | 4/1995 | Nilsson et al. | 717/168 |
| 5,488,723 | A | * | 1/1996 | Baradel et al. | 719/315 |
| 5,551,035 | A | * | 8/1996 | Arnold et al. | 719/315 |
| 5,640,546 | A | | 6/1997 | Gopinath et al. | 713/400 |
| 6,389,483 | B1 | * | 5/2002 | Larsson | 719/313 |
| 6,751,787 | B1 | * | 6/2004 | Blaszczak et al. | 717/105 |
| 6,789,257 | B1 | * | 9/2004 | MacPhail | 719/316 |
| 6,807,583 | B2 | * | 10/2004 | Hrischuk et al. | 719/318 |
| 6,912,718 | B1 | * | 6/2005 | Chang et al. | 719/318 |
| 7,003,777 | B2 | * | 2/2006 | Hines | 719/316 |

OTHER PUBLICATIONS

Birman, Kenneth et al. "Lightweight Causal and Atomic Group Multicast." ACM Transactions. Aug. 1991.*

(Continued)

*Primary Examiner*—Lewis A. Bullock, Jr.

(57) ABSTRACT

TICC manages asynchronous communications among groups of concurrent (parallel) processes (Objects) in multiprocessors. It dedicates one processor to function as Communications Processor, C. TICC defines a Causal Communication programming Language, called CCL, whose statements may appear intermixed with statements of any conventional programming language. TICC defines methods for compiling CCL statements in these mixed language programs into sequences of protocols which are executed by C, in parallel with on going computations guaranteeing (1) group-to-group loss less, buffer less, self-synchronizing asynchronous data transfers; (2) more than a hundred fold reduction in communication latencies; (3) Dynamic Flexibility to monitor, repair, reconfigure and update software objects without service interruption; and (4) protection and security of all data, distributed to or collected from communicating objects, based on an Agreement Protocol.

6 Claims, 15 Drawing Sheets

TICC PATHWAY BETWEEN GROUPINGS G1 AND G2.

OTHER PUBLICATIONS

Das, Souripriya. "RESTCLK: A communication Paradigm for Observation and Control of Object Interactions." PH.D Dissertation, Department of Computer Science, Rutgers University. Jan. 1999. DCS-TR-450.* von Eicken, T. et al. "Active Messages: A Mechanism for Integrated Communication and Computation." May 1992.*

Steele, Guy L. "Common LISP", The Language, Second Edition. Chapters 1-7, 15 and 20. Butterworth-Heinemann. 1990.*

Wilensky, Robert. "LISPcraft". W.W. Norton & Company. Chapters 1-4, 7-9 and 19. 1984.*

* cited by examiner

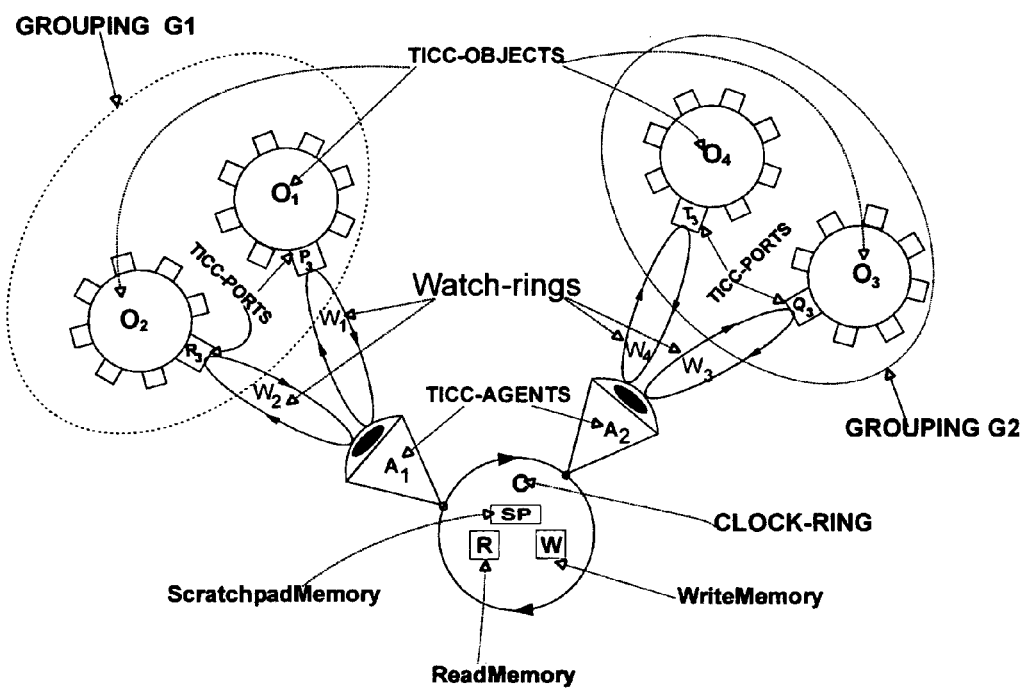
FIGURE 1: TICC PATHWAY BETWEEN GROUPINGS G1 AND G2.

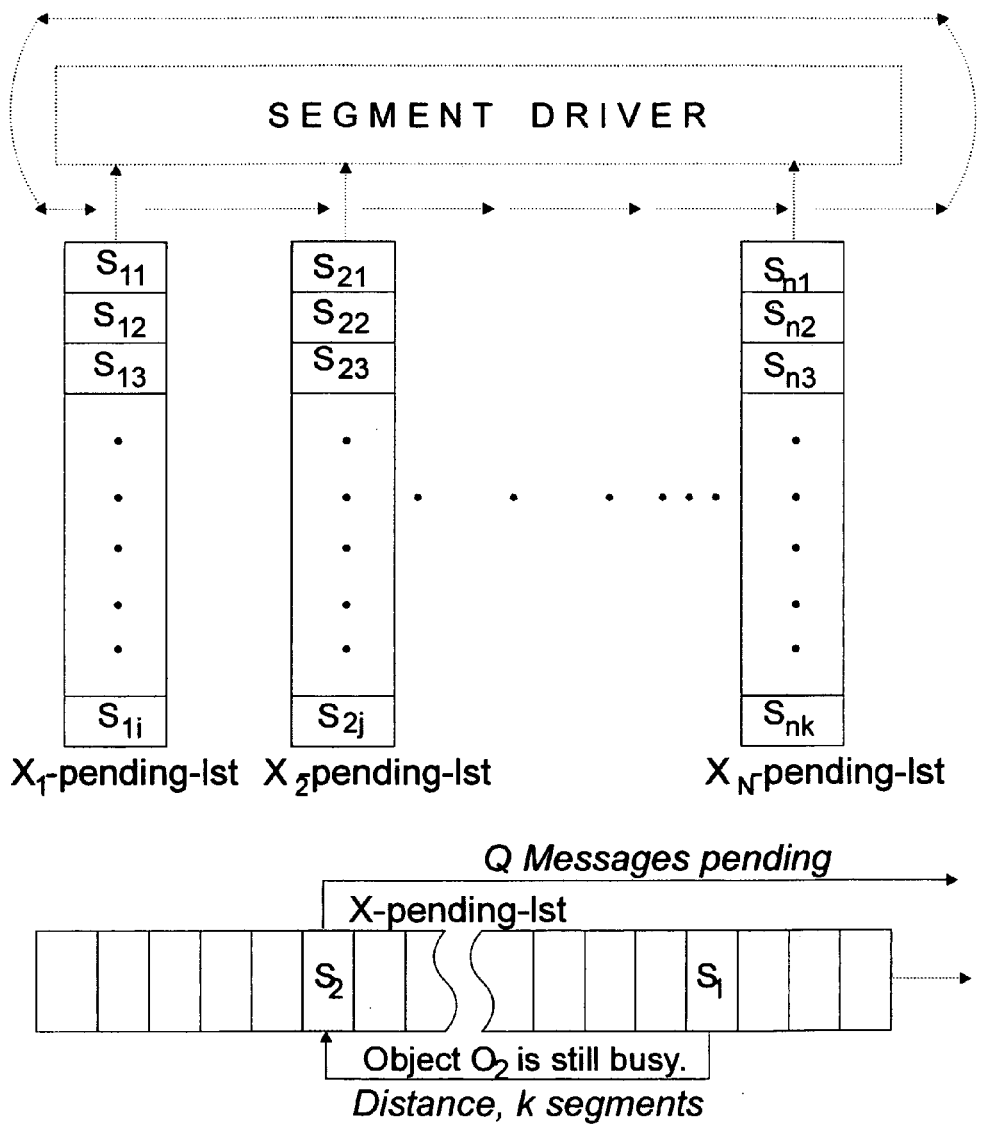
FIGURE 2: ORGANIZATION OF PENDING LISTS.

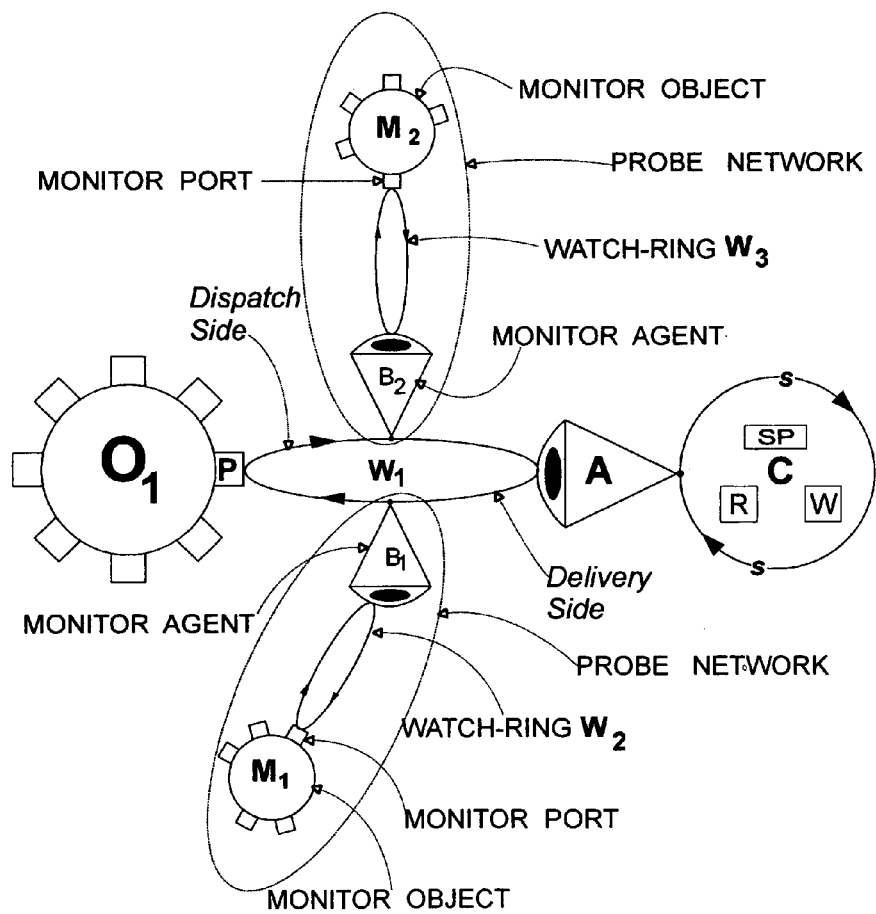
FIGURE 3: ILLUSTRATING ATTACHMENT OF OBSERVER AGENTS TO WATCH-RING

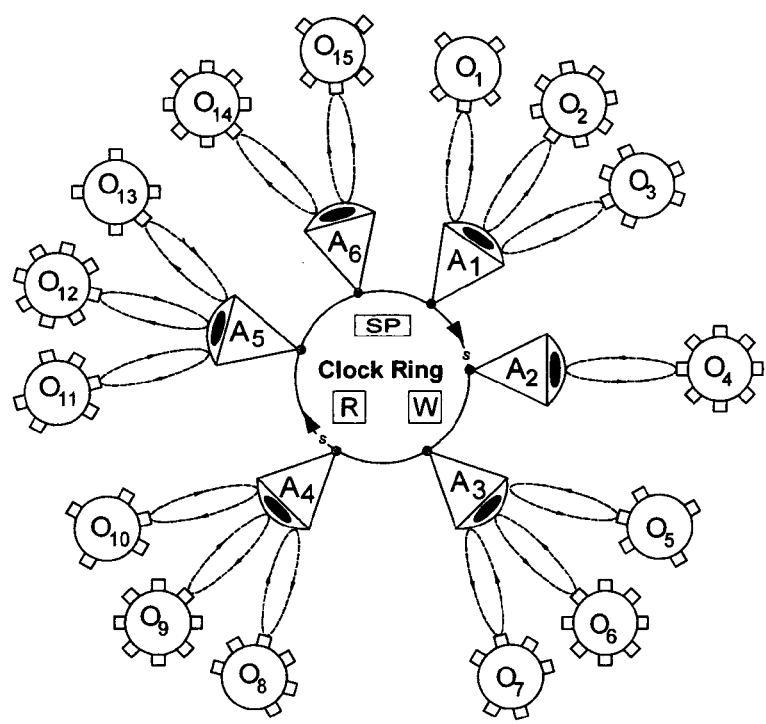
FIGURE 4:: MODEL OF SEQUENTIAL COMPUTATION DRIVEN BY A CLOCK-RING

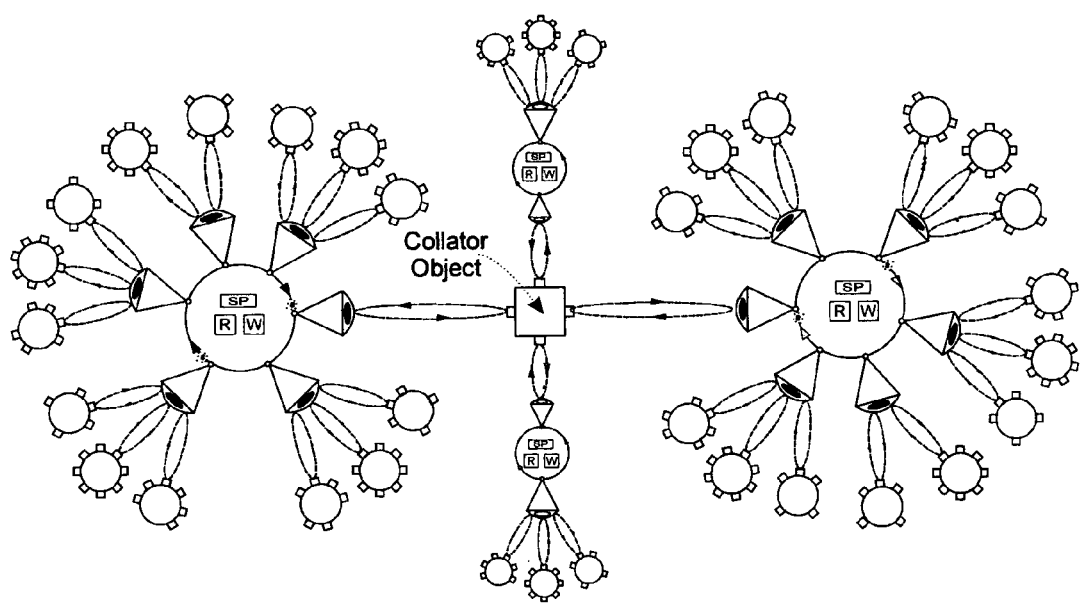
FIGURE 5: MODEL OF PARALLEL COMPUTATIONS USING COLLATOR OBJECT TO COLLECT AND DISTRIBUTE DATA.

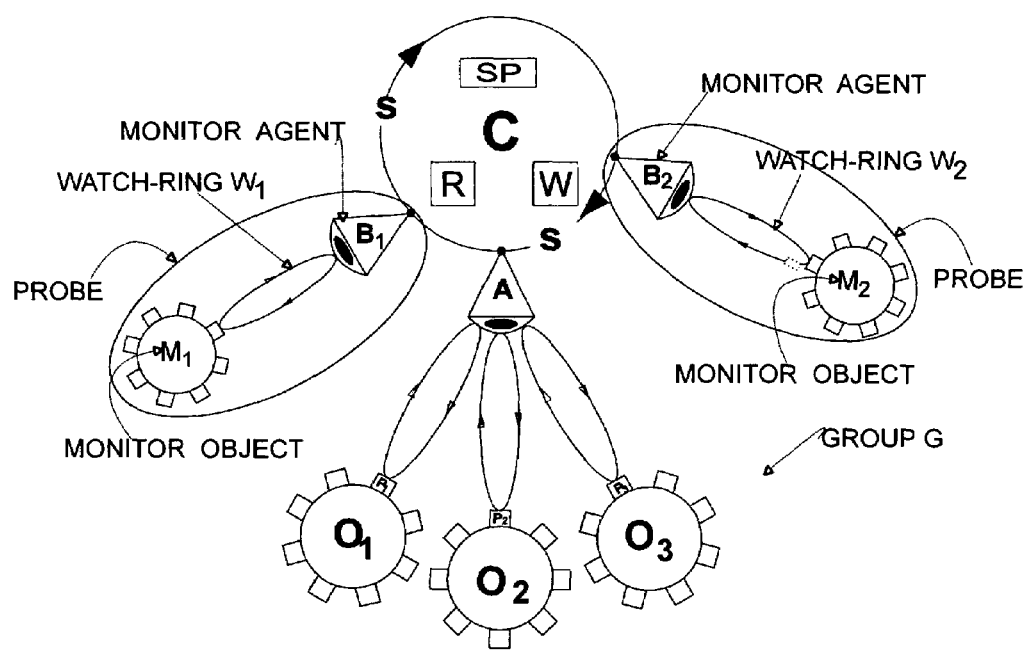
FIGURE 6: ATTACHING MONITOR AGENTS TO CLOCK-RING

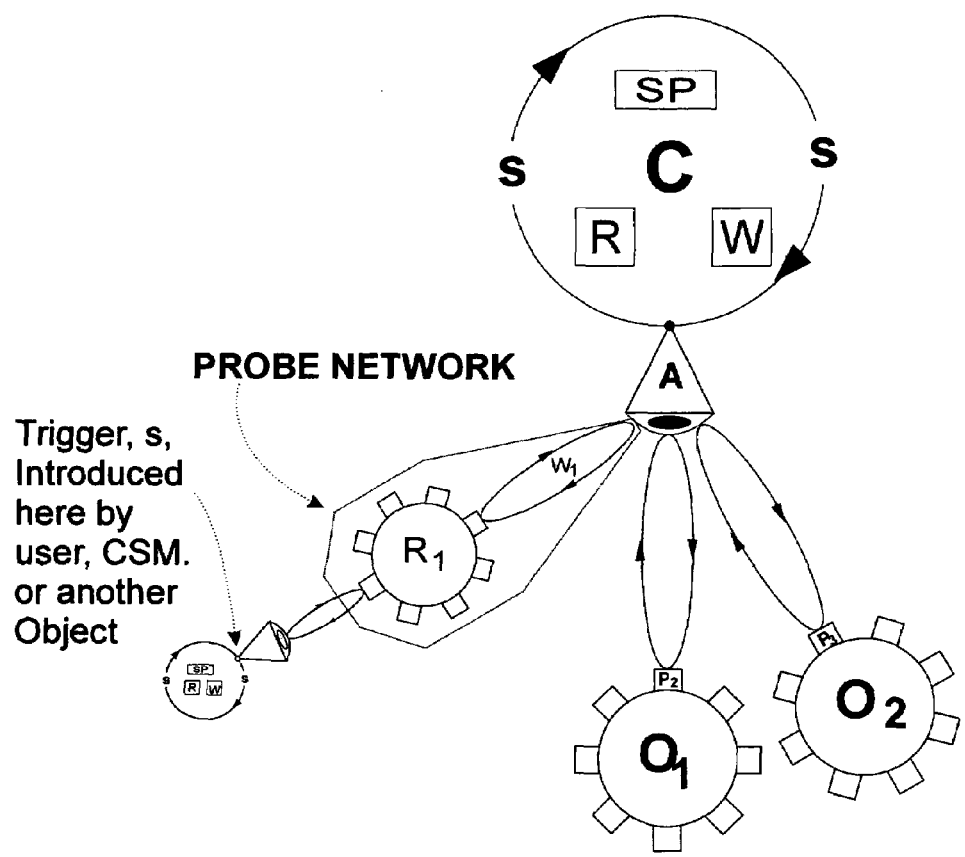
FIGURE 7: ATTACHING PROBE NETWORK TO SUSPEND COMPUTATIONS

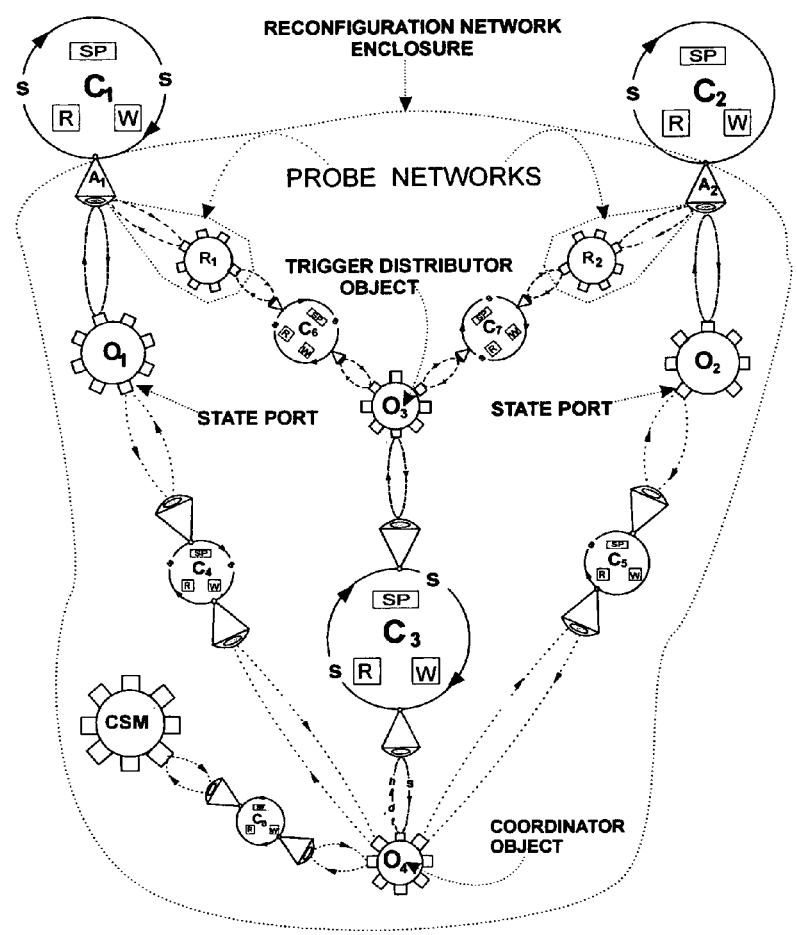
FIGURE 8: ILLUSTRATING T ICC-NETWORK NEEDED FOR DYNAMIC RECONFIGURATION

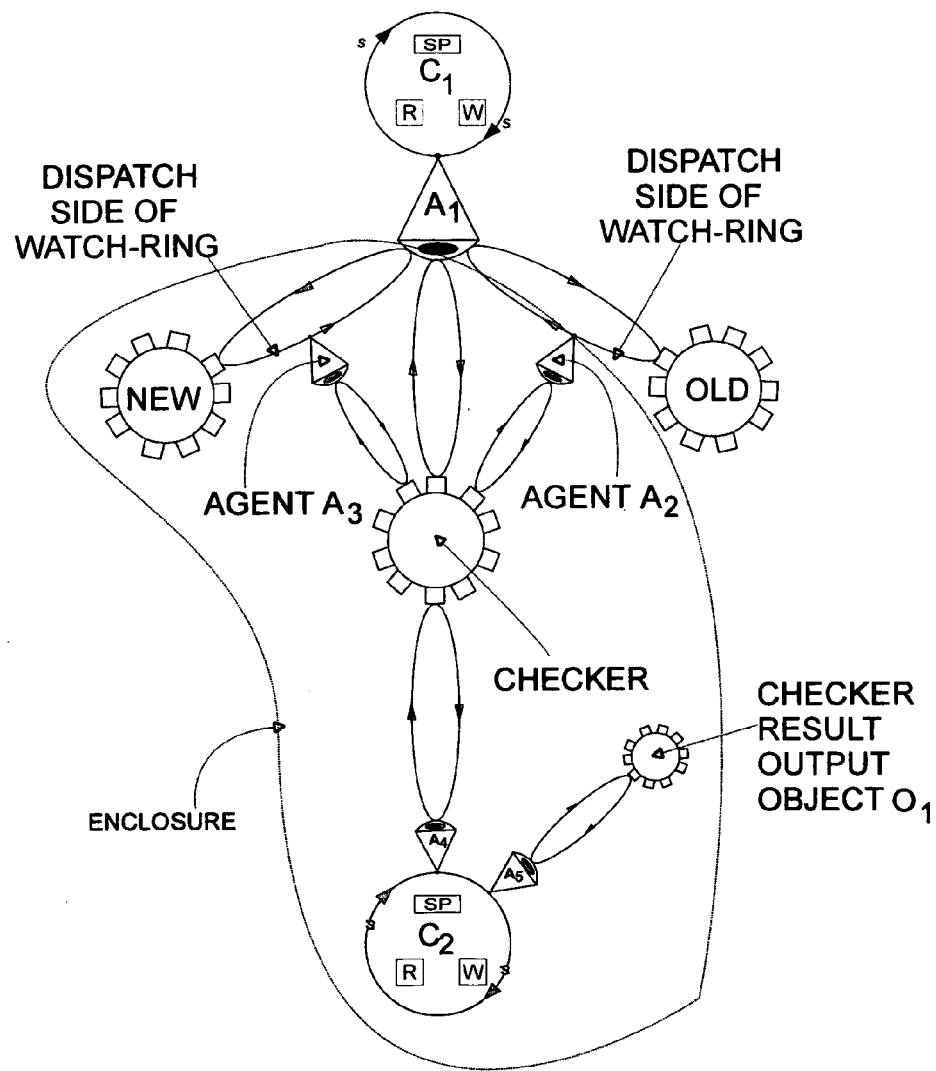
FIGURE 9: TICC PATHWAYS FOR DYNAMIC EVOLUTION

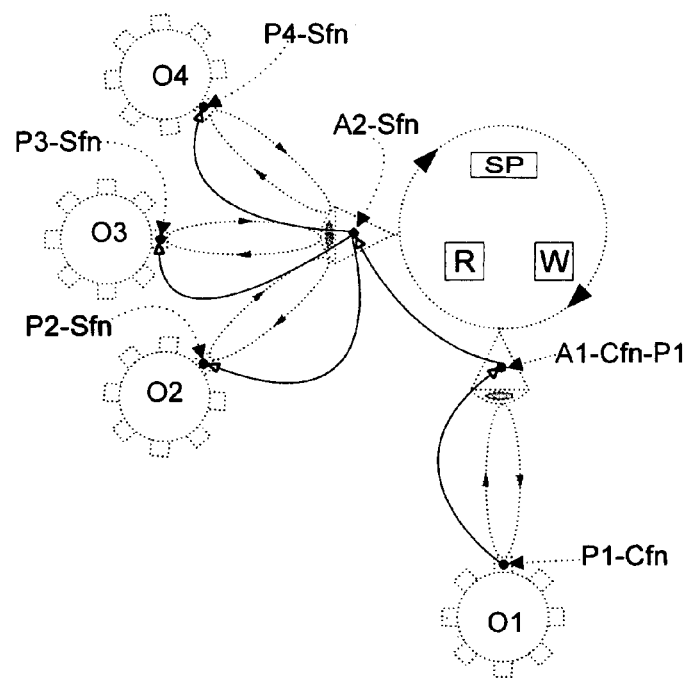
SEGMENT: (P1-Cfn  A1-Cfn-P1  Wait-Fn(A2)  A2-Sfn  P2-Sfn  P3-Sfn  P4-Sfn)
FIGURE 10: PROTOCOL SEGMENT FROM SENDING PORT TO
RECEIVING PORTS via CLOCK-RING

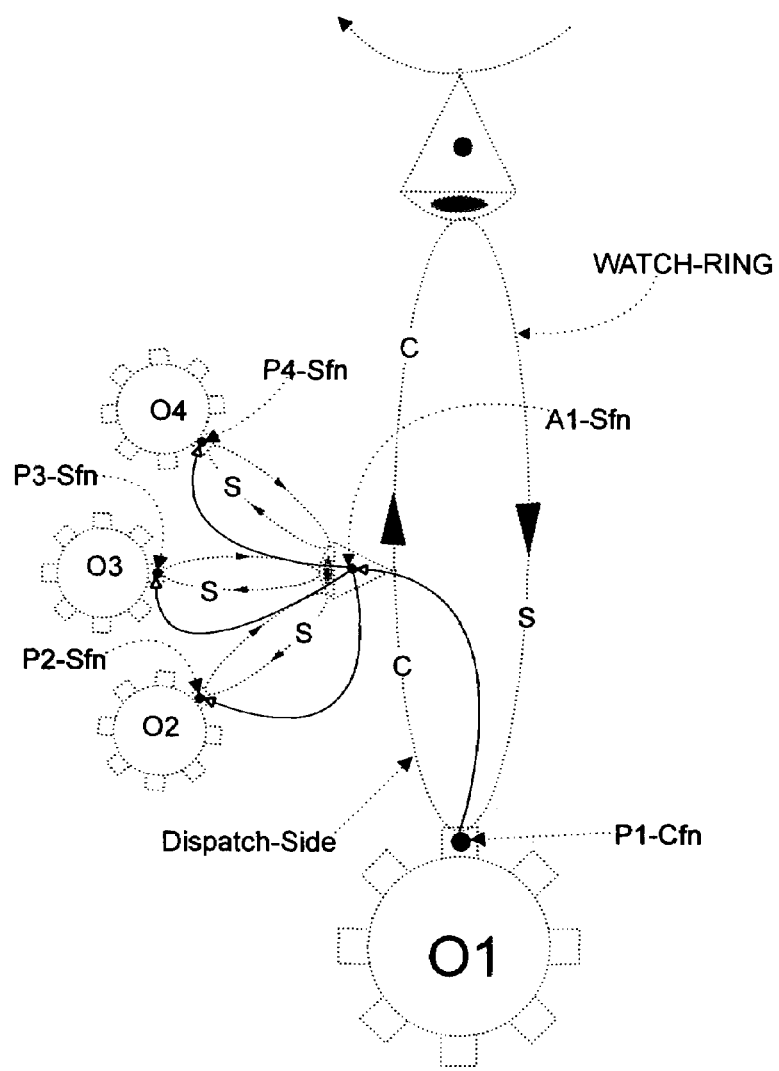
SEGMENT: (P1-Cfn  Wait-Fn(A1)  A1-Sfn  P2-Sfn  P3-Sfn  P4-Sfn)
FIGURE 11: PROTOCOL SEGMENT FROM PORT TO DISPATCH-SIDE MONITOR

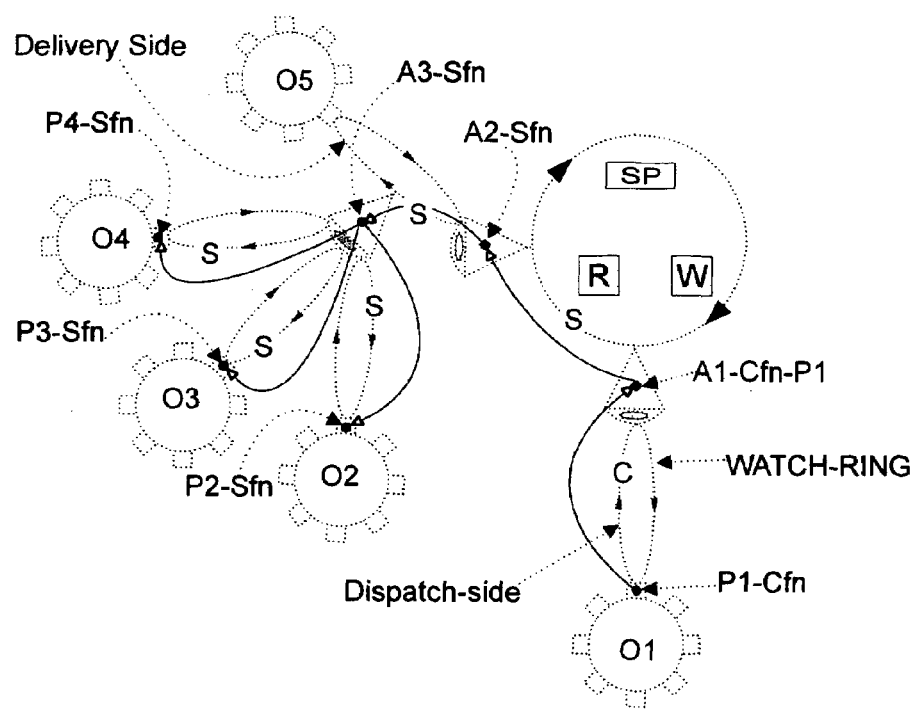
SEGMENT: (P1-Cfn A1-Cfn-P1 Wait-Fn(A2) A2-Sfn
Wait-Fn(A3) A3-Sfn P2-Sfn P3-Sfn P4-Sfn)
FIGURE 12: PROTOCOL SEGMENT FROM PORT TO
DELIVERY SIDE MONITOR

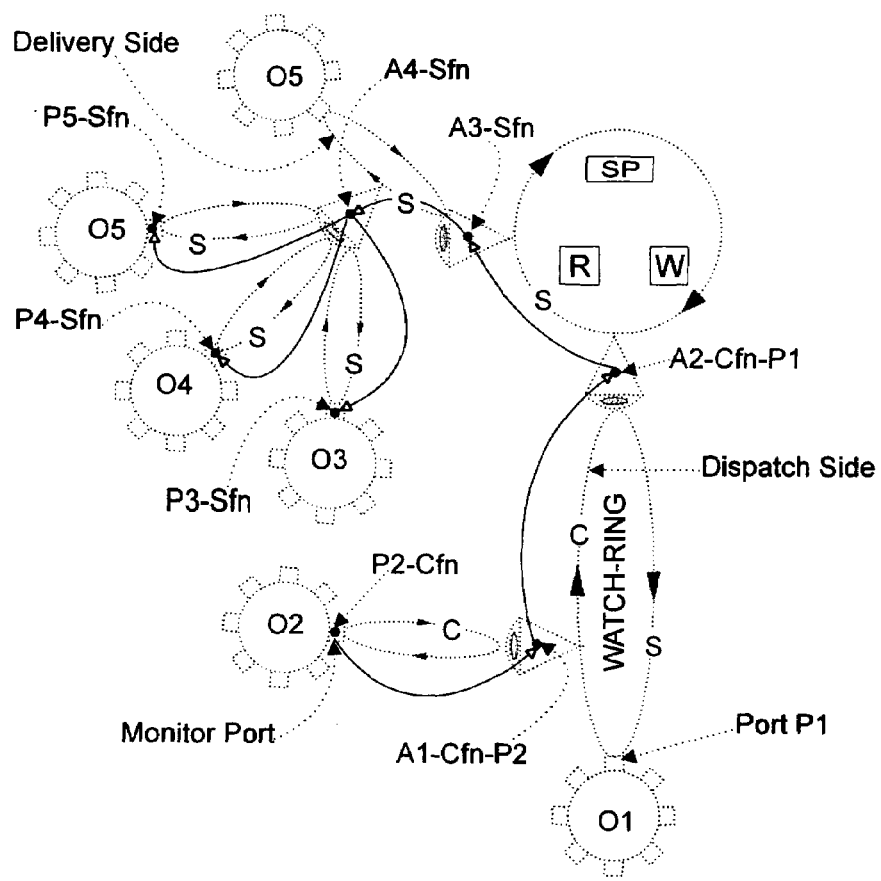
SEGMENT: (P2-Cfn A1-Cfn-P2 A2-Cfn-P1 Wait-Fn(A3) A3-Sfn
Wait-Fn(A4) A4-Sfn P3-Sfn P4-Sfn P5-Sfn)
FIGURE 13: PROTOCOL SEGMENT FROM DISPATCH SIDE MONITOR PORT TO DELIVERY SIDE MONITOR PORTS

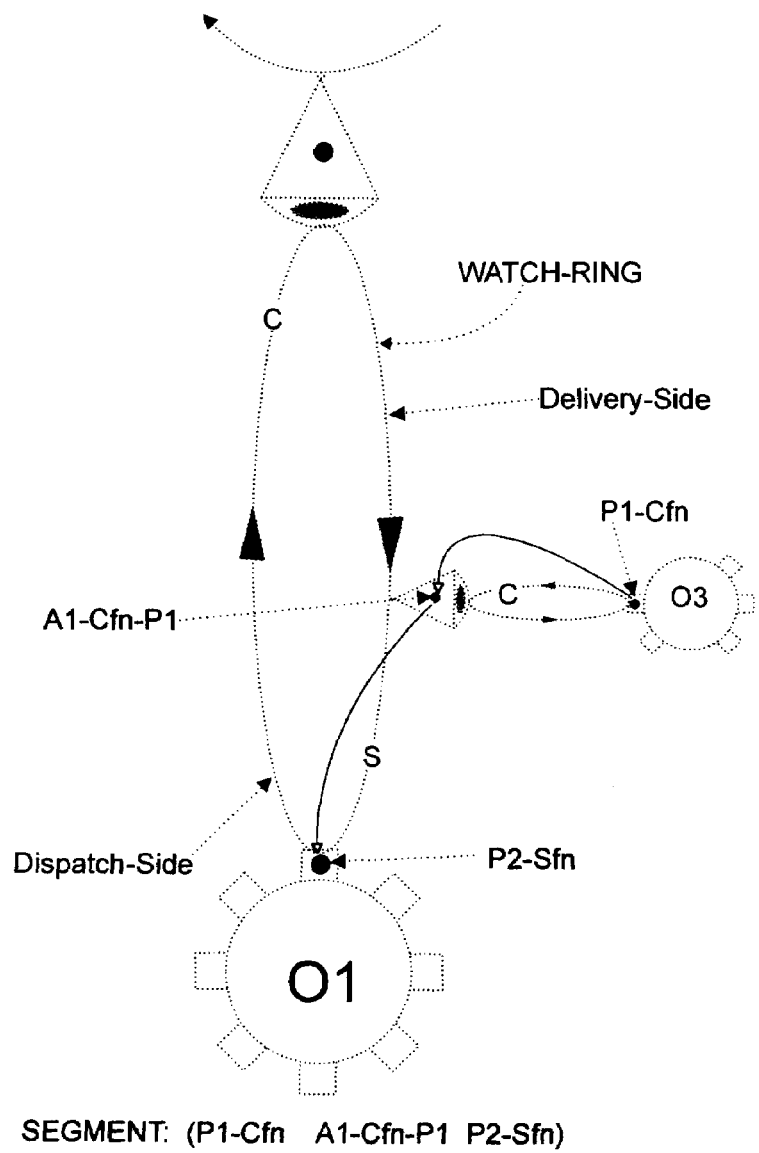
SEGMENT: (P1-Cfn A1-Cfn-P1 P2-Sfn)
FIGURE 14: PROTOCOL SEGMENT FROM DELIVERY SIDE
MONITOR PORT TO OBJECT PORT

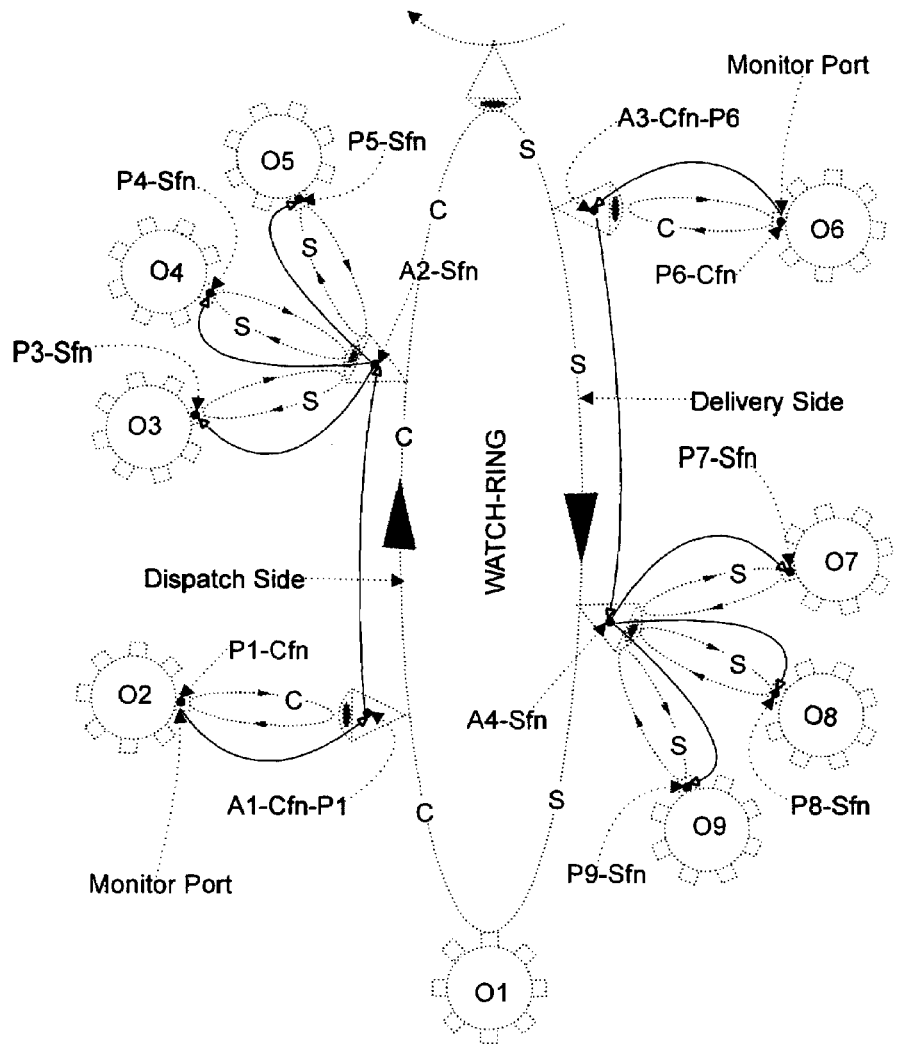
SEGMENT1: (P1-Cfn A1-Cfn-P1 Wait-Fn(A2) A2-Sfn P3-Sfn P4-Sfn P5-Sfn)
SEGMENT2: (P6-Cfn A4-Cfn-P6 Wait-Fn(A4) A4-Sfn P7-Sfn P8-Sfn P9-sfn)
FIGURE 15: PROTOCOL SEGMENTS FROM MONITOR PORT
TO MONITOR PORTS

TECHNOLOGY FOR INTEGRATED COMPUTATION AND COMMUNICATION; TICC

CROSS REFERENCE TO RELATED APPLICATIONS

This is the non-provisional of the provisional application, entitled
"Technology for buffer less self-synchronizing peer-to-peer message passing in distributed computing systems",
Application No. 60/329,454 filed on Oct. 15, 2001;
Confirmation Number 3551, Dated Nov. 02, 2001.
Foreign Filing License Granted, Nov. 1, 2001, under Title 35, United States Code, Section 184; & Title 37, Code of Federal Regulations 5.11 & 5.15.

STATEMENT REGARDING FEDERALLY SPONSORED RESEARCH

The work that led to this patent application was not supported by any federally sponsored research. The inventor himself supported this work and inventor enjoys all rights to ownership and use of the patent claimed in this application.

FIELD OF THE INVENTION

These inventions relates generally to asynchronous communications in software systems and, more specifically to asynchronous communications in massively parallel software systems. It relates to a methodology for specifying, compiling and executing communication protocols in parallel with computations in multiprocessor systems, guaranteeing buffer less, loss less, low latency, self-synchronizing asynchronous data exchange among groups of software objects, with extremely low latencies.

COPYRIGHT NOTICE

Some of the figures in this patent disclosure are subject to copyright protection. The copyright owner has no objection to facsimile reproduction of any of the figures, as it appears in the Patent and Trademark Office patent file or records, but otherwise reserves all copyright rights whatsoever.

BACKGROUND OF THE INVENTION

This work pertains to asynchronous communications among parallel/concurrent processes running in multiprocessing systems. The invention looks ahead to the fast approaching era, when 3 to 5 gigahertz CPUs and gigabyte bandwidth communications would be commonplace, and cost of CPUs would have dramatically decreased. Multiprocessors with 100 to 1000 CPUs might become feasible. A great impediment to their effective use under current technologies would be the cost of communication latencies. In current technology there are two paradigms for communication among parallel or concurrent processes with in a multiprocessor (whether distributed or shared memory):
  (i). By conducting synchronization sessions between sending and receiving processes, and using input buffers to hold data/messages until recipients can attend to them. This is very time consuming and can also put a significant drain on available memory and processing resources. This can take as much as 5,000 to 10,000 CPU cycles for point-to-point asynchronous message exchange between two communicating parallel processes.
  (ii). Through programmed periodic punctuated synchronous message exchange sessions, in which all the parallel processes are halted in a mutually consistent state, and each process is programmed to exchange data/messages with other processes in a synchronized a prior planned manner, thus eliminating the need for asynchronous communications. This can, however, result in inefficient utilization of available parallel processing resources. Yet, this gives better efficiencies than method (i) above.

TICC introduces a radically new paradigm; it is a paradigm of asynchronous communications in parallel with computations. TICC defines a Causal Communication programming Language, CCL, which can be freely intermixed with any computation specification language. CCL may be used to specify communications among groups of parallel/concurrent processes. TICC specifies a method for compiling statements in CCL to sequences of protocols, which are executed by a dedicated communications processor, C, in parallel with computations, guaranteeing loss less, self-synchronizing buffer free data exchange among groups of parallel processes via already established TICC pathways.

In addition, TICC provides unprecedented capabilities to dynamically monitor, debug and update parallel programs. There are several other advantages to using TICC. They are explained in this patent disclosure.

TICC was inspired by the communication paradigm, called RESTCLK [Das 1999] that was first introduced by my student Dr. Souripriya Das in 1999, while both of us were in the Computer Science Department of Rutgers, The State University of New Jersey, New Brunswick, N.J. As a doctoral student Dr. S. Das started his research with Prof. B. Gopinath and Prof. Chitoor V. Srinivasan as his doctoral thesis advisers. Prof. B. Gopinath was then professor of Computer Engineering in the Department of Electrical and Computer Engineering at Rutgers. The system concepts of RESTCLK and techniques for their implementation were developed under the guidance of Dr. B. Gopinath When Prof. Gopinath left Rutgers University, sometime in 1996, Dr. S. Das continued his work with Prof. Chitoor V. Srinivasan to complete his doctoral dissertation requirements. During this time Prof. Srinivasan and Dr. Das jointly developed the theoretical framework for RESTCLK, which established the structure and properties of RESTCLK. A proof of concept implementation of RESTCLK was successfully developed and demonstrated by Dr. Das in the summer of 1998. Professor Srinivasan retired from Rutgers University in January 1999.

RESTCLK, as it was defined, could not be efficiently implemented and it did not guarantee loss less message delivery. This made it Impossible to deploy RESTCLK for use in applications. Indeed, Prof. Gopinath abandoned his efforts to patent the ideas in RESTCLK (please see reference in U.S. Pat. No. 5,640,546, to application Ser. No. 08/021,096, filed on Feb. 23, 1993, and abandoned). RESTCLK remained essentially a research tool. The modified communication paradigm, TICC, which executes communication protocols in parallel with computations, overcomes this limitation of RESTCLK. TICC guarantees loss less, buffer less, self-synchronizing asynchronous message delivery with extremely low latencies. TICC now makes it possible to fully exploit on a commercial scale, the dynamic flexibility feature (ability to dynamically monitor, diagnose, repair, reconfigure and update parallel software systems without service interruption), which RESTCLK attempted to bring to object centered application systems.

SUMMARY

1 Introduction

If 'Network is the Computer' then Communication is at the heart of computation. Unless the two are seamlessly integrated the full potential of Network as the Computer will never be realized. TICC provides a way of seamlessly integrating the two.

The dichotomy between computation and communication in our current software technology is an artificial one. As explained later below, it does not exist in hardware systems. The history of development of our programming technology has been largely responsible for it. Communication has always been outside the scope of programs: Input/Output is done by hardware. It is not a part of even our theoretical models of sequential programming. Assignments, If/Then Statements, While Statements and conventions for program control are the sole constituents of our theoretical models of sequential programs. (See "*Discrete Mathematics and its Applications*", by Kenneth H. Rosen, Third Edition, McGraw Hill Inc. 1995, pp 217–223 and pp 694–701.) Communication and coordination are not a part of them. Turing Machine provides a model of sequential computations. There is no similar model for parallel computations. Multi-tape Parallel Turing Machine does not model interprocess communications. It assumes a totally synchronous single multi-tape machine and thus avoids problems of asynchronous communication. There has been no integrated conceptualization of communication and computation as a unified entity. This has largely stymied our progress in realizing our dream of Network as the Computer.

The reasons are quite simple. A necessary requirement for communication to occur in a timely manner is that receivers and senders should hold a certain synchrony: Receivers should listen to senders at right times and should fully absorb messages. Among parallel processes that run in different processors, clearly such a synchrony does not naturally exist. Even among concurrent processes that run in the same processor such synchrony does not exist. In addition to this lack of synchrony among parallel and concurrent processes, there is lack of synchrony also between communication events and computational events. To bridge the gap caused by this lack of synchrony one uses protocols, synchronization sessions and buffers for asynchronous message passing, or programmed punctuated synchronous data exchange sessions in parallel computations. But, usually these are not viewed as being essential parts of computations. They are viewed as necessary evils. One has to suffer them in order to accomplish ones computational objectives. Sometimes they are even hidden from programmers.

2. Limitations of Current Technology

As of this writing, 3-Gigahertz CPUs and 10-Gigabits/sec networks are already here. Massive Concurrent (parallel) Computing faces serious problems in this new age of 3-gigahertz or more CPUs and 10-Gigabits/sec or more networks. The following three stand out as being most critical: Communication Bottleneck, Debugging Bottleneck and Memory Bottleneck. Communication bottleneck is caused by high latency in both local (within a multiprocessor) and remote (between multiprocessors) asynchronous communications. Whereas advances in technology will surely contribute to latency reduction in remote asynchronous communications, latency In local communications between concurrent (parallel) processes will continue to remain high.

This is because, the primary reason for latency in local asynchronous communications is lack of synchrony between communication and computation events referred to earlier. To overcome problems caused by this lack of synchrony one has to continue to use synchronization sessions and buffers. These add to latency. Debugging bottleneck is caused by not having adequate tools to dynamically debug parallel processes. This will continue to be a formidable, time-consuming problem. Memory bottleneck is caused by limitations in available memory bandwidth. Data cannot be fetched from memory at rates adequate to feed the needs of all active parallel processes. Advances in technology that increase available memory bandwidth cannot by themselves solve this problem.

TICC provides clear solutions to the first two of above three problems and has the potential to solve also the third problem. TICC manages asynchronous local (shared memory) communications between parallel and/or concurrent processes within a multiprocessor. Nature of innovation in TICC and its benefits are introduced next section.

3. Nature of Innovation in TICC.

3.1. Hardware Analogy

Nature of innovation in TICC is best explained through the following analogy with hardware systems. Consider a synchronous clock driven logic circuit. Gates in the circuit will listen to their inputs when clock signal is high and perform their computations when clock signal is low. New inputs will appear at a gate only after it has completed its computations on its current inputs. In this way clock pulses enforce synchrony between computational events and communication events in synchronous circuits. It is almost axiomatic to characterize asynchronous communication as one that necessarily requires buffers or input queues. This, however, is not the case in asynchronous hardware circuits. In asynchronous circuits, one can replace clock pulses with suitable self-synchronizing two-way control pulses and make the gates listen to their Input signals at right times and send completion signals back. Here also new input signals will appear at a gate only after it has completed computations on its current inputs. In both cases, clock pulses from a master clock or self-synchronizing two-way control pulses, will permeate through every logical unit in a hardware system enforcing synchrony between computational and communication events. A structural isomorphism will hold between synchronizing pulse distribution networks and interconnection networks of logical units In hardware systems. This will eliminate the need for buffers and synchronization sessions for correct message (data) dispatch and delivery. Communications and computations will flow together as a single integrated self-synchronized organic process. Thus the dichotomy between communication and computation, mentioned earlier, does not exist in hardware systems.

The invention in TICC is that it employs self-synchronizing software message pathways (called TICC-pathways), which function like self-synchronizing signal lines in hardware systems and like back-panel data buses in supercomputer systems. These pathways are used to asynchronously exchange data among groups of parallel/concurrent processes. Just as asynchronous signal lines enforce synchrony between communication and computational events in hardware systems, self-synchronizing message pathways also enforce synchrony between computation and communication events, at the level of Objects. New inputs will appear at input ports of software objects only after they have completed their computations on their current inputs. These characteristics of TICC will eliminate the need for buffers (input queues) and synchronization sessions.

Just as asynchronous signal lines in a hardware systems hold a structural isomorphism between control signal distribution networks and logical unit interconnection networks, the collection of TICC-pathways in a parallel application systems will hold a structural isomorphism between TICC-pathway control signal distribution networks and sequential and parallel computational networks at objects level.

3.2 Properties of TICC

TICC shares the following properties with its hardware analog, the back-panel bus:

Connection Oriented: Only groups of objects with specially established TICC-pathway connections between them might exchange messages.

Self-Synchronizing: Receivers need not be informed a priori and prepared in order to listen to and fully absorb asynchronous messages sent to them. No synchronization sessions are necessary (true for RESTCLK).

Guaranteed Buffer-free One Time Message Delivery: No message will be lost (not true for RESTCLK).

Reduced Communication Costs: Dramatically reduces communications latency almost a hundred fold (not true for RESTCLK).

Prevents Message Interference: No message recipient will receive two or more messages at the same time (true for RESTCLK).

In addition TICC does the following:

a Enforces Correct synchronization and coordination (not true for RESTCLK because it does not guarantee loss less message delivery) of computational and communication events throughout a distributed parallel computational system.

Provides Dynamic flexibility (true for RESTCLK but could not be exploited on a commercial scale) with practically unlimited capability to efficiently and dynamically monitor, diagnose, repair, reconfigure and update parallel computational systems without service interruption.

Integrates communication and computation (not true for RESTCLK) by defining a causal communications programming language, the TICC-language, which can be freely combined with any conventional programming language.

Defines methods for efficiently compiling CCL statements (not true for RESTCLK) specified in a unified computation and communication language into sequences of protocols which are executed in parallel with computations by a dedicated communications processor.

3.3 The most Important Features of TICC

The four most important features of TICC are the following:

1) Self-synchronizing: No synchronization sessions are necessary. Provides buffer free loss less message distribution, with dramatic reductions in communication latency (not true for RESTCLK), 2) Structural isomorphism: Control signal distribution network in TICC consisting of TICC-pathways will be structurally isomorphic to sequential/parallel computational structures of application systems (true for REST-CLK), and 3) Dynamic Flexibility: The word dynamic is used here in the following technical sense: Changes may be introduced in to application systems without service interruption and without loss of benefits gained from prior computations. This is a consequence of the above two properties (true for RESTCLK but could not be efficiently implemented).

4) Independence: (true for RESTCLK but could not be exploited effectively): TICC based application systems enjoy dynamic flexibility in a manner that is totally independent of code embedded in application objects. Thus facilities needed to diagnose and repair failures, reconfigure a system, or make updates may all be dynamically introduced in to an application system, at any time during its lifetime, whether they have been planned for in advance or not.

BRIEF DESCRIPTION OF DRAWINGS

FIG. 1: This introduces the various components of a TICC pathway and shows how the components are put together to form a pathway that enable two groups of objects to communicate with each other, as explained in Chapter 1 of Detailed Description.

FIG. 2: This figure shows the organization of pending lists associated with multiprocessors, $X_1, X_2, \ldots X_N$ and shows how segments $S_{ij}$ of protocol functions are executed by the segment driver, as explained in Chapter 1 of Detailed Description.

FIG. 3: This figure shows how monitor agents and monitor objects may be attached to delivery and dispatch sides of a watch-ring to monitor input and output data flowing into and out of an object port.

FIG. 4: Illustrates the TICC model of sequential computations.

FIG. 5: Illustrates the TICC model of parallel computations.

FIG. 6: Shows how monitor agents may be attached to a clock-ring to monitor data flowing into and flowing out of a group of objects.

FIG. 7: Illustrates how a probe network may be attached to an agent, in order to suspend computations being performed by objects $O_1$ and $O_2$ in the figure.

FIG. 8: Illustrates a typical TICC pathway structure suitable for dynamic reconfiguration of an application system.

FIG. 9: Illustrates the pathway structure that may be used to support dynamic evolution.

FIG. 10: Tracing a protocol segment from a sending port to receiving ports via agents on a clock-ring.

FIG. 11: Tracing a protocol segment from a port to a monitor port, via monitor agent on dispatch side of a watch-ring.

FIG. 12: Tracing a protocol segment from a port to monitor ports on delivery side of a watch-ring.

FIG. 13: Tracing a protocol segment from a dispatch-side monitor port to delivery-side monitor-ports.

FIG. 14: Tracing a protocol segment from a delivery-side monitor port to an object port.

FIG. 15: Tracing protocol segments from monitor port to monitor port on the same side of a watch-ring.

DETAILED DESCRIPTION

We begin the detailed description with a conceptual overview of TICC. Implementation details that produce a practical and efficient implementation of TICC, fully realizing all its potential benefits are introduced next in Chapter 2 through a design for implementation, stated in the LISP programming language.

Chapter 1: Conceptual Overview of TICC

1.1. Overview of TICC Organization

TICC assumes an object centered software environment. It assumes active objects, i.e., each object would contain its own threads. Groups of objects in an application system may communicate with each other in parallel. Communication in TICC is connection oriented: One group of objects may communicate with another group if and only if there are TICC-pathways connecting them. TICC specifies a causal communication language, CCL. It has two parts: Its first part contains command statements, which are part of an API (Application Programmer Interface) for TICC. These are used by application objects to dynamically create, deploy, and modify networks of TICC-pathways used by application systems. Details on syntax of API command statements are not important and are thus not specified here. What is important is to specify how TICC-pathway creation, deployment, and maintenance tasks can be implemented. This is shown in Chapter 2.

The second part consists of causal communication statements of the form $$X(x) \rightarrow Y; \qquad (1)$$

which may be read as "cause X to send signal x to Y," where X and Y may be application objects, or TICC ports and agents. If signal x is interpreted as a message transfer request, then on receiving signal x, Y will cause messages from X, kept in certain designated memories, to be delivered to their intended recipients. These causal statements have well-defined semantics in the context of message and signal transfer protocols used in TICC, which make it possible to compile statements of this form to code that is necessary to take messages from X and deliver them to their intended recipients. Application objects will use causal statements like this to initiate asynchronous message transfers.

In a multiprocessing system, consisting of (N+1) processors, $[C, X_1, X_2, \ldots, X_N]$, $N>=1$, C will be the dedicated TICC-communications processor and the rest will be used to execute code associated with application objects. Code generated from API statements in CCL (i.e. code pertaining to creation, deployment and modification of networks of TICC-pathways) will be executed by the same processors, $X_1$, that execute code associated with application objects. These API statements will belong to a TICC subsystem, called Communication System Manager (CSM). CSM is responsible for maintaining the TICC name space, establishing, and removing TICC-pathways and their components in a manner that is consistent with application security. Every processor $X_1$ will have one or more instances of CSM. Every application object O will have a CSM instance associated with it. O will send requests to its designated CSM to establish new TICC communication pathways or remove and modify existing pathways. A CSM instance may serve more than one application object. Thus, for an object, O, if X were the processor that executed its code, then X would also execute all CSM related tasks for that object.

Codes generated by TICC-compiler for the CCL causal statements in an application object, O, would also have two parts: The first part would be executed by the same processor, X that executes code in object O. This would pertain to (a) setting up protocol sequences, called segments (because they correspond to TICC-pathway segments), that are necessary to realize the requested message transfers, and (b) presenting the segments to the dedicated TICC-communications processor, C. The second part is the collection of segments generated by the first part. The communications processor C will execute this collection of protocol segments, in parallel with application programs and cause messages to be delivered asynchronously to their intended recipients. Such message delivery in TICC would be self-synchronizing, loss less and buffer free.

1.2. Deployment of TICC

TICC communication processor may be implemented in software or in hardware. If it is implemented in software then it may be made available to application programmers through an Application Compiling Interface (ACI). ACI will contain a TICC parser and compiler that compiles TICC-causal communication statements, and it will also contain an Application Programmer Interface (API). Source code for objects in applications may be written in any language, say language L, for which a compiler is available. Statements in language L will appear in source code intermixed with statements in CCL. Application programs containing statements in language L mixed with CCL would be sent through a preprocessor that separates out these two types of statements, sending TICC-language statements to the TICC-compiler and computation statements in language L to their own associated compiler. The CCL compiler will put in place code for CCL statements at right places, in sequence with object code generated for statements in programming language L.

TICC technology for integrated communications in parallel with computations in multi-processor systems is so totally new that, to the best of our knowledge, there is nothing in prior literature that comes close to it except for one. It is a patent by B. Gopinath. [B. Gopinath and David Kurshan, "Composition of Systems of Objects by introducing coordination, projection and distribution," U.S. Pat. No. 5,640,546, Filed Feb. 17, 1995]. This patent does not however use the concept of causal communication language and the concept of executing communication protocols in parallel with on going computations. A paper in published literature [von Eicken, et al 1992] introduces the concept of "Integrated communication and computation." Its focus is on communications over local area nets (LAN). It does not address issues of communication among parallel processes in multiprocessing systems through shared memory, nor does it propose execution of communication protocols in parallel with computations or define a causal communication language to integrate computation and communication.

1.3. Agents and Ports in TICC Pathways

TICC pathways are identical to RESTCLK pathways. However, the way components in TICC pathway function are different from the way components function in REST-CLK. Whereas RESTCLK uses three kinds of control signals, TICC uses four. The control signals exchange protocols used in TICC are different from the ones used in RESTCLK. RESTCLK executed its signal exchange protocols non-deterministically in series with application processes using interrupt control. TICC executes its signal exchange protocols deterministically in parallel with application processes. These differences make it possible for TICC to provide guaranteed loss less, low latency data transfers among concurrent/parallel processes, none of which RESTCLK was able to do.

Each software object in a TICC based application system will contain TICC ports. Objects may send and receive messages only by using their ports. An object may have any number of ports. Application objects may not communicate with each other by setting global variables. All TICC-pathways will begin and end in ports and will contain TICC agents. A port and an agent are said to be tuned to each other (listening to each other) when they share certain control signal variables. An agent may be simultaneously tuned to several ports belonging to distinct objects. Each port will be tuned to one unique agent. No agent may be tuned to two ports of the same object. Always, the agent tuned to a port will be responsible to deliver messages to the port and dispatch messages out of the port via already established TICC pathways.

Ports and agents in TICC are very simple sequential machines. A tuned (ports, agent) pair will exchange control signals between them through shared control variables. These control signal exchanges will always happen in synchronous mode, i.e., every time a port or agent receives a control signal, it will be waiting for it and take appropriate action, in parallel with computations, as soon as it senses the signal. In every state, each port and agent would expect to receive only certain a priori specified control signals and wait for them. Every port and agent would always receive only the control signals it was waiting for. Exchange of control signals between tuned ports and agents will establish the context for data transfers to occur between objects connected by TICC-pathways. Always only control signals will travel over TICC-pathways.

Data transfers will occur through shared memory in all local communications (i.e., between objects in the same multiprocessor). In the efficient software implementation proposed here, once a port or agent is activated, a control signal exchange will take about 10 to 15 CPU cycles (about 5 nanoseconds in a 3-gigahertz machine). TICC-pathways will consume very little resources. They may be dynamically installed and removed within about 150 to 450 CPU cycles (50 to 150 nanoseconds in a 3-gigahertz machine). Once a pathway is established it would stay unless explicitly removed. In more than 75% of cases, needed pathways would already exist.

1.4. Group-to-Group Data Exchange in TICC 1.4.1. TICC Pathway Components and Structure Basic mode of asynchronous data exchange in TICC is from one group of software objects, say grouping G1, to another grouping G2. To coordinate group-to-group (GTG) communications and transaction, one agent will be tuned to ports belonging to distinct objects in grouping G1 at the rate of one port per object and another will be tuned to ports of distinct objects in grouping G2, again at the rate of one port per object. Any two groups of objects, G1 and G2 that communicate with each other should be non-intersecting, i.e. no object may appear in both groups. Membership of objects in groupings like G1 and G2 may be changed dynamically. Point-to-Point (PTP) data exchange is a special case of this general GTG exchange.

FIG. 1 illustrates the structure of a TICC-pathway that connects two such groups. We will use this figure to identify and introduce the various components of a TICC-pathway and explain the functions performed by them.

In FIG. 1 agent, A1 is tuned to ports $P_3$ and $R_3$ of objects $O_1$ and $O_2$ in grouping, G1, via watch-rings $w_1$ and $w_2$, respectively. Similarly, agent A2 is tuned to ports $Q_3$ and $T_3$ of objects $O_3$ and $O_4$ in grouping, G2, via watch-rings $w_3$ and $w_4$, respectively. Watch-rings are connected to an agent at its composite agent port. Thus, watch-rings $w_1$ and $w_2$ in FIG. 1 are connected to agent A1 at its composite agent port. Similarly, watch-rings $w_3$ and $w_4$ are connected to agent A2 at its composite port. Always agents will be tuned to ports via watch-rings connected in this manner. Watch-rings transport control signals that are exchanged between an agent and ports that are tuned to it. As shown in FIG. 1, an agent sends start control signal, s, via delivery sides of watch-rings, to ports that are tuned to it. When ports sense the start signals sent by agents tuned to them, they will inform their parent objects that a message is waiting for them. Ports will receive completion signals, c, from their parent objects when they complete their computations. Ports will forward these completion signals, c, to agents who are tuned to them, via dispatch sides of watch-rings that connect them to the agents. This will inform the agents that parent objects of ports that are tuned to them, had completed their computations. The completion signal, c, can take one of three possible value, t, d, or h, as shown in FIG. 1. Every watch-ring in FIG. 1 is shown with names of control signals that may travel along its delivery and dispatch sides.

Agents A1 and A2 in FIG. 1 are connected to each other by clock-ring, C. Agents are attached to the clock-ring at their clock-ports. In FIG. 1, the clock-ring has only two agents. In general, a clock-ring may have several agents attached to it, as shown in FIG. 4. Clock-ring carries start control signal, s that is sent by each agent on the ring to its next agent, in clockwise direction, in order to transfer control to the next agent.

Clock-ring C has three memories associated with it: a scratchpad memory, SP, a read-memory, R, and a write-memory, W. When an object is informed by its port P that a message is waiting for it, it will read its input message via port P from the read-memory of the clock-ring to which the agent that is tuned to port P is attached. Before an object completes its computation, it may write output messages in the write-memory of the same clock-ring using the same port P. Objects in FIG. 1 have each eight ports. An object may in general have an arbitrary number of ports.

1.4.2. Computation and Communication around a Clock-ring

Initially all agents and ports in FIG. 1 would be In their quiescent state (also called idle state). Computation in objects around the clock-ring will begin only when one of the agents sends a start signal, s, to ports that are tuned to it. Since all agents are idle initially, the CSM will be used to start computations around clock-ring C, by injecting a start signal, s, into a designated agent on the clock-ring. (We will later see how this is done.) Let us suppose that A1 is the designated agent of clock-ring C and the CSM injected a start signal into agent A1. As soon as agent A1 senses this start signal s, it will go to its busy state and forward the start signal s to all the ports that are tuned to it, via the delivery sides of watch-rings that are connected to it. Thus, in FIG. 1 A1 would forward the start signal s to ports $P_3$ and $R_3$.via delivery sides of watch-rings $w_1$ and $w_2$. When ports $P_3$ and $R_3$ sense this start signal sent to them by agent A1, they would put themselves in the busy state and forward the start signal s to their respective objects, $O_1$ and $O_2$.

When objects $O_1$ and $O_2$ sense this start signal sent to them by their ports, and when they are ready to do so, they would read their input data from the read-memory of clock-ring C using their respective ports $P_3$ and $R_3$, and begin their computations. When they had completed their computations, or during their computations, they would write their output data into the write-memory of clock-ring C. When each object had completed all of its computations, it would send a completion signal, c, to the port through which it got its input data. Thus, in FIG. 1 object $O_1$ would send completion signal c to port $P_3$, when it had completed all of its computations. Similarly, object $O_2$ would send completion signal c to port $R_3$, when it had completed all of its computations. There are three kinds of completion signals, t, d, or h. The completion signal sent by an object to its port can be only one of these three. Thus, c would be equal to either t, or d or h. We will soon see the significance of these three different kinds of completion signals.

When a port senses the completion signal c sent to it by its parent object, it would forward the signal to the agent it is tuned to via the dispatch side of watch-ring that connects it to the agent, and then turn itself off, i.e., put itself in its idle state. Thus, in FIG. 1 port $P_3$ would forward the completion signal c, it received from object $O_1$, to agent A1 via the dispatch side of watch-ring $w_1$, and turn itself off. So also, port $R_3$ would forward the completion signal c, it received from object $O_2$, to agent A1, via the dispatch side of watch-ring $w_2$, and turn itself off. It may be noted, objects $O_1$ and $O_2$ may not complete their respective computations at the same time. Thus, A1 would receive completion signals from ports $P_3$ and $R_3$ at different times.

After agent A1 had sensed completion signals from all the ports it is tuned to, it would check whether a certain agreement protocol had been satisfied, i.e., whether all ports tuned to it had sent appropriate completion signals. This agreement protocol is a Boolean function of control signals exchanged between agent A1 and all the ports that are tuned to it (defined in Section 1.10 of this chapter). Thus in FIG. 1, agent A1 would check for satisfaction of agreement protocol after it had received completion signals from both ports $P_3$ and $R_3$. During all this time, data in the read-memory R of clock-ring C will remain undisturbed.

If agreement protocol is satisfied, then agent will do one of the following, depending on the kind of completion signals it received:

a If the completion signal it received from at least one of the ports is t then agent will switch the memory designation of clock-ring C, i.e., what was previously the read-memory will now be designated as the write-memory, and what was previously the write-memory will now be designated as read-memory. After doing this, the agent will send a start signal s to its next agent on the clock-ring and turn itself off (i.e., put itself in its idle state). Thus, in FIG. 1 agent A1 would re-designate the read-memory R as the write-memory, and the write-memory W as the read-memory. After switching the memory designation in this manner, A1 would send a start signal s to its next agent, A2, and turn itself off (i.e. put itself into the idle state).

If the completion signals an agent received from all the ports it is tuned to is d, then agent will not switch the memory designation of clock-ring C, but will simply send a start signal s to its next agent on its clock-ring and turn itself off. Thus in FIG. 1 if both ports $P_3$ and $R_3$ sent completion signal d to agent A1, then A1 would not switch memory designation of memories in clock-ring C, but would simply send start signal s to its next agent A2 and turn itself off. In this case, the agent would be forwarding to its next agent the same inputs, that ports tuned to the agent sent to their parent objects in their just completed computations.

If the completion signals an agent received from ports tuned to it is, h, then agent will simply turn itself off. It will not send any start signal to anybody. This will halt computations around the clock-ring C.

Let us suppose that computations around clock-ring C in FIG. 1 did not halt and agent A1 did switch the read and write memories of clock-ring C. This is the normal mode of operation. Then A1 would have sent a start signal to agent A2 and turned itself off. When A2 sensed this start signal s, it would turn itself on, i.e., put itself in its busy state, and forward the start signal s to all ports that were tuned to it. Thus in FIG. 1, A2 would send start signals to ports $Q_3$ and $T_3$ of objects $O_3$ and $O_4$. Because of re-designation of read/write memories, memory R in FIG. 1 would now be the write-memory for objects $O_3$ and $O_4$, and memory W would be their read-memory. Thus, these objects would now be able to read messages written into memory W by objects $O_1$ and $O_2$.

At this point the same cycle of events that happened with ports $P_3$, $R_3$, and objects $O_1$ and $O_2$, when they recieved the start signal from agent A1, would now happen with ports $Q_3$, $T_3$, and objects $O_3$ and $O_4$. At the end of their computations, when A2 sensed satisfaction of agreement protocol in the completion signals it recieved from ports $Q_3$ and $T_3$, it would take appropriate action, and might forward replies from objects $O_3$ and $O_4$ back to objects $O_1$ and $O_2$. This might then start the next cycle of computations around the clock-ring C. Thus, at any given time only one group of objects around the clock-ring will be active, unless a pipeline implementation is used [see S. Das 1999, for details]. Each group around a clock-ring would receive new input data only after it had fully absorbed its current inputs and completed all of its computations (this will be true also for pipeline implementations). This is just like what happens in asynchronous hardware circuits. Thus, objects $O_1$, $O_2$, $O_3$, and $O_4$ in FIG. 4 would not need any input buffers. Since every port of every application object will be similarly connected to a clock-ring through an agent, none of them would need input buffers.

There is implicit transaction control with reply semantics for every GTG (group-to-group) transaction in TICC. The agreement protocol feature makes it possible to easily implement two-phase commit in all transactions.

1.4.3. Execution of Control Signal Exchange Protocols by Processor C 1.4.3.1. Segments and Pending Lists Let us begin when objects and agents around clock-ring in FIG. 1 are in the following state: Objects $O_1$ and $O_2$ are busy doing their computations on inputs read from read-memory R of clock-ring C, and agent A1 and ports $P_3$ and $R_3$ are all in their busy state. Ports $P_3$ and $R_3$ would be expecting to receive completion signal c from their parent objects and agent A1 would be expecting to receive completion signals from ports $P_3$ and $R_3$.

Every port and agent will have a completion signal processing function associated with it. For a port, P, let P-Cfn, be this function and for an agent, A, let A-Cfn-P be the function A uses to process completion signals received from port P. Similarly, every port and agent will also have a start signal processing function. Let P-Sfn and A-Sfn be the start signal processing functions of port P and agent A. We will refer to functions like these as protocol functions. These functions implement the protocols for receiving and responding to start and completion signals. Thus for port $P_3$ and agent A1 their, respective, completion signal processing protocol functions would be P3-Cfn and A1-Cfn-P3. For port, $R_3$ and A1 their respective completion signal processing protocol functions would be R3-Cfn and A1-Cfn-R3. For agents A1 and A2 their start signal protocol functions would be, respectively, A1-Sfn and A2-Sfn. Similarly, the start signal protocol functions for ports $P_3$, $R_3$, $Q_3$, and $T_3$ would be, respectively, P3-Sfn, R3-Sfn, Q3-Sfn, and T3-Sfn.

When object $O_1$ sends a completion signal c to its port $P_3$ the sequence of protocol functions, The SEGMENT-DRIVER executes pending lists cyclically starting with $X_1$-pending-lst and returning to X1-pending-lst after it had executed $X_N$-pending-lst. In each pending-lst, it will execute every segment in the order they are presented in the pending-lst. Segments will be removed from the pending-lst after execution. After emptying one pending-lst, SEGMENT-DRIVER will proceed to execute segments in the next pending-lst. However, when a pending-lst becomes empty it should somehow be replenished, in order for the process to continue for as long as the application system itself is working. This is done as follows.

1.4.3.2. Dynamic Updating of Pending Lists

As new segments are constructed, each processor $X_1$ will not append the new segment directly to Xi-pending-lst, since this may interfere with execution of segments in the pending list by the SEGMENT-DRIVER. Instead, $X_1$ will append new segments to another list, called $X_1$-pl-upd-lst, which is the pending list update list of $X_1$. When SEGMENT-DRIVER empties $X_1$-pending-lst it would cause $X_1$-pending-lst to be replenished with segments, which might have since accumulated in the $X_1$-pl-upd-lst. This replenishment is done by a function called UPD-PENDING-LST. Operation of this function is controlled by a semaphore, called $X_1$-semaphore. UPD-PENDING-LST will replenish $X_1$-pending-lst with segments from $X_1$-pl-upd-lst only if $X_1$-semaphore is NIL. After $X_1$-pending-lst had been replenished, this semaphore would be set to T. Every time processor $X_1$ seeks to append a new segment to $X_1$-pl-upd-lst, it will check whether the X-semaphore is T. If it were T then it would destroy the existing $X_1$-pl-update list, install a new one, and append the new segment to this newly created $X_1$-pl-upd-lst. After doing this $X_1$ will reset the $X_1$-semaphore, back to NIL.

By adopting this kind of producer/consumer paradigm, mutual interference between the parallel processors $X_1$ and C is avoided for every $X_1$. Thus while the segment driver is executing the segments in the various pending lists, each processor $X_1$ may append new segments to $X_1$-pl-upd-lst without interfering with the segment driver. It may be noted, while UPD-PENDING-LST is updating the $X_1$-pending-lst and the semaphore is still NIL, it is quite possible for processor $X_1$ to append new segments to $X_1$-pl-upd-lst without interfering with the operation of UPD-PENDING-LST.

1.4.3.3. Segment Execution and Agreement Protocol Satisfaction

Now let us get back to what happened to segments $S_1$ and $S_2$ in equations (2) and (3). The diagram at the bottom of the figure in FIG. 2 shows the pending list associated with processor X that executed code in objects $O_1$ and $O_2$ shown in FIG. 1. We have assumed that the pending list $S_1$, of equation (2) above, was presented to C first, and after some time the pending list $S_2$, of equation (3) above, was presented. It might have happened this way because, in FIG. 1, object $O_1$ might have sent its completion signal to its port $P_3$ before object $O_2$ sent its completion signal to port $R_3$.

Processor C will be able to execute the protocol functions of segments $S_1$ and $S_2$ only after it had executed all the segments that were ahead of it in its input queue. Let us assume that in FIG. 2 there were Q segments ahead of segment $S_2$ and (Q-k) segments ahead of segment $S_1$. After executing a protocol function in a segment, the SEGMENT-DRIVER will execute the next protocol function only if the just executed function returned T. Thus, in segment $S_1$ of equation (2), which is reproduced below for convenience, $$S_1 = (P3\text{-Cfn}, A1\text{-Ctn-}P_3, A2\text{-Sfn}, Q_3\text{-Sfn}, T3\text{-Sfn}) \qquad (2)$$

when P3-Cfn is executed, it would return T, because at that time $P_3$ was expecting to receive a completion signal from its parent object. However, when the next protocol function, A1-Cfn-P3 is executed, it would return NIL, because agreement protocol would not have been satisfied yet. Thus, segment $S_1$ execution would halt after A1-Cfn-P3. The remaining protocol functions in segment $S_1$ would not be executed. Thus, no message would be delivered to ports $Q_3$ and $T_3$.

However, execution of A1-Cfn-P3 in $S_1$, would cause agent A1 to update the status of its interactions with its ports. Thus, it would remember the fact that a completion signal had been received from port $P_3$ and remember what completion signal it was. Thus, when the function A1-Cfn-$R_3$ is later executed in segment $S_2$, $$S_2 = (R_3\text{-Cfn}, A1\text{-Cfn-R3}, A2\text{-Sfn}, Q3\text{-Sfn}, T3\text{-Sfn}) \qquad (3)$$

agreement protocol would be satisfied. This is because, agent A1 would have received by this time completion signals from all ports tuned to it. Thus, the start protocol functions (A2-Sfn, Q3-Sfn, T3-Sfn) in $S_2$ would all be now executed. This would result in objects $O_3$ and $O_4$ being notified by ports $Q_3$ and $T_3$, respectively, that a message is waiting for them in their read-memory in clock-ring C. After this notification, objects $O_3$ and $O_4$ could read their input messages at any time they chose. Message would remain undisturbed in the read-memory until it had been fully read and absorbed. This constitutes message delivery in TICC.

1.4.4. Asynchronous Message Delivery is Loss Less and Self-synchronizing

Message delivery here is loss less because all of the following processes that were involved in the steps needed to deliver the message were deterministic processes:

Constructing and appending segments $S_1$ and $S_2$ to $X_1$-pl-upd-lst,

Transferring contents of $X_1$-pl-upd-lst to $X_1$-pending-lst, and

Execution of pending segments in $X_1$-pending-lst.

These operations were triggered by definite events that had to occur in every computational sequence, every time a message transfer request is made by an object. Unless the programs that perform these operations themselves failed, all the tasks enumerated above would be performed without fail. Since each pending segment is removed from pending-lst after its execution, each message would be delivered only once. Message exchange is asynchronous because any object could send a message to any other object at any time, if a TICC pathway existed between them. If one did not exist, then a new pathway connecting them could be dynamically established, if application security permitted it. These asynchronous message deliveries are self-synchronizing because agents (ports) do not have to synchronize with ports (agents) in order to pass start (completion) signals to them, and ports do not have to synchronize with their parent objects to send them start signals. So also, objects do not have to synchronize with their ports in order to send completion signals to them.

Observation 1: Thus, we will have loss less self-synchronizing asynchronous message transfers as long as TICC-pathways are not changed before pending segments are executed.

Suppose $t_c$ was the time when all ports tuned to an agent had sent completion signals to the agent. This is the time when agreement protocol would be satisfied and messages would be ready to be sent to their destinations. Let $t_d$ be the time when the messages were actually delivered to destination ports. Then $(t_d-t_c)$ would be the communication latency, L. This can be computed as discussed in the next subsection.

1.5. Communication Latency.

Assume that on the average there were at most n ports tuned to each agent. As shown in FIG. 2, assume that there were Q pending messages awaiting delivery ahead of segment $S_2$. As mentioned earlier, execution of segments $S_1$ and $S_2$ would cause satisfaction of agreement protocol. In FIG. 1, n=2, and thus there were two segments in the pending list and each segment $S_1$ and $S_2$ had five protocol functions. Among the five protocol functions in $S_1$, only two were executed because, in this case, agreement protocol was not satisfied. However, in $S_2$ all the five protocol functions were executed. In general, for an arbitrary n each segment would contain (n+3) protocol functions and the pending list will contain in all n segments, one corresponding to each port. In (n−1) of these n segments agreement protocol would not be satisfied and thus in each of these (n−1) segments only two protocol functions would be executed. Message would be delivered only when all the n segments were executed. This would thus take in all, 2 (n−1)+(n+3)=(3n+1), protocol function executions. Assume that on the average t CPU cycles were needed to execute one protocol function. Then it would take t (3n+1) CPU cycles to execute all protocol functions in all the n segments. Thus, each message delivery will take at least t (3n+1) CPU cycles to get delivered. If we had a F gigahertz CPU then each CPU cycle would take (1/F) nanoseconds. Or, in one microsecond [1000F/t(3n+1)] messages could be delivered.

To this we have to add the time it took to construct the first segment and install it in X-pending-lst. On the average, this will take about the same number of CPU cycles as it takes to execute one complete segment, namely t (n+3) CPU cycles. Thus, the total latency per message will be [t(3n+1)+t(n+3)] CPU cycles. Let $Q_{max}$ and $Q_{ave}$ be, respectively, the maximum and average lengths of queue in front of the segment driver. We then get the following expressions for maximum, average, and minimum latencies, $L_{max}$, $L_{ave}$ and $L_{min}$:

$$L_{max_i} = [(t(3n+1)Q_{max} + t(n+3)]/F) \text{ nanoseconds} \quad (4a)$$

$$L_{ave} = ([t(3n+1)Q_{ave} + t(n+3)]/F) \text{ nanoseconds, and} \quad (4b)$$

$$L_{min} = [t(3n+1) + t(n+3)]/F \text{ nanoseconds.} \quad (4c)$$

all in (ns) nanoseconds. It is instructive to get an idea of numbers one gets for typical values of n, t and F. Typical value for n would be between 1 and 2. Let us assume that n=2, and F=3 (i.e., we have a 3-gigahertz machine). Typical value for t is 15 CPU cycles. Thus, it would take about 5 nanoseconds to execute a protocol function. Then minimum latency for the first message delivery is 60 nanoseconds in other words, there could be at least 16 full message deliveries per microsecond. Actually there could be more, since the time taken to present a segment to C is pertinent only for the first segment presented to C. The processor C would be busy executing segments already presented to it, while the later segments were being appended to the various pl-upd-lsts. That is why, in equations (4a) and (4b) above, the time, t(n+3)/F, needed to present a segment to processor C is added to the latency expression only once. Let us now calculate $L_{ave}$ based on expected value of number of messages in queue in front of the SEGMENT-DRIVER.

Let $M_{ave}$ be the expected value of total number messages that are generated every microsecond. $M_{ave}$ will be the sum of expected values of messages generated per microsecond by each processor. Let us assume that the expected value of number of messages generated per microsecond by processor $X_1$, is $m_t$ messages/microsecond. Then $$M_{ave} = [m_1 + m_2 + \ldots + m_N] \quad (5)$$

and the expected value of queue length $Q_{ave}$ will be, $$Q_{ave} = M_{ave} - (1000F/t(3n+1)) \quad (6)$$

since processor C would execute (1000F/t(3n+1)) messages in that microsecond. Let us assume that the average value of $m_t$ is 1, i.e., on the average, each processor would generate one message in every microsecond (which is rather a very high rate of message generation). Let us assume, N=100, i.e., there were 100 processors in the multi-processor, g=3 gigahertz, t=15 CPU cycles, and on the average each agent had two ports tuned to it, i.e. n=2. Then $M_{ave}$=100 and from equation (6) we get $Q_{ave}$=15. For this value of $Q_{ave}$ we get from equation (4b)

$$L_{ave} = 550 \text{ nanoseconds.} \quad (7)$$

During this 550 nanoseconds about 15 group to group messages would have been delivered. If we assume that the maximum rate of message generation per processor is 2 message/microsecond, then the maximum possible latency for 100 processors, would be, $$L_{max} = 4.05 \text{ microseconds} \quad (8)$$

The important point to notice here is that during the 4.05 microseconds about 115 group-to-group messages would have been delivered. In actual practice, the message generation rate will be much less than the rates we have assumed and thus most of the time latency will be no more than 100 nanoseconds (1.7 times the minimum latency).

This calculation did not account for time taken to enforce application system security at every port of an application system. As may be seen from the design for implementation described in Chapter 2, dynamic security enforcement would consume on the average about as much time as the time needed to execute two protocol functions for each port (i.e. about 30 memory cycles). For n ports this would amount to 2nt CPU cycles per message. Thus, with dynamic security enforcement the various latencies would be of the order of, $$L_{max_i} = [t(5n+1)Q_{max} + t(n+3)]/F \text{ nanoseconds,} \quad (9a)$$

$$L_{ave} = [t(5n+1)Q_{ave} + t(n+3)]/F \text{ nanoseconds, and} \quad (9b)$$

$$L_{min} = [t(5n+1) + t(n+3)]/F \text{ nanoseconds,} \quad (9c)$$

For typical values, N=100, n=2, t=15, and F=3 assumed above, we have $$L_{max} = 6.5 \text{ ms } L_{ave} = 850 \text{ ns, and } L_{min} = 80 \text{ ns.} \quad (10)$$

where ms stands for microseconds and ns stands for nanoseconds.

These are latencies for group-to-group message transfers with n=2, and with dynamic security enforcement. On the average, about 18 messages would be delivered every microsecond. This compares with 5000 to 10000 CPU cycles latency it might take in current technologies for each point-to-point (not group-to-group) message transfer, without security enforcement. For n=2, with a 3-gigahertz processor, it would take a minimum of 3.33 to 6.66 microseconds per message delivery in the best current technology, compared with 80 nanoseconds (equation 10) in TICC (and this is with security enforcement). For delivering 19.6 messages it would take a minimum of 65.27 to 130.54 microseconds, with in a multiprocessor, where messages are exchanged through shared memory, compared with 6.5 microseconds (equation 10) in TICC If there are 1000 processors, then by using 10 communication processors one can maintain the same latency rates in TICC. TICC is scalable to any number of processors. But, this is not possible in other technologies. The advantages of using TICC are quite dramatic. We believe, group-to-group message transfers with latency rates estimated above for TICC are simply impossible in any other current technology.

1.6. Dynamic Flexibility
1.6.1. An Overview

TICC allows pathways in a TICC-network to be dynamically modified without service interruption in application systems. All of the following may be dynamically performed (by "dynamic" we mean that changes may be introduced while an application system is running without service interruption and without loss of benefits gained from computations performed before changes were completed; the only cost will be a certain delay):

1) New pathways may be created and established, existing pathways may be removed or modified,
2) Monitoring networks to monitor messages flowing through any point in a network of TICC-pathways (but not inside application objects) may be installed and removed. This feature may be used to dynamically debug parallel computations.
3) Computations performed by an application object may be temporarily suspended and resumed as and when needed.
4) Application systems may be dynamically reconfigured without service interruption.
5) Application system security may be dynamically enforced on each object at every one of its ports for every message that is sent or received by the port. Such security enforcement systems may themselves by dynamically monitored.
6) Performance of application objects at every one of their ports may be dynamically monitored, incorporating methods to anticipate impending failures and take corrective measures, at little cost in time and resources.
7) New versions of objects may be dynamically tested in exactly the same context in which their older versions function, in parallel with older versions.

These are the principal features and advantages of dynamic flexibility in TICC based systems. All of the above may be realized in TICC without in any way planning for them, at the time of design and implementation of application-systems. Thus, one may respond to unexpected system failures by dynamically installing debugging networks and reconfiguring an application system as needed. One does not have to anticipate possible system failures and provide additional code in application objects to respond to them. Dynamic debugging of parallel processes, and dynamic reconfiguration without advance planning or service interruption, are novel features that, to the best of our knowledge, only TICC technology can make available. With all of these benefits, communication latencies in TICC would still be about one tenth or one hundredth of latencies in other technologies.

We begin our discussion below outlining the technical details that make all of this possible. After this, we will introduce TICC network structures, their operation, and show how one may monitor data, flowing through TICC-pathways and obtain the dynamic flexibility claimed above.

1.6.2. Pending Flags and Protection of Protocol Function Execution

Every protocol function in TICC will be associated with a flag called pending flag. For a protocol function, f, its associated pending flag will have the name f-pending. For the protocol functions associated with agents and ports in FIG. 1 we will have the following pending flags:

A1-sfn-pending, A1-Cfn-P3-pending, A1-Ctn-R3-pending A2-Sfn-pending,
A2-Cfn-Q3-pending, A2-cfn-T3-pending, $P_3$-Sfn-pending, $R_3$-Sfn-pending,
$Q_3$Sfn-pending, $T_3$-Sfn-pending, $P_3$-Cfn-pending, $R_3$-Cfn-pending,
$Q_3$Cfn-pending and T3-Sfn-pending.

Every time a protocol function is put in a segment that is appended to a pl-upd-lst, its pending flag would be set to T. Thus, when segments $S_1$ and $S_2$ are presented to C all the pending flags of protocol functions in the segments would have been set to T. These flags would be reset to NIL only after the protocol functions have been executed by the SEGMENT-DRIVER.

CSM would examine pending flags of protocol functions associated with a pathway before it begins to modify the pathway, in order to determine whether the pathway could be safely modified without disturbing any of the pending message transfers. If the pending flag associated with any of the protocol functions of a pathway is T, it would indicate that one or more of the pending message transfers might be disrupted, if those pathways were changed. Therefore, CSM would wait until pending flags became NIL, before changing those TICC-pathways. After they become NIL, the CSM may lock pertinent agents on the pathways so that they would not initiate new message transfer requests while the pathways were being changed. When all needed changes had been done, then CSM would release all locked agents and at that point normal operations would resume. Details on incorporating pending flags and using them correctly are presented in the TICC design described in LISP in Chapter 2.

By making use of pending flags CSM would guarantee that none of the pending message transfers in an application, would be interrupted or lost by updates that might have to be done dynamically on networks of TICC-pathways.

Observation 2: Thus, we will have loss less message transfers even if a need to modify a TICC-pathway arose before pending segments were executed.

1.7. Structural and Semantic Restrictions on TICC-pathways

All TICC pathways have to obey the structural and semantic restrictions presented in this subsection. Many of the restrictions have been already mentioned in text. It is useful to first define what a TICC-pathway is. We have already seen examples of such pathways. This is given below (words in italics refer to technical terms used to refer to TICC-pathway components):

Each TICC-pathway specifies a connection between ports belonging to distinct application objects in one group, say group G1, to ports belonging to distinct application objects in another group, say group G2, where G1 and G2 are non-intersecting, i.e., the same object does not appear in both groups. There is no restriction on the number of objects that each of these two groups may contain.

Each selected port of group G1 will have one end of a watch-ring attached to it. The other end of this watch-ring will be connected to the composite agent port of an agent, say agent A1, as shown in FIG. 1. Thus, if the group had n selected ports then agent A1 will have n watch-rings connected to its composite agent port. Agent A1 is said to be tuned to all the selected ports of group G1 when such watch-ring connections are made between the agent and the selected ports. The clock-port of this agent A1 will be attached to a clock-ring, C. With this configuration, all selected ports of group G1 would be tuned to the same agent A1, all objects in group G1 will have access rights to memories of the clock-ring.

Similarly, selected ports of group G2 will all be tuned to another agent, say agent A2, by establishing watch-ring connections between the composite agent port of A2 and the selected ports in G2. The clock-port of agent A2 will also be attached to the same clock-ring C. All objects in group G2 will also have access rights to memories of clock-ring.

Each clock-ring will contain three kinds of memories: Read-memory, write-memory, and a scratchpad memory. Ports tuned to an agent, that is attached to a clock-ring C, will read input messages from the read-memory of clock-ring C and deliver them to their parent objects. They will write output messages into the write-memory of C. Parent objects of ports that are tuned to an agent attached to C may use the scratchpad memory of C to exchange data among themselves to coordinate their activities, while they are performing their respective computations, on inputs received from the read-memory of the clock-ring. If an object had several ports, it might simultaneously enjoy access rights to memories of several distinct clock-rings, one for each port of the object.

The total configuration, thus obtained consisting of ports, watch-rings, agents, and clock-ring is a TICC-pathway that connects objects in, group G1, to objects in, group G2. Each such TICC-pathway containing a clock-ring with only two agents is bi-directional, i.e., each group connected to the pathway may send messages to the other group.

A clock-ring may have more than two agents attached to it. Thus, as shown in FIG. 4 a clock-ring may have several groups of objects, whose selected ports are tuned to agents attached to the clock-ring. If a clock-ring has m agents attached to it, with each agent tuned to a group of selected object ports, then the clock-ring will contain m TICC-pathways. Each such pathway will connect one group of objects around the clock-ring to its next group on the clock-ring, in clockwise direction. Thus, the clock-ring in FIG. 4 contains six TICC-pathways. In such cases, each group around the clock-ring may send messages only to its next group on the clock-ring in the clockwise direction. No group on a clock-ring can directly send messages back to its previous group. Messages and control signals may not travel in anti-clockwise direction around a clock-ring.

Every agent will send a start control signal, s, to its next agent on a clock-ring, in clockwise direction, when it had completed its task and is ready to activate its next agent. The next agent will always be waiting to receive such activation. Each agent will send start control signal, s, to ports that are tuned to it via the delivery sides of watch-rings attached to its composite agent port. Finally, each agent will receive from each port that is tuned to it, a completion signal, c, via dispatch-side of watch-ring, when parent objects of the ports complete their, respective, computations. In all cases only control signals will travel along TICC-pathways. They will establish the context for message transfers to occur through shared memories of the clock-ring.

In the design considered here only one group of objects around a clock-ring may be active performing computations on inputs read from the read-memory of the clocking. A pipelined implementation, in which several agents around a clock-ring could be simultaneously active, is also possible.

There are structural and semantic restrictions on ports, which may be connected by TICC-pathways. Many of them have been already mentioned in the text. They are summarized below.

Structural Restrictions on TICC-Pathways

Rule 1: Every agent will have a unique parent clock-ring to which it is attached.

Rule 2: A clock-ring may have several agents attached to it.

Rule 3: An agent may be simultaneous tuned to several ports, each belonging to a distinct object.

Rule 4: No two ports of an object may be tuned to any two agents on the same clock-ring.

Thus, no two ports of the same object may ever be connected by a TICC-pathway. These rules guarantee that network of TICC-pathways will be deadlock free.

Semantic Restriction on TICC-Pathways

Security Restriction: Two ports belonging to two different application objects may be connected by a TICC-pathway only if application security permits at least one of them to send messages to the other.

The following definitions are useful while talking about components of TICC pathways: An agent is free if it is not attached to any clock-ring, even if it is tuned to some ports. An agent is bound, if it is attached to a clock-ring even if it is not tuned to any port. Similarly, a port is free if it is not tuned to an agent, even if it is attached to a watch-ring. A port is bound if it is tuned to an agent, even if the agent is free. A clock-ring is bound if at least one of the agents attached to it is tuned to a port. A clock-ring is fee (or isolated) if none of the agents attached to it are tuned to ports. An agent not attached to a clock-ring and not tuned to any ports is an isolated agent. Similarly, an object with all its ports free is an isolated object.

New watch-rings may be created and installed to tune any free agent to a free port, if it does not violate any of the connectivity rules listed above and does not violate application system security.

1.8. Models of Computation in TICC

Once started, sequential computational activity around a clock-ring would keep migrating cyclically around the clock-ring from one group to its next, in clockwise direction, and back to the group where it all started. This sequential cyclical activity may be stopped and started when necessary by the objects themselves or by CSM. Thus, clock-rings model sequential processes at the object level. One may think of clock-rings as threads that sequence such processes at the objects level. FIG. 4 shows a typical sequential computation containing objects $O_1$, $O_2$ through $O_{15}$ organized into six groups. Ports belonging to distinct objects in different groups are, respectively, tuned to agents $A_1$ through $A_6$ shown in FIG. 4. All of these agents are attached to clock-ring C, which contains memories R (read), W (write) and SP (scratchpad). At any given time, only one agent and objects (ports) tuned to it would be active. Normally, as each group completes its computation, computational activity would be transferred cyclically in clockwise direction around the clock ring. In pipelined implementation of TICC, more than one group of objects around a clock-ring may be active at the same time. Here also, computation will migrate around the clock-ring from one group to another in clockwise direction. Parallel computations in TICC would consist of several such sequential clock-rings running in parallel, and communicating with each other.

There are five pathway abstractions (components) in TICC. Four of them, namely agents, ports, watch-rings, and clock-rings have been already introduced. The fifth abstraction is the collator object shown in FIG. 5. The collator object in this figure connects four sequential computational rings, which may all run in parallel with each other in different processors of a multi-processor. The collator object in FIG. 5 will gather data from different clock-rings collate them in right combinations (which may be based on a time stamping scheme) and deliver them to one or more of the agents connected to it. Details of collator object implementation would depend on application system characteristics, method used to time-stamp data generated by objects and method used to specify the manner in which data should be collated. Once these applications dependent details are known it is not hard to implement the collection of collator objects necessary for the applications. Details of collator object design and implementation are not discussed in this patent application. Claims on this patent do not depend on details of collator object implementation.

It is assumed through out that, application objects will perform all of their input/output operations only through their ports and will not share information with each other through global variables.

There is a structural isomorphism between TICC-pathways in an application system, and the structure of computations (flow of computations) in the application at the objects level. This is quite similar to the structural isomorphism that holds in asynchronous (and synchronous) hardware systems between control (clock) signal distribution systems and hardware subsystems. In such hardware systems, each subsystem would receive its next input only after it had completed its computations on its current input. The same restriction holds for objects in TICC-networks. Thus, one may think of networks of TICC-pathways as the software equivalent of control (clock) signal distribution systems in hardware. No hardware system could be implemented independent of its control (clock) signal distribution system. Similarly, no software system should be implemented independent of its message distribution system. This is precisely what is being advocated and accomplished by TICC, the Technology for Integrated Computation and Communication.

1.9. Exchanging Control Signals

As mentioned earlier, only control signals will travel through TICC-pathways. They would establish the context for data transfers to occur via shared memories associated with clock-rings. An agent, $A_i$, on a clock-ring may send a start-control signal, s, to its next agent $A_{(i+1)}$ on its clock-ring, after it senses satisfaction of agreement protocol. After sending such a control signal to $A_{(i+1)}$, agent $A_i$ would transfer itself to its idle-state. $A_{(i+1)}$ will go to its busy-state after it senses the start control signal, s, sent by $A_i$. Only one agent can be in the busy-state on any clock-ring at any given time, unless a pipelined implementation is used. We will say an agent/port is busy when it is in its busy-state, and it is idle when it is in its idle-state.

When an agent becomes busy, i.e., just after it senses start signal s sent by its previous agent, it will send start signal s to all ports that are tuned to it. When a port senses the start signal sent to i by the agent tuned to it, it will become busy and inform its parent object that data is waiting for it in its read-memory. It will do this by sending start signal s to its parent object. Thus, for example in FIG. 1, when $P_3$ senses the start signal sent by its agent A1, it will send a start signal s to its parent object $O_1$. The object will become busy with its port P, when it senses the start signal s sent to it by port P.

As mentioned earlier, control signal exchanges occur through shared variables. Thus for a port, say port P, to send controls signal s to its parent object, say object X, both P and X should share a common control signal variable. Let P-s-X be this variable. In order to send signal sto X, the start protocol function of P, P-Sfn, would set the variable P-s-X to true. P would do this immediately after it senses the start signal sent to it by its agent. The start protocol function of P, P-Sfn, would sense the start signal sent by its agent, A, by noticing that the start signal variable A-s-P is true. All of this will happen, of course, only when P-Sfn is executed by the communications processor, C. All agents on a clock-ring, C, will share the same start control signal variable among them, in order to sent start signals to their respective next agents. For the clock-ring C, this start signal variable will be C-s-var. Thus, C-s-var will be the start control signal variable shared by agents $A_i$ and $A_{(i+1)}$. $A_i$ would set C-s-var to true in order send signal s to $A_{(i+1)}$. $A_i$ would do this only after it senses satisfaction of agreement protocol by objects that are tuned to it. The manner in which segments are constructed and presented to C would guarantee that only $A_{(i+1)}$ would sense that C-s-var had been set to true, and not any other agent on the clock-ring C. This method of passing start signals from one agent to another around a clock-ring, cannot be used if pipeline implementation is used. In that case, each agent $A_i$ should use a unique control signal variable, $A_i$-s-$A_{(i+1)}$, to send a start signal to its next agent, $A_{(i+1)}$.

If all agents on a clock-ring are idle, then one may use the CSM to set C-s-var to true and immediately execute the start signal protocol function of the designated agent of the clock-ring C. if $A_i$ is the designated agent of clock-ring C, then the CSM would execute $A_i$-Sfn immediately after setting C-s-var to true. This will cause $A_i$ to wake up (i.e., put itself in the busy state) and respond in the appropriate manner. This will start computations around the clock-ring C. In all cases, no coordination is necessary between control signal senders and receivers. Senders could set the relevant control signal variables that were accessible to them, at any time. Receivers would sense them when their protocol functions are executed by C.

A parent object X of port P would sense that P-s-X had become true, when it polls its port P. After sensing this start signal sent by its port P, X may read its input data from the read-memory of clock-ring it is tuned to via port P at any time it chooses. An object may poll its ports in a round robin fashion, or in any fashion controlled by threads that drive its methods. When X had completed writing all its output data into its write-memory, it would send a completion signal c, to P. It would do this by setting true the associated control variable, X-c-P that it shared with P. It may set this variable to one of three values t, d, or h. P will sense this completion signal sent by its parent X only when its completion signal protocol function, P-Ctn, is executed by C.

Elapsed times between setting and sensing of control signal variables would be a part of latencies encountered in control signal exchange processes. We have already seen how latencies in TICC may be calculated.

At this point one may note the following: No prior agreement (synchronization) is needed between a port and its parent object, in order for the port to send signal s to its parent, or for the parent to send a completion signal c back to the port. They may each set the relevant control signal variables true at any time they please without any coordination with the other. Similarly, no prior agreement is needed for control signal exchange to occur between a tuned (port, agent) and (agent, agent) pairs as well. Signal exchanges along TICC pathways will always occur synchronously, because each receiving agent/port would always be waiting for the signal it would receive, and would correctly respond to it as soon as it senses receipt of the signal.

Observation 3: The synchronous signal exchanges that occur between pathway components in TICC would ultimately cause asynchronous self-synchronized data transfers to occur among objects in an application system. Since these signal exchanges occur in parallel with computations, objects do not have to waste time trying to synchronize with message recipients.

1.10. Agreement Protocol, AP

Completion signals are used in TICC to define four composite signals: One is the agreement protocol (AP), and the other three are composite-trigger, CT, composite-do-not-switch, CD, and composite-halt, CH, signals. These composite signals are defined as Boolean functions of completion signals received from ports tuned to an agent. The composite port of an agent (See FIG. 1) is responsible to compute these composite signals from completion signals it receives from ports tuned to them (hence the name).

If $P_1, P_2, \ldots, P_n$, are ports belonging to a group, G, which are all tuned to agent, A, then AP, CT, CD and CH may be defined as follows:

$$AP=[(d_1 V t_1 V h_1) \& (d_2 V t_2 V h_2) \& \ldots \& (d_n V t_n V h_n)],$$

$$CT=(t_1 V t_2 V \ldots V t_n),$$

$$CD=(d_1 \& d_2 \& \ldots \& d_n), \text{ and}$$

$$CH=(h_1 \& h_2 \& \ldots \& h_n),$$

where $t_i$, $d_i$, $h_i$ for $I=1, 2, \ldots, n$ are the completion signals that port $P_i$ may send to agent A. At any time $P_i$ will send only of one the three completion signals, $t_i$, $d_i$ or $h_i$. The response of an agent sensing satisfaction of this agreement protocol, i.e. sensing that AP is true, will depend on the following cases:

1) CT is true: In this case the agent will switch the read/write memory designation of memories in its parent clock-ring, send a start signal, s, to the next agent on its parent clock-ring and then transfer itself to its idle state. Here at least one object In grouping G would have written output data into the write-memory of the parent clock-ring of the agent.

2) CD is true: In this case the agent will not switch the read/write memory designation of memories in its parent clock-ring, but will still send start signal, s, to its next agent and then transfer itself to its idle state. In this case, none of the objects in grouping G would have written output data into the write-memory of the parent clock-ring of the agent, and all objects in G would have agreed that it was necessary to pass on the same input data that they received to the next group of objects. This case will commonly arise only for monitor agents, which cause data to be observed and passed on unchanged.

3) CH is true: In this case computation will halt because the agent will not send signal s to its next agent, but will transfer itself to its idle state. All objects in grouping G would have agreed that computation should be halted. This case will usually occur with termination objects, which are specially designed to terminate specific computations.

At this point one may note the following: In each cycle of computation around a clock-ring, when new input data was ready for delivery in a read-memory, its recipient object, say object O, would be notified by its port, say port P, that is tuned to the read-memory. Object O would use this input data whenever it is ready to use it and take the time it needed to fully process it. Input data would remain undisturbed in read-memory until object O had completed all computations associated with that input data. Only after this computation had been completed would the agent tuned to port P, say agent A, sense agreement protocol satisfaction. It is only when the agreement protocol is satisfied would agent A transfer computations to the next group of objects on the clock-ring.

In computations cyding around a clock-ring, new input data would arrive at an object tuned to that clock-ring only once in each cycle of computation. Thus, new input data would arrive only after object O had completed all its computations on its previous input data. If pipelined implementation is used it may arrive soon after object O had completed its computations on its current inputs. In all cases, current input data would have been fully read and used before the arrival of the next input data, and the object would be free to receive its next input when it arrives. Hence the following holds true:

Observation 4: All message transfers are buffer free. No input queues are needed to present messages to objects.

Protocol functions that have to be executed in order to deliver messages would always be presented to the communication processor C in the form of segments. Construction of segments, their presentation to C, and execution of protocol functions in segments are all deterministic processes. There is no non-determinism involved here. In addition, no pending messages would be lost because of dynamic updates that might be performed on TICC-pathways.

1.11. Monitor Agents on Watch-rings

It should be noted that all monitoring, reconfiguration, and dynamic evolution TICC-networks presented in the next few sections are the same kind of networks that were initially proposed in RESTCLK. In all the schemes presented below application objects need not be designed and implemented with additional code embedded in them in order to accommodate the kinds of monitoring, reconfiguration and dynamic updating operations that they might encounter during their lifetimes. Any desired change operation might be performed at any time during the lifetime of an application object, whether they had been a priori planned for or not. Application object code is totally independent of change requirements.

To the best of our knowledge, this unique feature holds true and is made available to application systems, only by TICC. RESTCLK proposed these schemes first, but it could not make them available for use in application systems, because of inability to produce an efficient implementation and guarantee loss less message delivery. TICC is the first system that makes it possible to fully realize the advantages of dynamic flexibility in practice, through its efficient implementation and loss less message delivery, achieved because of total integration of communication with computation.

The TICC-pathways shown in FIGS. 3, 6, 7, 8 and 9 are identical to the ones first proposed in RESTCLK. However, control signals exchanged in TICC pathways are different from the ones exchanged in RESTCLK. In addition, TICC agreement protocol is different from RESTCLK agreement protocol, and TICC protocols are executed in parallel with computations in a deterministic manner. In RESTCLK, they where executed in series with computations through interrupt control, in a non-deterministic manner.

Just as agents are attached to clock-rings, agents may also be attached to watch-rings. These agents are called monitor agents. FIG. 3 shows two monitor agents, $B_1$ and $B_2$, attached to watch-rings, $w_1$, which tunes agent A to port P. Clock-ring C in the figure is the parent clock-ring of agent A (i.e., the clock-ring to which agent A is attached via its clock-port). By definition, all ports tuned to monitor agents $B_1$ and $B_2$ will have the same access rights to read from and write into memories of clock-ring C, as ports tuned to agent A. Thus, the monitoring agents $B_1$ and $B_2$ in FIG. 3 may be viewed as being descendants of agent A. It may be noted, objects $M_1$ and $M_2$ in FIG. 3 will have the same access rights to memories of clock-ring C, as object $O_1$.

Just as monitoring agents might be attached to watch-ring w1 in FIG. 3, monitoring agents may also be recursively attached to watch-rings of other monitoring agents. Thus, monitor agents may be attached to watch-rings $w_2$ and $w_3$, in FIG. 3.

Monitor agents attached to the delivery side of a watching-ring (the side that goes from agent A to port P in FIG. 3) may be used to observe data flowing into port P. Thus agent $B_1$ in FIG. 2, which is tuned to object $M_1$, may be used to monitor data flowing into port P of object $O_1$. Monitor agents attached to the dispatch side (i.e. the side that goes from port P to agent A in FIG. 2) may be used to observe data flowing out of the port. Thus agent $B_2$ in FIG. 3, which is tuned to object $M_2$, may be used to monitor data flowing out of port P.

Monitor agent $B_1$ in FIG. 3, on the delivery side of watch ring, $w_1$, would trap the start control signal, s, on its way from agent A to port P, and forward this signal to monitoring objects via ports that were tuned to it. These monitoring objects (like object $M_1$ in FIG. 2) would then read data from the read-memory of clock-ring C and do whatever they wished to do with it.

They may read it and pass it on to external observers or other objects.
They may check it for security or errors (for debugging purposes) and pass it on to object $O_1$.
They may modify the data before passing it on to $O_1$.
They may encrypt (decrypt) it before passing it on to $O_1$.
They may use the input and output data to check new versions of application system objects in parallel with the existing versions.
They may even halt computations if they detected a serious error or security violation.

When they had completed doing whatever they wanted to do, they would send completion signals, t, d, or h, back to the monitor agent $B_1$. After sensing satisfaction of agreement protocol, monitor agent $B_1$ would respond as described in Section 1.10 above, but for one difference: If the port tuned to agent $B_1$ sent out completion signal t to agent $B_1$, then $B_1$ would do read/write memory switching and pass on the start signal s it received from agent A to port P. If it received completion signal d then $B_1$ would not switch memories, but still pass on signal s to port P. If it received completion signal h then it would block the message from port P by not sending any start signal to it. This may happen, for example, if monitor object $M_1$ detected a security violation.

It is possible to have more than one monitor attached to the delivery side of watch-ring $w_1$. If, for example there was another monitor agent, say agent $B_3$, next to $B_1$ on the delivery side of the same watch-ring $w_1$ in FIG. 3, then $B_3$ would trap the signal sent by $B_1$ to port P, and the same sequence of activities would then be repeated by $B_3$ and objects tuned to it. There is in principle, no limit to the number of monitor agents that one may attach to a watch-ring. But, adding a monitoring agent to a TICC-pathway can double the message transfer latency. Thus, on the latency scale of TICC, dynamic monitoring is expensive. But on the latency scale of current technology it is not expensive.

Similar monitoring activities would occur on the dispatch side of a watch ring in FIG. 3, when monitor agent $B_2$ traps completion signal, t, d, or h sent by port P. As soon as $B_2$ received a completion signal from port P, it would send start signal s to ports that were tuned to it. The monitor objects might then read and modify data written into the write-memory of clock-ring C by the parent object of port P. As in the case of delivery side observation, the monitor objects could do any thing they liked with the output data. When $B_2$ in FIG. 3 receives completion signal from monitor ports that are tuned to it, and senses satisfaction of agreement protocol, it will send to agent A (or to its next observer agent on the dispatch side, if there was one), the same completion signal that it had received earlier from port P.

1.12. Monitor Agents on Clock-rings

CSM (Communications System Manager) may be used to attach monitor agents to clock-rings as shown in FIG. 6 to observe data flowing into and out of a group of objects, G. In FIG. 6, G contains objects $O_1$, $O_2$ and $O_3$. Monitor agent $B_1$ would monitor data flowing out of group G, and monitor agent $B_2$ would monitor data flowing into group G. The monitoring objects M1 and $M_2$ in the figure could do anything they liked with data they read from read/write memories of clock-ring C. After completing their monitoring tasks they would send completion signals back to monitor agents, which would then take appropriate actions as described in Section 1.10, after sensing satisfaction of agreement protocol.

1.13. Suspending Computations Temporarily through Probe Networks

Any of the monitor networks, introduced in Sections 1.11 and 1.12, may be used to temporarily suspend computations if the monitoring objects in the network are programmed to delay sending completion signals to the monitor agents for specified times, or until they are instructed to do so from an external source. A more selective and simpler (because it does not require an additional agent) way of accomplishing the same objectives is shown in FIG. 7.

Here a probe network is attached to the agent that is tuned to objects $O_1$ and $O_2$. Thus, while $O_1$ and $O_2$ were busy processing inputs from the read-memory of clock-ring C in FIG. 7, CSM (Communications System Manager) could introduce the probe network without interfering with their computations. In each cycle of computation, agent A in FIG. 7 would sense satisfaction of agreement protocol only after the probe network had sent its completion signal. The probe object $R_1$ in FIG. 7 may be programmed to withhold sending completion signal as long as necessary, or send completion signal based on an external trigger. Each time a completion signal is sent by the probe network it would become possible for agreement protocol to be satisfied, and the current cycle of computations being performed by objects $O_1$ and $O_2$ could end. However, if the probe network remained in place, then computations performed by $O_1$ and $O_2$ could be trapped again in the next clock-ring cycle. One may thus use probe network with an external triggering arrangement to step through computations performed by any group of objects.

1.14. Dynamic Reconfiguration

Ability to suspend and resume computations in any part of an application system is a very useful feature. It is necessary to execute dynamic reconfigurations. Computations being performed by selected objects, whose interconnections have to be reconfigured or which need to be replaced may be suspended one by one by attaching probe networks to appropriate agents The manner in which objects selected for suspension will depend on the nature of particular reconfiguration task that one wishes to perform Before performing the required reconfiguration one should design, implement and install a reconfiguration coordinator object that is specific to the kind of reconfiguration that one wishes to perform. Object $O_4$ is the coordinator object in FIG. 8. This coordinator object would select objects, whose computations had to be suspended in order to perform its reconfiguration task. It would use its designated CSM (shown in FIG. 8) to set up probe networks on the selected agents in order to suspend computations performed by objects that were tuned to them. $O_1$ and $O_2$ are the objects selected and suspended in FIG. 8, using probe networks containing probe objects, $R_1$ and $R_2$.

The reconfiguration coordinator object, $O_4$ in FIG. 8, would create and install a trigger distributor object. This is object $O_3$ in FIG. 8. The coordinator is connected to the trigger distributor, in FIG. 8, via clock-ring $C_3$, and the trigger distributor is connected to probe objects, $R_1$ and $R_2$ via clock-rings $C_6$ and $C_7$. The coordinator would use the trigger distributor to selectively distribute triggers to suspended computations. When a probe object receives a trigger from the distributor object, it would send a completion signal to the agent, to which it was tuned. This would make it possible for the associated suspended computations to end their current cycle of computation. However, as mentioned earlier, these objects could be trapped again in their next cycle of computation, as long as the probe network was kept in place. By using the trigger distributor, the coordinator may thus cause suspended objects to step through successive cycles of their computations, as and when needed.

The reconfiguration network consisting of the probe networks, the coordinator, and the trigger distributor together with their associated TICC-pathways is shown FIG. 8 enclosed within a dotted reconfiguration network enclosure.

In all reconfiguration tasks, suspended computations must be brought to a mutually consistent state. This mutually consistent state would depend on the state (usually the number of clock-ring cycles of computations that each object had completed) and characteristics of each suspended object. As per implementation convention in TICC, every object will have an object state associated with it, which will change with time as the object performs its computations. Each object will also have a designated state port. Any object A with requisite authority could interrogate another object B through its state port and ask it to reveal its object state. By convention then B would be obliged to reveal its current state to object A. State port may also be used by A to reset the state of object B.

The designated state ports of objects $O_1$ and $O_2$ are shown in FIG. 8. The coordinator object in FIG. 8 would interrogate the state ports of objects $O_1$ and $O_2$ using pathway connections containing clock-rings $C_4$ and $C_5$, respectively. After suspending computations, the reconfiguration coordinator would check computational states of all suspended objects in order to check whether the suspended computations were in a consistent state for the particular reconfiguration task. If they were not then it would instruct the trigger distributor to selectively trigger suspended objects, which had to be stepped through their successive states in order to bring all suspended computations to a mutually consistent state.

Once they were thus brought to a consistent state the coordinator would cause its associated CSM to destroy and remove objects and pathway connections, which had to be reconfigured, and install new objects and new pathway connections, in order to complete the reconfiguration task. It would also initialize states of all newly introduced objects, ports, and agents as necessary. After the reconfiguration task had been completed, the reconfiguration object, probe networks and the trigger distributor object, and all pathway connections associated with them may be destroyed and removed. This would complete the reconfiguration task.

1.15. Dynamic Evolution

TICC makes it possible to dynamically test new versions of objects in an application system in the same context in which their older versions are functioning, in parallel with the older versions. When testing is completed, the newer versions may be used to replace their respective older versions, without service interruption. This is referred to as dynamic evolution. This can happen at any time in the lifetime of an application system and application systems do not have to be designed and implemented anticipating change contingencies they might face in their lifetimes and providing for them.

The dotted line enclosure in FIG. 9 contains all the monitoring networks used for testing a new version, called NEW. Its old version is called, OLD. The object NEW has to be tested before it is substituted for OLD in an application system. FIG. 8 shows objects OLD, NEW and CHECKER tuned to the same agent, $A_1$, which is attached to clock-ring $C_1$. Thus, they would all receive identical inputs in every cycle of the clock-ring $C_1$. FIG. 8 shows only one of the ports of OLD and its corresponding port of NEW having checking networks associated them. Similar checking arrangements should be installed between every port of OLD and its corresponding port of NEW. In this manner, every port of OLD and its corresponding port of NEW would be checked in identical operating environments. This is called in situ testing.

Two monitor agents are posted in FIG. 9 on the dispatch sides of watch-rings that, respectively, tune OLD and NEW to agent $A_1$. These monitor agents would trap completion signals sent by OLD and NEW at the end of their computations. OLD and NEW would have both performed their computations on identical inputs and written their respective outputs in to the write-memory of clock-ring $C_1$.

When agents $A_2$ and $A_3$ in the figure trap the completion signals sent by OLD and NEW, both agents would send start signals, s, to the CHECKER. At this point CHECKER would read outputs written by OLD and NEW in the write memory of $C_1$ and compare them in the context of inputs they had received, since CHECKER would have access to the same inputs. CHECKER would send out results of checking via clock-ring $C_2$ in the figure to the output object shown in the figure. This output object may display the results or save them in a file.

After completing checking operation, in each cycle, CHECKER would delete from the write-memory of clock-ring $C_1$ outputs written into it by NEW. After deleting this, CHECKER would send completion signal, d, to agents $A_2$ and $A_3$, and trigger signal, t, to agent $A_1$. This would cause agents $A_2$ and $A_3$ to forward to agent $A_1$ the trigger signal t sent to them by OLD and NEW. This would complete one cycle of checking.

At this point, the write-memory of clock-ring $C_1$ would contain only the outputs written into it by OLD. Thus, when agent $A_1$ forwards this to its next agent on clock-ring $C_1$ there would be no trace of testing that had been done. Computations in the application system would proceed undisturbed by the testing operations, except for some delay. Successive cycles of checking and reporting, on successive inputs, would repeat until computations performed by OLD and NEW had been satisfactorily checked.

After testing of NEW had been satisfactorily completed, the following components in FIG. 9 may be deleted: OLD and the watch-ring connecting it agent $A_1$, and all components inside the dotted line enclosure in FIG. 9, except NEW and the watch-ring connecting it to $A_1$. This would leave NEW to take over the tasks that were previously being performed by OLD. Application systems could thus be updated without service interruption, except for some delays.

This kind of dynamic updating of an application system may be done at any time during the lifetime of a system. The most significant feature of this whole process is that application objects do not have to be a prior designed and implemented to accommodate such updating. A system could evolve during its lifetime through repeated applications of this kind of dynamic updating processes.

1.16. TICC Abstractions and CCL

The lowest level TICC abstraction is, "X(x)→Y;". It stands for, "cause X to send control signal, x, to Y". Here X and Y are both names of agents, or one is the name of an agent and the other is the name of a port, or both of them are names of ports, or one is name of an object and the other is the name of a port that is attached to the object. X and Y are referred to as signal processor variables. A signal processor type (SP-type) is associated with it. There are five SP-types in TICC: One type of Port, three types of Agents and one type of Object. A port is a simple 2-state sequential machine, with states idle and busy. An agent tuned to n ports is an (n+1) state sequential machine: idle, busy-0, busy-1, . . . , busy-n, where busy-i is the state in which it had received completion signals from i of its n ports. In the causal statement, "X(x)→Y;", the symbol, x, is the signal variable. A signal type (S-type) is associated with each signal variable. There are four different S-types in TICC: start (s), trigger (t), do not switch (d), and halt (h). We have already seen use of these signals to coordinate message exchanges between ports. The signaling context will determine the type of signal that may be exchanged In that context. The signaling context itself is determined by the states, say (S1, S2), of the pair (X, Y) in "X(x)→Y;". This enforces correct temporal coordination.

In each state agent and port sequential machines will receive and send out signals of only particular, a priori specified signal types. When a receiving port or agent sequential machine receives a signal of the type it is expecting, it will perform a state transition to its next state, reset its inputs and may send out specified types of control signals to an agent, port or object with which it is communicating. The next state will be such that the S-type of signals it expects to receive in the next state will always be the S-type of actual signal that it would receive. Thus, once all agents, ports, and objects are started with the right initial states they will step through successive states in which they will always be exchanging synchronously the right types of control signals with each other in the right contexts. Thus no run time type checking will be necessary. The manner in which agent/port sequential machines change states will automatically enforce temporal coordination, once all of them are started with their right initial states. Thus, no run time context checking is necessary either. Actions caused by the above causal statement in the various cases are described below.

Between Port and Agent X is a port and Y is an agent, or vice versa. The meaning of X(x)→Y requires that X may send signal x to Y only if the right signaling context exists. This will force correct temporal coordination and self-synchronized message delivery. In our implementation, the right signaling context is guaranteed by the tuning process. If X and Y are tuned to each other (i.e. listening to each other) then X will simply send signal x to Y without having to check the signaling context. Because of the way ports and agents were initialized and the way they change their states, the signaling context will always be correct. This is a property of our implementation. It is not a part of the semantics of causal statements. Correct signaling contexts in every control signal exchange in TICC will ultimately enforce correct temporal coordination of message exchanges. If signaling context is not correct (like, for example, when updates are being done) then execution of the statement will wait for the right context to arise and then cause X to send signal x to Y. If X is not already tuned to Y, then X and Y will first be tuned to each other by establishing a watch-ring connection between them, if such tuning is possible as per application system security and connectivity rules, and then the signal x will be sent.

In all cases, if it is determined that connection between the signaling entities cannot be established (a security or rule violation) or the right signaling context will never appear (a failure), then the statement will fail to execute and a failure or security violation signal may be generated.

X and Y are both agents. If a clock-ring connection between them exist already then X will send signal x to Y only if the right signaling context exists. If a clock-ring connection does not exist, a new clock-ring connection between them may be established, if application system security allows it, and then X may send x to Y. Else, the statement will wait for the right signaling context to appear and then cause X to send x to Y. If a new clock-ring has to be established then it might take about 150 CPU cycles. Once established, a clock-ring will continue to exist unless explicitly removed. In more than 75% of cases, needed clock-ring connection will already exist.

X or Y is an object: In this case, either the sender or the recipient should be a port and the object should be the parent object of the port. If the sender is a port then the parent object will absorb the signal the next time it polls the port. The only type of signal that a port will send to its parent object is the start signal, s. This will inform the parent object that a new message is waiting for it in its read-memory. Its message will remain protected in its designated read-memory until it has been fully read and absorbed. A parent object may send only completion signals to a port that is attached to it. If sender is the parent object then the port will be ready to receive the completion signals. This will happen only if parent object had first received a start signal from the port at an earlier time and had completed doing whatever it had to do. Port and parent object will exchange control signals through shared variables.

X and Y are both ports: Here X and Y should be ports attached to different objects and the statement, X(s)→Y, will cause the following three basic statements to get executed in sequence: X(c)→A1; A1(s)→A2; A2(s)→Y; where A1 and A2 are agents. A1 will be tuned to a port X, A2 will be tuned to a port Y, and both A1 and A2 will be attached to the same clock-ring. Here c is the completion signal and s is the starting signal. If TICC-pathway between X and Y does not already exist, then A1 and A2 will be newly created agents with newly created clock-rings connecting them, and newly created watch-rings tuning them to their respective ports. This statement represents the event where the parent object of port X sends a message to the parent object of port Y, via X and Y. In Chapter 2 we make use of statement "@(c)→P" where @ is the parent object of port P to initiate the signal transfer sequences, $P(s) \rightarrow Y_1$, $P(s) \rightarrow Y_2$, . . . , $P(s) \rightarrow Y_k$, where $Y_i$ for i=1,2, . . . , k are all ports connected to P via TICC-pathways.

If O[P1] is the parent object of port P1 and O[P2] is the parent object of port P2 then, O[P1](s)→O[P2]. stands for the following sequence of events, O[P1](c)→P1; P1(c)→A1; A1(s)→A2; A2(s)→P2; P2(s)→O[P2]; where A1 is tuned to port P1, A1 and A2 are on the same clock-ring and A2 is tuned to port P2.

It should be noted, this statement O[P1]→O[P2], would get successfully executed only if it did not violate an application system's security, and both type constraints and timing constraints were satisfied: '→' thus represents a causal relationship between its left and the right sides. The meaning of these causal statements requires synchronization in order to get the right signaling contexts, security, and temporal coordination. This feature makes causal statements of this kind different from an assignment statement. The meaning of assignment requires only type constraints to be satisfied. There is no temporal coordination involved. These causal statements make it possible to integrate programs of communication with programs of computation.

In this patent application, we make use of only statements of the form, "@(c)→P". TICC design presented here can accommodate all the causal statements introduced above. It is up to a system implementer to decide what kinds of causal statements to include in a programming facility. The choice of causal statements does not alter the claims made in this patent application. TICC shows how causal statements like these can be interpreted and compiled in a manner, which is always self-synchronizing and can be executed in parallel with computations.

A communications programming language using these basic abstractions may contain If/Then/Else and While statements, and statements for parallel executions. The syntax used to assert the causal statements, the particular collection of causal statements chosen to express communication related and TICC pathway related tasks, are not pertinent to this patent. What is important and pertinent are the methods presented in this patent application, which make it possible to give a deterministic interpretation to causal statements of this kind and cause loss less, buffer less, self-synchronized asynchronous communication to occur among groups of objects, in parallel with computations.

A TICC-net will be a collection of TICC-pathways. If computations are started in a TICC-based application system with all agents, ports and objects in their correct initial states, in mutually consistent signaling contexts, then all subsequent signal exchanges in the application system will always have the right consistent signaling contexts, provided that the following hold:

No application system security violations have occurred;
No system failures have occurred; and
There are no programming errors.

This is because, as mentioned earlier, events caused by "X(x)→Y", will force X to always transfer itself to a next state in which it will be expecting the next signal that Y or some other entity might send back to it at a future time.

A design for TICC implementation is presented in the next chapter. In this design, we present methods not only for implementing asynchronous communications in parallel with computations, but also methods for incorporating security enforcement facilities, and self-monitoring facilities that may detect and repair system failures, in TICC-based application systems. Details of the design are described in the programming language LISP. This makes it possible to present the design at a level of detail, which can be readily used to generate a practicle implementation for TICC. It should be mentioned; the programs presented in Chapter 2 do not provide an implementation for TICC. They only present a design for TICC implementation. Their purpose is purely pedagogical. We have chosen this descriptive methodology because it is precise and because it makes it possible to cover all design details in a thorough manner. Knowledge of LISP is assumed (See LISPcraft by Robert Wilensky, [Wilensky 1984], or Common LISP by Guy Steele [Steele 1990]).

Chapter 2: Design for TICC Implementation Described in LISP 2.1. The Basic Plan

In the following we assume that application objects will come with TICC-ports attached to them. Each object may have several ports attached to it. We do not consider here communications between a port and its parent object. It is internal to object design and implementation. It is assumed that methods in each object would be written in such a manner that the object would periodically poll every one of its ports and would not miss any. The object might do this in a round robin manner or in any other manner, as controlled by threads that drive its methods. Objects will perform all their input/output operations only through their ports. We will say a port and its parent object are tuned to a clock-ring if the port is tuned to an agent on the clock-ring. Each port will contain methods for reading and writing into memories of clock-rings to which it is tuned. When requested by its parent object, a port will read messages from the read-memory of its clock-ring and deliver the messages to its parent object. So also when requested by its parent object, a port will write messages specified by the parent object into the write-memory of the clock-ring to which the port is tuned. We do not discuss here methods for allocating memories to clock-rings and methods that ports may use to read from and write into the memories of the clock-rings to which they are tuned. A port may read and write only in the range of starting and ending addresses of memories allocated to the clock-ring to which it is tuned. Any state of the art method may be used to accomplish these tasks. The unique features that pertain to TICC-ports are the properties associated with them and the manner in which they are tuned to (detuned from) their respective agents. These are described here in the LISP programs associated with TICC-ports.

We will use symbol C to refer to the TICC communications processor. As explained in Chapter 1, C is used to execute agent/port and port/agent control signal exchange protocols. The protocols that C executes in sequence will correspond to sequences of control signal exchanges that occur along TICC pathway segments, in order to deliver messages to intended recipients. For a message transfer request, m, generated by an application object B, let $S_m$ be the sequence of agent/port and poryagent control signal exchange protocols, which had to be executed in order to deliver messages to their intended recipients. As mentioned in Chapter 1, we refer to such protocol sequences, $S_m$, as segments; they correspond to TICC-pathway segments that are used to deliver messages. Generally, execution of protocols in segments $S_m$ will cause messages in request, m, to be delivered to a group of intended receivers, if agreement protocol is satisfied. If an agent had n ports tuned to it then there will be n segments. $S_{m1}, S_{m2}, \ldots, S_{mn}$, each with (n+3) protocol functions, which will have to be executed before message is delivered. As we shall later see below, at times, when monitor agents are attached to watch-rings of agents the number of protocol functions in a segment will exceed (n+3).

Successful delivery of messages associated with a message transfer request, m, will require all of the following to be successfully executed:
1. Construction of protocol segments $S_{m1}, S_{m2}, \ldots, S_{mn}$
2. Delivering $S_{mi}$ to the communications processor C, and
3. Successful execution of protocol functions in $S_{mi}$ by C.

A protocol function f in a segment $S_{m1}$ is said to be pending until the time C completes executing it. A segment $S_{mi}$ is said to be pending if C had not completed executing $S_{mi}$. If $t_s$ is the time a message transfer request m was made, and $t_d$ is the time at which all protocol functions in $S_{mi}$ were executed, then $(t_d-t_s)$ will be the latency encountered in the message transfer. The basic steps involved in estimating this latency were introduced in Chapter 1. Also, the basic concepts involved in executing the above three operations were introduced in Chapter 1. Details of their operation will be discussed here. It is useful to first summarize the overview presented in Chapter 1.

Pending segments are presented to communications processor C in a list called pending-lst. Each application processor X in a multi-processing system will have a unique pending-lst, X-pending-lst, associated with it. This X-pending-lst will contain segments $S_{mi}$ corresponding to message transfer requests m, which were generated by objects in processor X, in the order of their generation. Let PLs be the list of all pending-lsts PLs=(X$_1$-pending-lst, X$_2$-pending-lst, . . . , X$_N$-pending-lst), of application processors (X$_1$, X$_2$, . . . , X$_N$) in a multi-processing system.

Every time an object in a processor X issues a message transfer request m, a segment $S_{mi}$ corresponding to message transfer request, m, will be appended by X not to its pending list X-pending-lst, but to a different list, called X-pl-upd-lst (pending-lst update list). Just as every processor X has a unique X-pending-lst associated with it, it will also have a unique, X-pl-upd-lst, associated with it. When C completes executing all the segments in X-pending-lst, it will become empty. At that time, C will check whether a semaphore, $s_x$, associated with processor X, is NIL. If it is NIL, then C will copy segments from X-pl-upd-lst into X-pending-lst and set the semaphore $s_x$ of processor X, to T. Otherwise it will skip copying. If X-pl-upd-lst was copied into X-pending-lst, then this semaphore $s_x$ will inform X that contents of X-pl-upd-lst had been copied. Next time processor X tries to append a new segment $S_{mi}$ to X-pl-upd-lst, it will notice that the flag $s_x$ is equal to T. At that point X will destroy the old list X-pl-upd-lst, install a new list X-pl-upd-lst in the same place as that of the old X-pl-upd-lst, append the new segment $S_{mi}$ to the new X-pl-upd-lst, and then reset $s_x$ to NIL. This producer/consumer scheme is used for every processor, X. This scheme, as coordinated by the semaphore $s_x$ for each processor X, will keep C and X from interfering with each other, for all X.

For each X-pending-lst in PLs, the communications processor C will perform two tasks:

Task 1: Empty X-pending-lst by sequentially executing the segments in the order of their appearance in X-pending-lst and removing the segments from X-pending-lst after execution; and Task 2: Replenish X-pending-lst with new pending segments from X-pl-upd-lst, and continue with Task 1 above.

Each processor X will be responsible to append to X-pl-upd-lst all pending-lsts corresponding to message transfer requests generated by all objects in X. Receivers of messages associated with such communication requests may be distributed in any manner among all processors in application systems.

A processor X will append a segment $S_{mi}$ to X-pl-upd-lst, every time an object, B, in processor X executes a causal statement of the form mi: @(c)→P, in its source code; @ here is the self-reference variable that is used by object B to refer to itself, and mi is a label associated with the causal statement. By executing this statement object B would tell its port P the following:

"I have completed my tasks and there is a message in your write-memory, which needs to be transmitted to its recipients. Please cause this to happen."

The signal, c, in causal statement mi is the completion signal, which may be t, d or h. For each such causal statement, mi: @©→P, in the source code of an application object, the TICC-compiler will generate and put in place, object code corresponding to the following two LISP statements:

mi$_1$: (SETQ @-c-P c)

mi$_2$: (GET-SEGMENT-OF-PORT (PROCESSOR-OF @) P)).

A TICC compiler has thus two tasks to perform: Isolate statements of the form "mi: @(c)→P," in program specifications containing mixed computation and communication statements, and put in place compiled code corresponding to statements mi$_1$ and mi$_2$ above in that order. The SETQ statement mi$_1$ will set the control signal variable @-c-P to c, where c can be t, d, or h. @-c-P here is the control signal variable shared by @ and P, where @ is the parent object of P. The function, (GET-SEGMENT-OF-PORT (PROCESSOR-OF @) P) will construct the necessary sequence of protocol functions, which would have to be executed in order to cause the requested message transfer to occur, and present it to the communications processor. The first protocol function in this sequence will be the function, P-Cfn, of the port mentioned earlier in Chapter 1. Port P will sense that @-c-P=c only when this protocol function, P-Cfn, for receiving @-c-P, is executed by the communications processor C. Thus there will be a delay between the time B sets @-c-P to c and the time port P senses this. This delay will be a part of latency associated with this message transfer. It will amount to the time consumed by (GET-SEGMENT-OF-PORT (PROCESSOR-OF @) P) function and the time taken to empty all segments, which were already pending in X-pl-upd-lst and X-pending-lst before $S_{mi}$ was appended to X-pl-upd-lst. Maximum, average and minimum latencies that may occur in TICC were analyzed in Section 1.5 of Chapter 1.

Immediately after setting @-c-P to c, object B will execute the function, (GET-SEGMENT-OF-PORT (PROCESSOR-OF @) P) in statement mi$_2$ above. The processor of @ will execute this function. Processor of @ also appears as an argument of GET-SEGMENT-OF-PORT. Every object, method and function in TICC will have a processor assigned to it and (PROCESSOR-OF @) is the function which a method or function may use to identify its processor. Let us say, (PROCESSOR-OF @)=X. Execution of this GET-SEGMENT-OF-PORT function by X will cause segment $S_{mi}$ associated with the causal statement, mi: @(c)→P, to be computed and appended to X-pl-upd-lst $S_{mi}$ will be computed afresh only if its associated pathway had changed since the last time it was used. This will happen only infrequently. As mentioned in Chapter 1, time needed to execute (GET-SEGMENT-OF-PORT (PROCESSOR-OF @) P) will be comparable to the time needed to execute one complete segment. Eventually, when C empties the pending list X-pending-lst, and replenishes it with segments from X-pl-upd-lst, this segment $S_{mi}$ will get presented to C. This cycle of activities performed by C will continue indefinitely until terminated by setting HALT-DRIVER flag to T.

This is the basic plan for implementing TICC, the technology for integrated computation and communication Details on this and special adaptations that are unique to TICC are presented in the ensuing sections. It may be noted that we use here only one CCL statement, "@(c)→P." This is enough to illustrate the basic idea and implementation details. One may embellish the CCL language that one uses with other kinds of CCL statements to dynamically install and remove pathways and their components, embellish them with "if-then-else", "when," "parallel" and "While" clauses.

A full repertoire of CCL language statements will only evolve with experience and use. Just as assignment led ultimately to a whole repertoire of language statements in programming languages, the basic causal statements introduced here would eventually lead to a repertoire of CCL statements that are useful and commonly used.

2.2. Functions Executed by Communications Processor, C

As mentioned earlier the implementation presented below is intended only for pedagogical purposes. It is not fit to be used in application systems. We chose this method of presentation, because it is easier then to present the precise design for implementation at many levels of detail.

Functions presented below naturally fall into three groups: The CSM group (functions in this group are executed by application processors X), the TICC-Driver group (these are executed by C), and Security Enforcement group (functions in this group are also executed by C), There are only three functions in the TICC-Driver group. They are, SEGMENT-DRIVER, TICC-DRIVER, and UPD-PENDING-LST, which are reproduced below for convenience:

```
F177.(DE SEGMENT-DRIVER (segment)
      ;/Segment is a list of protocol functions. Evaluates the protocol
        functions in the segment in left to right order. At any point in
        the evaluation, continues evaluation only if the last evaluated
        function returns T. Returns NIL./;
      (LOOP WHILE (EVAL (CAR segment)) DO (SETQ segment (CDR segment)))
      NIL]
F178.(DE TICC-DRIVER ((Appln Current-appln)
                    (processors (GET-PROCESSORS Appln)))
      /;Appln is the name of an application. "Processors" is the list of
        processors being used in the application. Initializes the
        pending list, X-pending-lst to (NIL . X), for each processor X
        and then calls UPD-PENDING-LST to replace NIL in (NIL . X) by
        pending segments of processor X. Then for each segment of each
        X-pending-lst calls SEGMENT-DRIVER to execute the segment. After
        all the segments in X-pending-lst are executed, empties this
        list. Then calls UPD-PENDING-LST to replenish X-pending-lst with
        pending segments, which might have since accumulated in X-pl-upd-
        lst and continues operations all over again./;
      (PROG ((PLs (MAPCAR (FUNCTION (LAMBDA (X) (CONS NIL X)))
                          processors)))
            ;/This initializes the pending list, X-pending-lst, of each
              processor, X, to the form (NIL . X)./;
          (MAPC (FUNCTION (LAMBDA (pl) (UPD-PENDING-LST pl))) PLs)
            ;/MAPC presents pending-lst pl of each processor X to UPD-
              PENDING-LST in the order they appear in PLs. Each pl that
              is presented to UPD-PENDING-LST will be of the form (NIL.
              X), where X is a processor. UPD-PENDING-LST replaces NIL
              in (NIL . X) by the list of pending segments in X-pl-upd-
              lst of processor X, and sets the semaphore of processor X
              to T. After this replacement, pl will have the form ((S_m1
              S_m2 ... S_mk) . X), where (S_m1 S_m2 ... S_mk) is the list of pending
              segments that are being presented to C by processor X./;
          (LOOP WHILE (NULL HALT-DRIVER) DO
              (MAPC (FUNCTION (LAMBDA (pl)
                  (MAPC (FUNCTION (LAMBDA (seg)
                              (SEGMENT-DRIVER seg)))
                        (CAR pl))
                  (RPLACA pl NIL)
                  (UPD-PENDING-LST pl)))
                PLs))
            ;/ There are two MAPC functions here, the outer MAPC and the
        embedded MAPC. The outer MAPC presents each pl in PLs to the
        embedded MAPC. Each pl in PLs will initially be of the form ((S_m1
        S_m2 ... S_mk) . X), where X is a processor and S_mi's are segments of
        protocol functions that are pending to be executed. (CAR pl) = (S_m1 S_m2 ... S_mk).
        The embedded MAPC presents each segment, S_m1, in
        (CAR pl) to the SEGMENT-DRIVER. When all segments in (CAR pl) have been
        executed, the outer MAPC function sets (CAR pl) to NIL
        and calls UPD-PENDING-LST with pl as its argument. UPD-PENDING-
        LST will take pl, which now will have the form (NIL . X), and
        replace NIL with new segments that may now be pending in X-pl-
        upd-lst of processor X. This will bring pl back to the form ((S_m1
```

$S_{m2} ... S_{mk}$). X. After doing this the outer MAPC will present to embedded MAPC the next pl in PLs. This process will continue till all the pl's in PLs are emptied and replenished. Since outer MAPC is repeatedly executed until HALT-DRIVER is set to T, this process will continue for ever until terminated./;]

F179.(DE UPD-PENDING-LST (pl)
;/Pl is a pending list of the form (NIL . X), where X is the name of a processor. If (UPDATEDP X) is T, i.e., the semaphore of processor X is T, then does nothing. Else, i.e., if the semaphore of processor X is NIL, then replaces NIL in pl = (NIL. X), with contents of X-pl-upd-lst and sets the semaphore of processor to T. IL is possible for processor X to append new segments to X-pl-upd-lst during this transfer process, without interfering with the transfer./;
(OR (UPDATEDP (CDR pl))
 PROGN (RPLACA pl (CAR (GET-PL-UPDATES (CDR pl))))
  (PUT-SEMAPHORE (CDR pl) T)]

2.3. Security Enforcement Functions

The five functions in the Security Enforcement group are SECUREP, NOTIFY, CK&SET-AGENT-S-VARS, CK&SET-C-VAR and NOTIFY-VIOLATION. They are presented below with brief comments.

F157.(DE SECUREP (X Y (msg-role 0))
;/Returns T if it is secure for X to send a message to Y, else NIL. Security class of X and Y is a pair at integers (class . role). It is secure if [class-of(X) =< class-of(Y)] or [Class-of(X)-Role-of(X)] =< [CLASS-of(Y) + Role-of(Y) - msg-role]. It may be noted, while X may be able to send a message to Y, Y may not able to send a message to X. Default msg-role value is 0./;
(PROG ((Xsc (GET-SC X)) (Ysc (GET-SC Y)))
 (OR (NOT (GREATERP (CAR Xsc) (CAR Ysc)))
  (NOT (GREATERP (MINUS (CAR Xsc) (CDR Xsc))
   (MINUS (PLUS (CAR Ysc) (CDR Ysc)) msg-role]
F158.(DE CK&SET-S-VARS (agent msg-role)
;/The function, (GET-AGENT-CFNS agent), that is called by this function, returns a list whose elements are of the form (port (agent-Cfn-port) agent-s-port agent-Cfn-port-pending), where agent-s-port is the variable used by agent to send start signal to port. Before setting agent-s-port to T, for each port tuned to agent, this function checks whether security restrictions are satisfied. If they are not then does not set agent-s-port to T, but executes (NOTIFY agent port) to update security violation record and print out a message. If security is satisfied then sets agent-s-port to T. Returns T if there is at least one port to which start signal was sent, else returns NIL./;
(PROG (LV)
 (MAPC (FUNCTION (LAMBDA (W)
  (COND ((SECUREP agent (CAR W) msg-role)
   (SETQ LV (SET (CADDR W) T))
   ((T (NOTIFY agent (CAR W))))))
  (GET-AGENT-CFNS agent)
  LV]
F159. (DE CK&SET-C-VAR (port agent msg-role port-c-agent obj-c-port)
;/Sets port-c-agent to T object-c-port, if security permits. Otherwise notifies security violation and does not set port-c-agent./;
(COND ((SECUREP port agent msg-role)
 (SET port-c-agent obj-c-port))
 (T (NOTIFY port agent)]
F160.(DE NOTIFY (X Y)
;/Prints out a message notifying that port or agent X has attempted to send a message to a prohibited recipient Y. Saves (X Y int) in the global variable Security-violations. Returns NIL. Increases int by 1 for every security violation at X./;
(PRINTMSG "Security violation: " X " trying to send a message to " Y ", in violation of security rules. Message blocked.")
(PROG ((LV (ASSOCQ X Security-violations)) (LV1 (CDDR LV)))
 (COND ((NULL LV) (ATTACH (CONS X Y 1)
  Security-violations))
 (T (RPLACA LV1 (ADD1 (CAR LV1))]

F161.(DE NOTIFY-VIOLATION (X Y)
;/This is used by CSM to notify a violation while setting up a TICC-pathway or modifying an existing pathway. Notifies an attachment violation by X trying to attach to a clock or watch ring Y. Same as NOTIFY except for the message./;
(PRINTMSG "Security violation: "agent "trying to attach to ring " Y ". Attempt blocked.")
(PROG ((LV (ASSOCQ X Security-violations)) (LV1 (CDDR LV)))
 (COND ((NULL LV) (ATTACH (CONS X Y 1)
  Security-violations))
 (T (RPLACA LV1 (ADD1 (CAR LV1))]

The communications processor C executes the first four. Processors X will execute the last one if a security violation is detected while updating a TICC-pathway or establishing a new one. SECUREP is called by CK&SET-S-VARS, which itself is called by start-signal protocol functions of agents, before agents decide to send start control signals to ports that are tuned to them. An agent will send a start control signal to a port only if SECUREP returns T, else message transfer will be blocked and appropriate notification of security violation will be made using the NOTIFY function. Similarly, SECUREP is also called by CK&SET-C-VAR, which is used by a port to check security before sending a completion signal back to its agent. CSM will call SECUREP to check security before they set up pathway connections. CSM uses NOTIFY-VIOLATION to report on attempts by agents or ports to connect to others in violation of security restrictions. Security is thus dynamically enforced in TICC at the innermost levels of every asynchronous message transfer among application processes. It requires no operating system intervention. As mentioned earlier, for each message transfer, this kind of security enforcement will take on the average only as much time as the time taken to execute two signal transfer protocol functions, per port in a group. Thus, when security feature is used in TICC, as mentioned in Section 1.5 of Chapter 1, the average number of protocol functions per message transfer segment will increase from (3n+1) to (5n+1), if groups tuned to agent contained, on the average, n ports. Since TICC cuts message transfer latencies dramatically, one can easily afford this cost. As discussed earlier, even after doubling the time needed for a message transfer, communication latency in TICC will be far less than latencies encountered in other technologies.

Security specification is purely an application system designer's responsibility. TICC takes responsibility for enforcing specified security requirements, and provides the framework and guidelines for application system security specification.

2.4. The Protocol Functions

It is useful at this point to see some examples of protocol functions. Let us get back to FIG. 1 and see what the protocol functions for ports $P_3$, $Q_3$, $R_3$, $T_3$ and A1 and A2 would be. These agents and ports will have the following protocol functions associated with them: Each one of these will have an Sfn (Start Function), and a C-fn (Completion Function) associated with it. For an entity X, these functions will be called X-Sfn and X-Cfn. We will present below the protocol functions, P3-Sfn, P3-Cfn, A1-Sfn, and A1-Cfn-PORT. The protocol function A1-sfn calls the function (A1-PREV-SFN) [A1's Previous Start Fn] and the protocol function A1-CFN-PORT calls A1-NEXT-SFN [A1's Next Start Fn]. The function call (A1-PREV-SFN) is used to by A1-Sfn to sense the start signal, s, sent to it by agent A2 in FIG. 1. Agent A2 uses variable, C-svar, to send this start signal to A1, where C is the dock-ring to which agents A1 and A2 are attached in FIG. 1. This variable is shared by both agents attached to clock-ring, C. Agent A1 uses the function A1-NEXT-SFN to send start-signal, s, to its next agent by setting C-s-var=T, and take other appropriate actions, after A1 senses satisfaction of agreement protocol. The function A1-PREV-SFN is shown below, followed by the other functions:

---

FA1.1. (DE A1-PREV-SFN NIL
;/This returns the value of the variable C-s-var and resets it to
NIL. This is the variable used by agents on clock-ring C in
Figure 1 to pass start signal from one to another. C here is the
name of the clock-ring of an agent A1. All agents on the clock-
ring use the same variable, yet they each have a separate
function defined for them. When an agent is moved together with
all ports tuned to it, only its prev-Sfn would have to be
redefined. It will not be necessary to redefine its start
protocol function. In order to send a start signal to its next
agent, A2, in Figure 1 would set C-s-var to T. C-s-var is used
here as a global variable./;
(PROG1 C-s-var (SETQ C-s-var NIL))]
FA!.2. (DE A1-SFN NIL
;/If C-s-var is T, i.e. (A1-PREV-SEF) returns T, then
transfers A1 to its busy state, issues a call to (CK&SET-S-
VARS ...) and then resets the variable, A1-SFN-pending to NIL.
The function CK&SET-S-VARS does the following: for each port
P tuned to agent A1, if (SECUREP A1 P C-msg-role) is T then
sets the variable A1-s-P to T, i.e. sends a start signal to P.
Else, does not send start signal to P, but notifies a security
violation./;
(AND (A1-PREV-SFN) (PROGN (PUT-STATE A1 'busy)
 (PROG1 (CK&SET-S-VARS A1 C-msg-role)
 (SETQ A1-SFN-pending NIL)]

---

A1-NEXT-SFN is defined as a separate function, for the same reason for which A1-PREV-SFN was defined as a separate function. This makes it easier to move an agent from one clock-ring to another, together with all ports tuned to it, without having to redefine all its protocol functions.

---

FA1.3. (DE A1-NEXT-SFN NIL
;/This is called by A1-Cfn if agreement protocol is satisfied.
Takes appropriate action in response to satisfaction of
agreement protocol, as explained in Section 1.10 of Chapter 1.
C is the clock-ring of agent A1. Uses global variables, A1-
CT, A1-CD, A1-CH, and C. If A1-CT is T then switches memories
of C and sets C-s-var to T, in order to send a start signal to
its next agent. If A1-CD is T then does not switch memories -continued of C, but sets C-s-var to T. Otherwise does not set C-s-var
to T; it will keep its old value, NIL. Returns the value of
C-s-var./;
(COND (A1-CT (SWITCH-MEMORIES C)
 (SETQ A1-CT NIL)
 (SETQ A1-CD (SETQ A1-CH T))
 (SETQ C-s-var T))
 (A1-CD (SETQ A1-CH T) (SETQ C-s-var T))
 (A1-CH (SETQ A1-CD T) (SETQ C-s-var NIL)))
(PUT-STATE A1 'idle)
C-s-var]
FA1.4. (DE A1-CFN-P3 NIL
;/Depending on the value of the completion signal, c, received
from port P3 that is tuned to it, this function of agent A1
takes different actions. If agreement protocol is satisfied,
calls A1-NEXT-SFN to take appropriate actions; otherwise, does
not. A1 and P3 share the completion signal variable P3-c-
A1./;
(SELECTQ P3-c-A1 (T (SETQ A1-CD NIL) (SETQ A1-CH NIL)
 (SETQ A1-CTT))
 (D (SETQ A1-CH NIL))
 NIL)
(AND A1-CH (SETQ A1-CD NIL))
(SETQ P3-c-A1 NIL)
(SETQ A1-Cfn-P3-pending NIL)
(AND (EQ (#OF-PORTS A1) A1-#-completed)
 (PROGN (SETQ A1-#-completed 0)
 (A1-NEXT-SFN))]

---

In the above function the following variables associated with agent A1 are used as global variables:

A1-CD, A1-CH, A1-CT, A1-Cfn-P3- pending, A1-#-
 completed and P3- c-A1.

The variables A1-CD, A1-CH, and A1-CT are used to check the three different cases of agreement protocol satisfaction, explained in Section 1.10 of Chapter 1. A1-#-completed is the number of ports that had already sent completion signals. When this becomes equal to (#OF-PORTS A1), A1 will sense satisfaction of agreement protocol. At that point A1-#-completed will be reset to 0 and A1-NEXT-SFN called, to take appropriate actions.

Now let us proceed to take a look at P3-SFN and P3-Cfn. In P3 SFN, the variable, A1-s-P3 is shared by P3 with its agent A1, and the variable P3-s-O1 is shared by P3 with its parent object, O1. By setting P3-s-O1 to T, P3 will send a start signal to its parent object O1. By sensing A1-s-P3, P3 will recognize the start signal sent to it by agent A1.

---

FP3.1. (DE P3-SFN NIL (AND A1-s-P3 (PROGN (PUT-STATE P3
 'busy)
 (SETQ A1-s-P3 NIL)
 (SETQ P3-Sfn-pendinq NIL)
 (SETQ P3-s-O1 T)]

---

In P3-CFN presented below, P3 tests variable O1-c-P3 to sense the completion signal sent to it by its parent object O1. Calls CK&SET-C-VAR to set P3-c-A1 to O1-c-P3 if security permits it. Returns P3-c-A1. C-msg-role in CK&SET-C-VAR is the variable that holds the "role number" associated with message in the write-memory of clock-ring C in FIG. 1.

---

FP3.2. (DE P3-CFN NIL
 (AND O1-c-P3
 (PROGN (CK&SET-C-VAR P A1 C-msg-role P-c-A1 O1-c-P)

-continued

```
(SETQ O1-c-P3 NIL)
(PUT-STATE P3 'idle)
(SETQ P3-CFN-pending NIL)
P3-c-A1]
```

These protocol functions, without security enforcement, would take, on the average, no more than 15 CPU cycles to execute and take an additional 30 CPU cycles per port, to enforce security.

2.5. Building Self-Monitoring Autonomous Systems

We begin with a simple protocol that will enable an application system to dynamically and constantly monitor the performance of each one of its objects at every one of its ports, and sound an alarm whenever the object takes unusually long time to respond to inputs received from any of its ports. We will refer to this protocol as health-protocol. Every port may be set up to send an alarm, based on timeout, if an expected completion control signal does not arrive from its parent object with in a specified time. Also, health-protocol may used to dynamically monitor the state of each object in an application system and report poor performance or locate impending failures before they happen, if properly implemented. All of this may be done in parallel with on going computations without interfering with them, at very little additional cost.

In order to do this, it is best to assign one processor to execute the health-protocol. If C is used for this purpose also then it may cause two or three fold increase in communication latencies. Let H (for Health-check) be the processor that executes health-protocols. We are considering here multiprocessing systems with 100 or more processors. Therefore, assigning one more of these (about a hundredth of available resources) to another specialized dedicated service is not much of a cost. Health-protocol is set up as follows: In the following Op is the parent object of port P.

Associate with every port, P, a property called P-status. P-status will be a list with three elements: P-status=(P-alarm $O_P$-check P), where P-alarm is a list of the form, P-alarm= ((0 . T) . P-bound) and $O_P$-check is a function specifically designed to check the performance of $O_P$ at port P. P-bound here is a measure of the maximum time that $O_P$ might take to process inputs received from P. The application object containing the function $O_P$-check will have a dedicated port, which will be permanently connected through a TICC-pathway to a dedicated port, called the diagnosis port (like state port used in Section 1.14) of object $O_P$. $O_P$-check will be responsible not only to check the performance of $O_P$, but it will also be responsible to initiate all communications with the diagnosis port of $O_P$ and execute all protocol functions pertaining to these communications. Thus, none of the computations and communications initiated by H will interfere with computations by application processors X, or communications being performed by C. If an object O had k ports, $P_1, P_2, \ldots, P_k$ then there will be k P-status lists $P_1$-status, $P_2$-status, ..., $P_k$-status associated with object O, where $P_1$-status will be ($P_1$-alarm $O_{P1}$-check $P_1$).

Health-protocol will be a list that contains the P-status list of every port P in an application system. Processor H will execute this health protocol list as described below.

Let us consider again the port P3 whose protocol function, P3-Sfn, was presented in the previous section. As we saw earlier, the parent object of port P3 will receive a start control signal from P3 when the start-protocol function of P3, P3-Sfn, is executed. The following additional feature may be added to this start-protocol function. Every time P3 sends a start signal to its parent object it will reset T in its P3-alarm=((0. T). P3-bound) to NIL. Thus, after this resetting, P3-alarm will be equal to (((0. NIL). P3-bound). We will refer to this as the alarm initialization process. This process will take no more than 2 or 4 memory cycles to execute. For the port P3, its P3-SFN may now be modified as shown below to include this additional initialization operation:

```
FH.P3.1. (DE H-P3-SFN NIL
    (AND A1-s-P3 (PROGN (PUT-STATE P3 'busy)
                        (RPLACD (CAR P3-alarm) NIL)
                        (SETQ A1-s-P3 NIL)
                        (SETQ P3-Sfn-pending NIL)
                        (SETQ P3-s-O1 T)]
```

The additional statement added to perform the required initialization of P3-alarm is shown in bold letters in the above function. The variable P3-alarm is used here as a global variable.

After sending the start signal to its parent object $O_P$, port P would wait to receive a completion signal, c, from $O_P$. As mentioned earlier, the parent object of P will send completion signal to P by setting the variable, @-c-P to T and executing the function GET-SEGMENT-OF-PORT. This function may now be set up to do one additional operation: It will reset the NIL in P-alarm, defined above, to T, by using the statement, (RPLACD (CAR P3-alarm) T). However, as we shall later see, by the time $O_P$ resets this NIL to T, the zero in the P-alarm might have increased its value to some integer, i.

There are two events that occur here. The first event, say event $E_1$ (P), occurs when P-alarm is initialized to ((0. NIL). P-bound). As mentioned earlier, this will happen at the time P sends start signal to its parent object. The second event, say event $E_2$ (P), will occur when the parent object of P sends its completion signal to P. At that time P-alarm will become equal to ((i. T). P-bound), for some integer, i. The elapsed interval between the two events, $E_1$ (EP) and $E_2$ (P), will be the time taken by $O_p$ to process inputs it received from port P, and the integer i would be a measure of this interval. This would happen as follows.

The processor H, we will have two functions HEALTH-MONITOR and HEALTH-CHECK. The argument of HEALTH-MONITOR will be the health-protocol, introduced above and the argument of HEALTH-CHECK will be the element, ps (for P-status), in health-protocol. Unlike pending lists used by C, health-protocol will not require any updating. These functions are defined below.

```
FH.2. (DE HEALTH-MONITOR (health-protocol)
    (LOOP WHILE (NULL HALT-HEALTH-CHECK) DO
        (MAPC (FUNCTION (LAMBDA (ps) (HEALTH-CHECK ps)))
              health-protocol]
FH.3. (DE HEALTH-CHECK (ps)
    (PROG ((LV (CAAR ps)) (BOUND (CDAR ps)))
        (AND (NULL (CDR LV)) (RPLACA LV (ADD1 (CAR LV))))
        (AND (GREATERP (CAR LV) BOUND)
            (PROGN (SOUND-ALARM P) (APPLY (CADR ps) ps))]
```

The MAPC function here presents each P-status, ps, in health-protocol to the function HEALTH-CHECK. Each ps will be equal to a list of the form (((i. TV). P-bound) $O_P$-check P), for some integer i>=0, some truth-value TV=T or NIL, and for some upper bound, P-bound, on the maximum time $O_P$ might take to complete processing inputs it received from port P. In practice P-bound may be determined through trial runs. Variables LV and BOUND in HEALTH CHECK are local variables. For each ps, LV=(CAAR ps)=(i.tv) and (CDR LV)=TV=T or NIL, BOUND=(CDAR ps) will be the P-bound. If (CDR LV)=NIL then it would mean that the parent object of P is still busy processing inputs it received from P. In this case HEALTH-CHECK increments the integer i=(CAR LV) by 1. If after this increment the value of integer i exceeded the bound then an alarm is sounded. It is up to the system implementer to decide what form this alarm should take. After sounding the alarm the function evaluates $O_P$-check taking ps as its argument. Evaluation of this function may cause the HEALTH-CHECK to communicate with object $O_P$ through its diagnosis port and take appropriate actions to remedy the situation as necessary. Again, it is up to the system implementer to decide what actions might be taken by $O_P$-check. The MAPC function in HEALTH-MONITOR repeats itself indefinitely as long the HALT-HEALTH-CHECK flag is NIL.

It may be noted; this is just one way to use the HEALTH-MONITOR. A variety of alternatives are possible to effectively use this TICC facility to monitor, protect, diagnose and repair a system before it fails, or even after it fails. The important point to note here is that TICC provides a mechanism to incorporate into an application system facilities to dynamically monitor and repair itself at little cost to the system and without robbing the system of its processing time and resources devoted to application tasks.

There are significant advantages one gains by incorporating this kind of dynamic monitoring facility into an application system. One buys enhanced reliability. In a sense one can make the application software become self-aware by using this feature in the right manner. An application software may use this feature to detect objects which perform poorly, or which are likely to fail, and dynamically replace them with new instances of those objects or modified versions of those objects. With proper design, TICC communication pathways spreading out of the various $O_P$-check functions to diagnosis ports of application objects may be made to function like the autonomous nervous system of an organism. This can be extremely valuable. It can protect critical software systems from failures and dramatically increase lifetimes of software systems. This can be particularly useful for software systems used in space vehicles, industrial processes, banking systems, stock market trading systems, health care systems, etc.

To the best of our knowledge, only TICC is capable of providing facilities to incorporate this kind of autonomous feature, where no operating system intervention is necessary to detect, set off alarms and potentially also prevent failures. In order to maintain simplicity we did not include this feature in the programs presented below.

2.6. Organization of LISP Functions

Functions in LISP description of TICC design are organized in to following groups:
  Variable Declarations
  Clock-ring Representation and Functions
  TICC-Agent Representation and Functions
  Watch-ring Representation and Functions
  TICC-Port Representation and Functions
  Predicates Relating Agents, Ports, Watch-rings and Clock-rings.
  Properties of Application, Processor, and Object.
  Functions used for Security Enforcement.
  Functions that Define Signal Exchange Protocols.
  TICC-communication Processor Functions
  Functions for Creating and Updating Segments and Pending Lists.
  Functions to Create, Install, and Remove Pathway components.
  Destroy Functions for Pathway Components
  Pathway Creation and Destruction Functions
  Miscellaneous Functions Functions in some of the above categories are further classified into the following sub-subgroups:
  Property-list Access and Updating Functions
  Other Functions and Predicates There are in all 265 functions. Description of a complete implementation may require about 20 or 30 more functions. But they are not essential for the pedagogical purpose intended here. They would define a complete set of API, which is not done here. But all the necessary basic functions necessary to define a suitable API are here. The design presented here may be used to define a suitable set of command language statements for API and to develop a graphical user interface for manipulating TICC pathways. Details of API design are not important for the elucidation of how TICC might be implemented. API provided to users may change with time, but the basic design for implementation presented here will endure.

Most of the functions, excepting the few already presented above, pertain to bookkeeping related to TICC-pathway establishment, removal and maintenance, segment and pending list creation and functions that define protocol functions. These belong to the communications processor, CSM.

Each processor may have one or more instances of CSM. Each such CSM instance, and every CSM function in each instances, would have a self-identity, which it may use to refer to itself from inside its own programs. This is the identity @ we used above. Every such program would also have the information available to it, to know the processor to which it had been assigned, i.e., the processor that executes its code. Thus it becomes possible to use the function (PROCESSOR-OF @) from inside any CSM function. The LISP functions presented below, taken together, specify a design for implementing TICC. They also illustrate all mechanisms of TICC at a level of detail that is necessary to implement them.

Yet the program presented below could not itself be used to incorporate TICC in an application systems for the following two reasons: (i) It is not the most efficient implementation of TICC, and (ii) it does not provide a convenient set of API (Application Program Interface). Thus the program serves only a pedagogical purpose. It is not being presented here as an implementation of TICC, only as description of a design for TICC implementation. What is being patented here is not this program, but TICC methods it illustrates, the methodology for realizing integrated communication and computation, and methods by which the many unique and specialized TICC facilities are realized.

The LISP description of TICC design begins with the declaration of SPECIALS (global variables) and UNSPECIALS (local variables) in the system, According to the declaration below ALL variables are SPECIAL, excepting those that have been specifically declared as being UNSPECIAL. As new agent/port protocol functions are introduced, variables shared among those functions are declared as being special as and when they are created. When pathway components are destroyed all special variables associated with them are also destroyed.

Comments in function definitions are bracketed by ";/" and "/;" symbols. We have tried to use Common Lisp conventions, but adopted some of our own when we found it suitable for our purposes here and the meaning of what was intended was self-explanatory. The ALLOCATE and DEALLOCATE functions, that are used for clock-ring memory allocation and de-allocation, and READ-MEMORY and WRITE-MEMORY functions that are used by ports to read and write in their allotted memories, may require operating system intervention, which is outside the scope of what is covered here. They have to be coded separately. It is not, however, hard to code them. No technological innovations are necessary. Any state of the art technique may be used to code them.

We have assumed below the standard "property list" LISP implementation, where property lists are represented as LISP lists. We have attempted to keep the level of sophistication as low as possible, so that the LISP descriptions may be easily followed. By changing the access and updating functions of property lists one may easily convert this design to one, which uses arrays to represent property lists.

This patent covers all implementations of TICC whether in hardware or in software, which have one or more of the following characteristics:

1. They use all or some of the following: TICC agents, ports, clock-rings, watch-rings, or their equivalents;
2. They use TICC causal communication statements or their equivalents, in an integrated computation/communication programming language;
3. Use a dedicated communications processor to activate agent/port protocol functions in parallel with computations performed by application processors; and
4. Use a dedicated processor for self-monitoring, diagnosis and repair, in parallel with computations performed by application processors.

2.6.1. Variable Declarations

All variables, except those declared as UNSPECIALS, are special (global) variables. (SPECIALS T) in the declaration below declares all variables as being special. The UNSPECIALS specify exceptions to this general rule. They enumerate the variables that are used as local variables by the functions described below.

(Declare (Specials T)
(UNSPECIALS agent port next prev s-vars X Y W Cr Wr cr wr Memory Lst port-s-obj port-c-agent agent-Cfn-port ring wrs LV LV1 LV2 sc AgPo State type Wrs Agent Port Next Prev port1 Int i-monitor o-monitor agent-Sfn agent-Cfn port-Sfn port2 Port-Cfn next-Sfn fn Sfn Cfn Fn Cfns s-var Sfn-call Atm ps Lst Alst flag Obj Cfns obj i-m1 o-m1 pending CD CH CT seg-vars #completed prev-s-agent agent-s-port obj-c-port name p-vars received-c-signal Name Memory name current memory segment Z Xsc Ysc role msg-role cr-msg-role-var sc Xsc Ysc port-s-var m-port m-agent i-agent o-agent processor appln Tlst, BOUND, Appln tlst p-name processors i-monitor o-monitor size Prev-Sfn next-Sfn cr-s-var PLs pl pending-lst pl-upd-lst health-protocols LV LV1 LV2 ps pl))

The following global variables are initialized as shown:
(SETQ HALT-HEALTH-CHECK NIL)
(SETO HALT-DRIVER NIL)
(SETQ Namc-hash-table (HASHTABLE 65536))
(SETQ Free-agents (NCONS))
(SETQ Security-violations (NCONS))
(SETQ Trivial-functions (NCONS))
(SETQ Free-clock-rings (NCONS))

All TICC-names are registered by entering them in the Name-hash-table.

2.6.2. Clock-ring Representation and Functions 2.6.2.1. Clock-ring Property List Clock-ring property list has the following property names: (read-memory, write-memory, scratchpad, agents, security-class, msg-role-var, n-clock-ring).

Values of properties in property list of Clock-ring: Read-memory property value is the dotted pair (s-address. e-address) where s-address is starting address of the read-memory of the clock-ring and e-address is the ending address, and similarly for the write-memory and scratchpad property values. Memories are allotted in units of 256 words. The default memory size of read/write memories is 256 words. The default memory size for scratchpad is 64 words. Once these memories are allocated, they are moved outside the scope of LISP garbage collector. They can be accessed only by ports that are tuned to their associated clock-ring, until they are released from the clock-ring.

Property value of agents is the list of agents attached to the clock-ring. The clock-ring is the parent clock-ring of such agents. Initially this list will contain only the first agent of the clock-ring. The name of this first agent is always <clock-ring>-Agentl (<clock-ring> here refers to the name of the clock-ring). An object may be tuned to a clock-ring only if it is compatible with the clock-ring, i.e. none of its ports are already tuned to the clock-ring and such a connection does not violate application system security. The descendants of an agent are the monitor agents attached to its watch-rings, or monitor agents attached to watch-rings of descendant agents.

TICC provides communications with dramatically low latencies. Some of the times saved from these low latencies are used here to enforce a flexible, strict and dynamic security environment. The security enforcement scheme used in this LISP description is only an example of the kind of security enforcement scemes, which can be made a part of TICC based application systems. For each application system, a security enforcement scheme specific to that application may be designed and made a part of TICC by defining four functions, SECUREP, CK&SET-S-VARS, CK&SET-C-VARS, NOTIFY and NOTIFY-VIOLATION. The security enforcement scheme presented in this LISP description of TICC implementation has been already described.

The role value of a message in a clock-ring's read-memory is a property associated with the clock-ring. The value of msg-role-var is the name of a global variable, which has the form <clock-ring>-msg-role-var. The value of this variable is an integer, which is the role value of message in the clock-ring's read memory. Objects tuned to a clock-ring may use the scratchpad to agree on a role value to be assigned to messages they wrote in the write-memory before agreement protocol was satisfied. Thus, when the message is sent to next agent, the message role value assigned to contents of write-memory of current agent will become the read-memory message role value for the next agent. The way msg-role value is used in security checking was described in section 2.3 above.

Every TICC name will appear in the Name-hash-table of TICC. Property value of n-clock-ring is the name of the clock-ring. The LISP value of a dock-ring name is the name of its first agent. A clock-ring is said to be bound only if at least one of its agents is tuned to a port. Every clock-ring will have at least one agent. Clock-ring names are usually of the form "CR-<#>-<#>" where <#> is an integer. The first number refers to the processor, which generated the clock-ring, and the second number refers to the number of the clock-ring in that processor. No two clock-rings will have the same name.

A GET and PUT function is defined for each property name. For properties whose values are integers or lists of atoms, appropriate ADD and SUB functions are also defined.

2.6.2.2. Property list access functions for clock-rings

```
F1. (DE GET-READ-MEMORY (X)
    ;/X can be a clock-ring or a port. Returns (CONS s-address e-
        address) where s-address is starting address of the read-memory
        of clock-ring and e-address is the ending address. Default size
        of memory is 256 words./;
    (GETPROP X 'read-memory)]
F2. (DE PUT-READ-MEMORY (X Memory)
    ;/X can be a clock-ring or a port. Memory is the dotted pair, (s-
        address . e-address) where s-address is starting address of the
        read-memory of clock-ring and e-address is the ending address.
        Puts Memory as the value of property "read-memory" of X.
        Default size of memory is 256 words. Returns Memory./;
    (PUTPROP Cr 'read-memory Memory)]
F3. (DE GET-WRITE-MEMORY (X)
    ;/ X can be a clock-ring or a port. Returns (s-address . e-address)
        where s-address is starting address of the write-memory of clock-
        ring and e-address is the ending address. Default size of memory
        is 256 words./;
    (GETPROP X 'write-memory)]
F4. (DE PUT-WRITE-MEMORY (X Memory)
    ;/X can be a clock-ring or a port. Memory is the dotted pair, (s-
        address . e-address) where s-address is starting address of the
        write-memory of clock-ring and e-address is the ending address.
        Puts Memory as the value of property, "write-memory" of X.
        Default size of memory is 256 words. Returns Memory./;
    (PUTPROP X 'write-memory Memory)]
F5. (DE GET-SCRATCHPAD (X)
    ;/Returns (s-address . e-address) where s-address is starting
        address of the scratchpad of clock-ring and e-address is the
        ending address./;
    (GETPROP X 'scratchpad)]
F6. (DE PUT-SCRATCHPAD (Cr Memory)
    ;/Memory is (s-address . e-address) where s-address is starting
        address of the scratchpad of clock-ring and e-address is the
        ending address. Puts Memory as the value of property "scratchpad"
        of Cr and returns Memory./;
    (PUTPROP Cr 'scratchpad Memory)]
F7. (DE GET-N-CLOCK-RING (Cr)
    ;/Returns the name Cr, if Cr is a clock-ring in TICC, else NIL./;
    (GETPROP Cr 'n-clock-ring)]
F8. (DE CLOCK-RINGP (X)
    ;/Returns T if X is a clock-ring, else NIL./;
    (EQ (GET-N-CLOCK-RING X) X)]
F9. (DE PUT-N-CLOCK-RING (Cr X)
    ;/Sets the n-clock-ring property value of Cr to X. Returns Cr./;
    (PUTPROP Cr 'n-clock-ring X)]
F10. (DE GET-AGENTS (cr)
    ;/Returns the list of agents attached to the clock-ring Agent. Cr
        will be the parent of all those agents. Cr has to be the name of
        a clock-ring for this function to work correctly./;
    (GETPROP cr 'agents)]
F11. (DE PUT-AGENTS (cr Lst)
    ;/Puts Lst as the list of agents on the clock-ring Cr. Returns Lst.
        No argument checking is done./;
    (PUTPROP cr 'agents Lst)]
F12. (DE ADD-AGENT (Agent Cr)
    ;/Adds Agent as one of the agents on Cr and returns Agent./;
    (PROG ((LV (GET-AGENTS Cr)))
        (COND ((NULL LV) (PUT-AGENTS Cr (NCONS Agent)))
            (T (ATTACH Agent LV))))]
F13. (DE SUB-AGENT (Agent Cr)
    ;/Removes Agent from the Clock-ring Cr. Returns the list of all
        remaining agents on Cr./;
    (PROG ((LV (REMATOM Agent (GET-AGENTS Cr))))
        (OR (CAR LV) (PUT-AGENTS Cr NIL)))]
F14. (DE GET-MSG-ROLE-VAR (cr)
    ;/Returns the name of the msg-role-var variable of the clock-ring./;
    (GETPROP cr 'msg-role-var)]
F15. (DE PUT-MSG-ROLE-VAR (cr)
    ;/Puts <cr>-msg-role-var as the value of msg-role-var property of
        cr./;
    (PUTPROP cr (CONCAT cr '-msg-role-var))]
F16. (DE GET-SC (X)
    ;/Returns the security classification of X, which is a dotted pair
        of integers, (security-class.role-number). X has to be the
        name of a clock-ring, watch-ring, agent, port or object in order
        for this function to work correctly./;
    (GETPROP X 'security-class)]
F17. (DE PUT-SC (X (sc (0.0)))
    ;/Sc is a pair of integers, (security-level.role-number). Puts sc
        as security-class of X. X can be an agent, port, clock-ring or
        object. Default value for security is (0.0). Returns sc./;
    (PUTPROP X 'security-class sc)]
F18. (DE FIRST-AGENTOF (cr)
    ;/Returns the first agent of clock-ring cr./;
    (EVAL cr)]
```

2.6.2.3. Other Clock-ring Related Functions and Predicates

```
F19. (DE BOUND-CRP (Cr)
    ;/Returns T if there is at least one port tuned to it, else NIL. Cr
        must be a clock-ring name for this function to work correctly. A
        clock-ring is free if it is not bound./;
    (SOME (FUNCTION (LAMBDA (W)
        (GREATERP (#OF-PORTS W) 0)))
        (GET-AGENTS Cr)]
F20. (DE SWITCH-MEMORY (Cr)
    ;/Switches read/write memory designation of the clock-ring Cr.
        Returns the (s-address . e-address) of read-memory./;
    (PROG ((LV (GET-WRITE-MEMORY Cr)))
        (PUT-WRITE-MEMORY Cr
            (CLEARMEM (GET-READ-MEMORY Cr)))
        (PUT-READ-MEMORY Cr LV))]
F21. (DE CLEARMEM (Memory)
    ;/Memory is a dotted pair (s-address . e-address). Resets the memory
        to zero from starting address through ending address. Returns
        Memory. Uses WRITE-MEM, to set a given address to zero; this is
        not a LISP function./;
    (PROG ((s-address (CAR Memory))
        (e-address (CDR Memory)))
        (LOOP WHILE (NOT (GREATERP s-address e-address)) DO
            (PROGN (WRITE-MEM s-address 0)
                (SETQ s-address (ADD1 s-address)))
            Memory)]
```

Creation and destruction functions associated with TICC pathways and pathway entities like clock-rings, watch-rings, agents and ports are presented at the end, since they make use of functions defined for all entities.

2.6.3. TICC Agent Representation and Functions 2.6.3.1. Property Names used in Agent Property List Agent property list has the following property names:

(State, lock, type, next, prev, #of-ports, watch-rings, agent-Sfn, agent-Cfns, next-Sfn, prev-Sfn, security-class, n-agent).

Values of properties in Agent property list: The LISP value of an agent will be its parent clock-ring name, namely the clock-ring to which the agent is attached. The value of property, n-agent, is the agent's name. The state of an agent or port can be busy or idle. The lock, which can be T or NIL, is used to withhold execution of agent-Sfn (this will withhold starting of next cycle of computations by objects tuned to agent). The agent-Sfn of an agent can be executed only if the lock of the agent is NIL. The type of an agent can take one of three values: CR for an agent attached to a clock-ring, IM (Input Monitor) for an agent attach to delivery-side of a watch-ring, and OM (Output Monitor) for an agent attached to dispatch-side of a watch-ring. Value of next is the name of agent that is next to it on its parent clock-ring. The value of prev is the name of agent that is before it on its parent clock-ring. The value #of-ports is the total number of ports tuned to the agent. The value of watch-rings is the list of watch-rings attached to the agent. The value of property agent-sfn is a dotted pair of the form, ((<agent>-Sfn). <agent>-Sfn-pending), where <agent>-Sfnis the name of the start signal protocol function of agent, and <agent>-Sfn-pending is the pending variable associated with it. This variable will have value T if (<agent>-Sfn) is pending to be executed in a segment, else it will have value NIL. The value of agent-Cfns is an association list whose elements are lists of the form, (port (<agent>-Cfn-<port>) port-s-var <agent>-Cfn-<port>-pending), where <port> is the name of a port that is tuned to the agent, (<agent>-Cfn-<port>) is a function call to the function that processes completion signals sent by port to the agent, port-s-var is the name of start signal variable that port shares with agent and <agent>-Cfn-<port>-pending is the variable which will be T if function, <agent>-Cfn-<port>, is pending execution. Value of property next-Sfn is, (<agent>-next-Sfn) which is a function call to the function that is used by agent to send start signal to its next agent after sensing satisfaction of agreement protocol. The value of Prev-Sfn is also a similar function call, (<agent>-Prev-Sfn) which is used by agent by <agent> to sense start signal sent to it by its previous agent. GET and PUT functions for all of these properties have been defined. Some of them are defined in the Miscellaneous Functions Section, which is the last section of this chapter. The value of security-class is a dotted pair of integers. Every agent name will appear in the Name-hash-table. The LISP value of an agent is the clock-ring to which it is attached. An agent is said to be tuned only if its #of-ports is greater than zero.

Agents other than first agents of clock-rings, will have names of the form "<agent>-<#>-<#>", where the first <#> is the processor number of the processor that created the agent, and the second <#> is the agent number. No two agents will have the same name.

2.6.3.2. Property List Access and Updating Functions for Agents

```
F22. (DE GET-STATE (AgPo)
     ;/AgPo should be the name of an agent or port. Returns the current
         state of AgPo./;
     (GETPROP AgPo 'state)]
F23. (DE PUT-STATE (AgPo State)
     ;/AgPo should be the name of an agent or port. Puts State as the
         current state of AgPo./;
     (PUTPROP AgPo 'state State)]
F24. (DE LOCK (X)
     ;/Locks X and returns T./;
     (PUTPROP X 'lock T)]
F25. (DE UNLOCK (X)
     ;/Unlocks X and returns NIL./;
     (PUTPROP X 'lock NIL)]
F26. (DE LOCKEDP (X)
     ;/Returns T if X is locked, else NIL./;
     (GETPROP X 'lock)]
F27. (DE TYPE-OF (X)
     ;/Type of an agent can be CR, OM or IM. Type CR agents are
         attached to clock-rings, OM agent is an output monitor agent
         attached to a watch-ring, and IM is an input monitor agent
         attached to a watch-ring./;
     (GETPROP X 'type)]
F28. (DE PUT-TYPEOF (X type)
     ;/Type can be CR, OM or IM. Puts the type on X./;
     (PURPROP X 'type type)]
```

-continued

```
F29. (DE GET-NEXT (agent)
     ;/Returns the agent that is next to Agent on the Agent's parent
         clock-ring./;
     (GETPROP Agent 'next)]
F30. (DE PUT-NEXT (Agent Next)
     ;/Puts Next as the next agent of Agent and returns Next./;
     (PUTPROP Agent 'next Next)]
F31. (DE NEXT-AGENTP (Agent Next)
     ;/Returns T if Nxt is the next agent of Agent1, else NIL. (AGENTP
         Agent1) has to be true in order for this function to work
         correctly./;
     (EQ (GET-NEXT Agent) Next)]
F32. (DE GET-PREV (Agent)
     ;/Returns that agent that is before Agent on the Agent's parent
         clock-ring./;
     (GETPROP Agent 'prev)]
F33. (DE PUT-PREV (Agent Prev)
     ;/Puts Prev as the previous agent of Agent and returns Prev./;
     (PUTPROP Agent 'prev Prev)]
F34. (DE PREV-AGENTP (Agent Prev)
     ;/Returns T if Prv is the previous agent of Agent1, else NIL.
         (AGENTP Agent1) has to be true in order for this function
         to work correctly./;
     (EQ (GET-PREV Agent) Prev)]
F35. (DE GET-WATCH-RINGS (Agent)
     ;/Returns the list of watch-rings attached to Agent./;
     (GETPROP Agent 'watch-rings)]
F36. (DE PUT-WATCH-RINGS (Agent Wrs)
     ;/Puts watch-rings, Wrs, as the list of watch-rings of Agent. Every
         watch-ring in the list should be attached to Agent. Returns
         Watch-rings./;
     (PROG ((LV (GET-WATCH-RINGS Agent)))
         (COND (LV (MAPC (FUNCTION (LAMBDA (W)
             (ATTACH W LV))) Wrs)
             LV)
         (T (PUTPROP Agent 'watch-rings Wrs))))]
F37. (DE ADD-WATCH-RING (Agent Wr)
     ;/Adds Watch-ring to the list of watch-rings of Agent. Watch-ring
         should be already attached to Agent. Returns the new list of
         watch-rings attached to Agent./;
     (PROG ((LV (GET-WATCH-RINGS Agent)))
         (COND ((NULL LV) (PUT-WATCH-RINGS Agent
             (NCONS Wr)))
             ((MEMQ Wr LV) LV)
             (T (ATTACH Wr LV)))]
F38. (DE SUB-WATCH-RING (Agent Wr)
     ;/Removes Watch-ring, Wr, from the list of watch-rings of Agent.
         Returns the list of remaining watch-rings attached to Agent,
         which could be NIL./;
     (OR (REMATOM Wr (GET-WATCH-RINGS Agent))
         (PUT-WATCH-RINGS Agent NIL))]
F39. (DE #OF-PORTS (agent)
     ;/Returns the number of ports tuned to agent./;
     (GETPROP agent '#of-ports)]
F40. (DE PUT-#OF-PORTS (agent int)
     ;/Puts int as the number of ports tuned to agent /;
     (PURPROP agent '#of-ports int)]
F41. (DE ADD1-#OF-PORTS (agent)
     ;/Adds 1 to the number ports tuned to Agent and returns the new
         value./;
     (PUT-#OF-PORTS agent (ADD1 (#OF-PORTS Agent)))]
F42. (DE SUB1-#OF-PORTS (Agent)
     ;/Subtracts 1 from the number ports tuned to Agent and returns the
         new value./;
     (PUT-#OF-PORTS agent (SUB1 (#OF-PORTS agent)))]
F43. (DE GET-AGENT-SFN (agent)
     ;/Returns ((agent-Sfn). Pending-var), where agent-Sfn is the
         function call to the protocol function used by agent to process
         start signal it receives from its previous agent, and pending-var
         is the variable that is set to T if agent-Sfn is pending to be
         executed by the communications processor./;
     (GETPROP agent 'agent-Sfn)]
F44. (DE GET-SFN-PENDING-VAR (agent)
     ;/Returns the variable, which has value T only if agent-Sfn is
         pending to be executed by communications processor./;
     (CDR (GETPROP agent 'agent-Sfn))]
F45. (DE PUT-AGENT-SFN (agent Sfn)
     ;/Sfn is a function call of the form (<agent>-Sfn). Puts (CONS Sfn
         <(CAR Sfn)>-pending) as the value of agent-Sfn property of
         agent./;
```

-continued

```
        (COND ((NULL Sfn) (PUTPROP agent 'agent-Sfn NIL))
              (T (PROG ((pending (CONCAT (CAR Sfn) '-pending)))
                    (LIST 'DECLARE (LIST 'SPECIAL pending))
                    (SET pending NIL)
                    (PUTPROP agent 'agent-Sfn (CONS Sfn pending))]
F46. (DE GET-AGENT-CFNS (agent)
        ;/Returns the list whose elements are of the form (port (agent-Cfn-
           port) port-s-var agent-Cfn-port-pending) where port is a port
           tuned to agent and (agent-Cfn-port) is a function call that is
           used by agent to process the completion signals received from
           port, and agent-Cfn-port-pending is the variable, which when
           equal to T will indicate that execution of agent-Cfn-port is
           pending./;
        (GETPROP agent 'agent-Cfns)]
F47. (DE GET-AGENT-CFN (agent port)
        ;/Returns the list ((agent-Cfn) agent-s-port pending-var) where
           (agent-Cfn) is the function call to the function that is used by
           agent to process completion signals received from port, agent-s-
           port is the variable that is set to T by agent to send start
           signal to port, and pending-var is the variable that is T if
           agent-Cfn is pending to be executed by communications
           processor./;
        (CDR (ASSOCQ port (GET-AGENT-CFNS agent))]
F48. (DE GET-AGENT-S-VAR (agent port)
        ;/Returns the start signal variable used by agent to send a start
           signal to port./;
        (CADDR (ASSOCQ port (GET-AGENT-CFNS agent)))]
F49. (DE GET-AGENT-CFN-PENDING-VAR (agent port)
        ;/Returns the variable which when true indicates that the Cfn of
           agent is awaiting activation in a pending-lst.;/
        (CADDDR (ASSOCQ port (GET-AGENT-CFNS agent))]
F50. (DE ADD-AGENT-CFN (agent port Cfn)
        ;/Adds (port Cfn <port>-s-var <Cfn>-pending) to agent. Cfn will
           have the form, (<agent>-Cfn-<port>). It is the function call to
           the function that is used by agent to process completion signals
           received from port; <port>-s-var is the variable used by agent to
           send start signal to port, and <Cfn>-pending is the variable
           which when equal to T indicates that the Cfn is awaiting
           execution by communications processor./;
        (PROG ((LV (GET-AGENT-CFNS agent))
               (port-s-var (CONCAT agent '-s-port))
               (pending (CONCAT (CAR Cfn) '-pending)))
              (EVAL (LIST 'DECLARE (LIST 'SPECIAL port-s-
                 var pending)))
              (SET port-s-var (SET pending NIL))
              (COND ((NULL LV)
                     (PUT-AGENT-CFNS agent
                        (NCONS (LIST port Cfn port-s-var
                          pending))))
                    (T (ATTACH (LIST port Cfn port-s-var pending)
                       LV)]
F51. (DE SUB-AGENT-CFN (Agent Port flag)
        ;/Removes list associated with Port from the association list of
           Cfns of the Agent if it is there. If flag is T then destroys the
           removed Cfn and global variables associated with it. Returns the
           resultant association list./;
        (OR (REMASSOC port (GET-AGENT-CFNS Agent) flag)
            (PUT-AGENT-CFNS agent NIL)]
F52. (DE GET-NEXT-SFN (agent)
        ;/Returns (<agent>-next-Sfn), where (<agent>-next-Sfn) is the
           function used by agent to send start signal to its next agent. /;
        (GETPROP agent 'next-Sfn)]
F53. (DE PUT-NEXT-SFN (agent Sfn)
        ;/Puts Sfn = (<agent>-next-Sfn) as the value of next-Sfn property
           of agent./;
        (COND ((NULL Sfn) (PUTPROP agent 'next-Sfn NIL))
              (T (PUTPROP agent 'next-Sfn Sfn)]
F54. (DE GET-PREV-SFN (agent)
        ;/Returns (<agent>-prev-Sfn), where <agent> is the name of the
           agent. This is the function used by agent on a clock-ring, cr,
           to sense start signal sent to it by its previous agent on cr./;
        (GETPROP agent 'prev-Sfn)]
F55. (DE PUT-PREV-SFN (agent fn)
        ;/Fn is of the form (<agent>-prev-Sfn). Puts this as the value of
           prev-Sfn and returns it./;
        (PUTPROP agent 'prev-Sfn fn)]
F56. (DE GET-N-AGENT (agent)
        ;/Returns agent if agent is indeed an agent, else NIL./;
        (GETPROP agent 'n-agent)]
F57. (DE PUT-N-AGENT (agent Name)
        ;/Puts Name as the name of agent./;
        (PUTPROP agent 'n-agent Name)]
```

2.6.3.3. Other Functions Pertaining to Agents

```
F58. (DE CR-AGENTP (agent)
        ;/Returns T if agent is attached to a clock-ring, else NIL./;
        (EQ (TYPE-OF agent) 'CR)]
F59. (DE I-MONITORP (agent)
        ;/Returns T if agent is attached to delivery side of a watch-ring,
           else NIL/;
        (EQ (TYPE-OF agent) 'IM)]
F60. (DE O-MONITORP (agent)
        ;/Returns T if agent is attached to dispatch side of a watch-ring,
           else NIL/;
        (EQ (TYPE-OF agent) 'OM)]
F61. (DE AGENTP (Agent)
        ;/Returns T if it is the name of an agent. Else NIL./;
        (EQ Agent (GET-N-AGENT Agent))]
F62. (DE BOUND-AGENTP (agent)
        ;/Returns T if agent is attached to a clock-ring, else NIL./;
        (AND (BOUNDP agent) (CLOCK-RINGP (EVAL agent))]
F63. (DE BUSYP (AgPo)
        ;/Returns T if the current state of AgPo is Busy, else NIL. AgPo
           should be the name of an agent or port. Else returns NIL./;
        (EQ (GET-STATE AgPo) 'busy)]
F64. (DE IDLEP (AgPo)
        ;/Returns T if the current state of AgPo is Idle, else NIL. AgPo
           should be the name of an agent or port. Else returns NIL./;
        (EQ (GET-STATE AgPo) 'idle)]
F65. (DE TUNEDP (agent port)
        ;/Returns T if agent is tuned to port, else NIL./;
        (EQ agent (GET-AGENT port)]
F66. (DE TUNED-AGENTP (agent)
        ;/Returns T if there is a port tuned agent, else NIL./;
        (GREATERP (#OF-PORTS agent) 0)]
F67. (DE GET-TUNED-PORTS (Agent)
        ;/Returns the list of all ports tuned to Agent./;
        (PROG ((LV (NCONS)))
              (MAPC (FUNCTION (LAMBDS (W) (TCONC LV
                  (GET-PORT W))))
                 (GET-WATCH-RINGS Agent))
              (CAR LV)]
F68. (DE GET-TUNED-OBJECTS (Agent)
        ;/Returns the list of objects tuned to Agent./;
        (PROG ((LV (NCONS)))
              (MAPC (FUNCTION (LAMBDA (W)
                  (TCONC LV (EVAL (GET-PORT W)))))
                 (GET-WATCH-RINGS Agent))
              (CAR LV)]
F69. (DE REMATOM (Atm Lst flag)
        ;/Removes Atm from Lst, if it is there and returns the updated Lst.
           Uses destructive operations. Does not destroy Atm if flag is
           NIL, else destroys it. Returns updated Lst./;
        (PROC ((LV Lst))
              (LOOP WHILE (NEQ Atm (CAR LV)) (SETQ LV (CDR LV)))
              (RPLACA LV (CADR LV))
              (RPLACD LV (CDDR LV))
              (AND flag (DESTROY Atm))
              (OR (CAR Lst) (SETQ Lst NIL))
              Lst]
F70. (DE REMASSOC (Atm Alst flag)
        ;/Removes the list (Atm (Cfn) ..) that is in the association list,
           Alst, and returns the modified Alst. Uses destructive operations
           and changes Alst in place. Destroys Cfn if flag is T/;
        (PROG ((LV (ASSOCQ Atm Alst)) (LV1 Alst))
         (LOOP WHILE (NEQ LV (CAR LV1)) (SETQ LV1 (CDR LV1)))
         (RPLACA LV1 (CADR LV1)) (RPLACD LV1 (CDDR LV1))
         (AND flag (PROG ((Cfn (CAADR LV)) (pending (CADDDR LV)))
                    (DO WHILE (EVAL pending) DO (WAIT))
                    (PUTD Cfn NIL)
                    (DESTROY (CONCAT (CAR X) '-c- agent))
                    (DESTROY (CADDR LV))
                    (DESTROY pending)
```

```
                (DESTROY Cfn)
                (PRINTMSG "Function" Cfn "destroyed.")))))
        Alst]
F71. (DE TICC-BOUNDP (X)
    ;/Returns if X is bound according to TICC definition. X can be an
        agent, clock-ring, port, watch-ring or object. If not bound then
        returns NIL. An unbound agent, clock-ring, port or object is
        said to be free./;
    (COND ((AGENTP X) (BOUND-AGENTP X))
        ((PORTP X) (BOUND-PORTP X))
        ((OBJECTP X) (BOUND-OBJECTP X))
        ((CLOCK-RINGP X) (BOUND-CRP X))
        ((WATCH-RINGP X) (BOUND-WRP X)))]
F72. (DE PARENTOF (AgPo)
    ;/AgPo should be an agent or port. Returns the parent of Agent or
        port. Parent of an agent is a clock-ring or watch-ring to which
        it is attached, and parent of a port is an object. No argument
        checking done./;
    (EVAL AgPo)]
```

2.6.4. Watch-ring Representation and Functions

2.6.4.1. Property List of a Watch-ring

Property names in a watch-ring's property list are, (agent, port, security-class, i-monitors, o-mozitors, i-m1, o-m1, n-watch-ring)

Values of Watch-ring properties: Agent property value is the agent to which the watch-ring is attached. Port of a watch-ring is the name of the port, which is tuned to its agent. I-monitors is the list of monitor agents attached to the delivery side of the watch-rings Similarly, o-monitors is the list of monitor agents on the delivery-side of a watch-ring. I-m1 is the first i-monitor, appearing immediately after the agent of the watch-ring on its delivery side. Similarly, o-m1 is the first o-monitor appearing immediately after the port of the watch-ring, on its dispatch side. The value of n-watch-ring property is the name of the watch-ring. The LISP value of a watch-ring is the name of the clock-ring or watch-ring, which is the parent watch or clock-ring of the agent of the watch-ring Every watch-ring name will appear in the Name-hash-Lable, as is the name of every TICC entity. A watch-ring is said to be bound if it is attached to both an agent and a port.

Watch-ring names will have the form "watch-ring-<#>-<#>" where <#> is an integer. The first number refers to the processor that created the watch-ring and the second is the watch-ring's number. No two watch-rings will have the same name.

2.6.4.2. Property List Access Functions for Watch-rings

```
F73. (DE GET-N-WATCH-RING (X)
    ;/If X is a watch-ring name then will return X, else NIL./;
    (GETPROP X 'n-watch-ring)]
F74. (DE PUT-N-WATCH-RING (wr Y)
    ;/Puts Y as the value of property n-watch-ring of wr and returns Y.
        Usually wr = Y./;
    (PUTPROP wr 'n-watch-ring Y)]
F75. (DE GET-AGENT (wr)
    ;/Returns the primary agent (not observer agents) to which the wr is
        attached./;
    (GETPROP wr 'agent)]
F76. (DE PUT-AGENT (wr agent)
    /;Puts agent as the name of agent to which wr is attached. Returns
        agent./;
    (PUTPROP watch-ring 'agent agent)]
F77. (DE GET-PORT (wr)
    ;/Returns the port to which the watch-ring is attached./;
    (GETPROP wr 'port)]
F78. (DE PUT-PORT (wr Port)
    ;/Puts Port as the port to which watch-ring is attached./;
    (PUTPROP wr 'port Port)]
F79. (DE GET-I-MONITORS (wr)
    ;/Returns the list of monitoring agents on the delivery side (input
        side) of watch-ring./;
    (GETPROP watch-ring 'i-monitors)]
F80. (DE GET-O-MONITORS (wr)
    ;/Returns the list of monitoring agents on the dispatch h side of
        watch-ring./;
    (GETPROP wr 'o-monitors)]
F81. (DE ADD-I-MONITOR (wr i-agent)
    ;/Adds i-agent to i-monitors property of wr./;
    (PROG ((LV (GET-I-MONITORS wr)))
        (COND ((NULL LV) (PUTPROP wr 'i-monitors (NCONS
            i-agent)))
            (T (ATTACH i-agent LV))]
F82. (DE SUB-I-MONITOR (wr i-agent)
    ;/Removes i-agent from i-monitors property of wr./;
    (PROC ((LV (GET-I-MONITORS wr)))
        (OR (REMATOM i-agent LV) (PUTPROP wr 'i-monitors
            NIL)))]
F83. (DE ADD-O-MONITOR (wr o-agent)
    ;/Adds o-agent to o-monitors property of wr./;
    (PROG ((LV (GET-O-MONITORS wr)))
        (COND ((NULL LV) (PUTPROP wr 'o-monitors (NCONS
            o-agent)))
            (T (ATTACH o-agent LV))]
F84. (DE SUB-O-MONITOR (wr o-agent)
    ;/Removes o-agent from o-monitors property of wr./;
    (PROG ((LV (GET-O-MONITORS wr)))
        (OR (REMATOM o-agent LV) (PUTPROP wr 'o-monitors
            NIL)))]
F85. (DE GET-FIRST-IM (wr)
    /;Returns the first monitor agent on the delivery side of watch-ring
        wr. This is the one right after the agent connected to wr.;/
    (GETPROP wr 'i-m1)]
F86. (DE PUT-FIRST-IM (wr i-agent)
    ;/Puts i-agent as the first i-monitor on the clock-ring and returns
        it./;
    (PUTPROP we 'i-m1 i-agent)]
F87. (DE GET-FIRST-OM (wr)
    ;/Returns the first monitoring agent on the dispatch side of watch-
        ring wr. This is the one right after the port./;
    (GETPROP wr 'o-m1)]
F88. (DE PUT-FIRST-OM (wr o-agent)
    ;/Puts o-agent as the first o-monitor on wr and returns it./;
    (PUTPROP we 'o-m1 o-agent)]
```

2.6.4.3. Other Functions Pertaining to Watch-ring

```
F89. (DE WATCH-RINGP (X)
    ;/Returns T if X is a watch-ring, else NIL./;
    (EQ (GET-N-WATCH-RING X) X)]
F90. (DE BOUND-WRP (wr (agent (GET-AGENT wr)))
    ;/Returns port if there is an agent and port attached to watch-ring
        wr. Else, returns NIL./;
    (AND agent (GET-PORT wr)]
```

2.6.5. TICC-Port Representation and Functions

2.6.5.1. Property List of Ports

Property names in a port's property list (state, watch-ring, port-Cfn, port-Sfn, segment, read-memory, security-class, write-memory, scratchpad, n-port)

Values of Port properties: Value of state and GET and PUT functions for state are the same as for agent. Watch ring of a port is the watch-ring that is connected to the port. Port-Cfn is the control signal protocol function used by port to process completion signals received from its parent object. Port-Sfn is the control signal processing function used by port to process start signals received from the agent it is tuned to. Segment is a list of control signal processing functions needed to process control signal exchanges that occur along the TICC-pathway connected to port, when the port sends out a message.

Read-memory, write-memory, and scratchpad are pairs, (current-address. end-address). Current-address is the address at which the port may start reading or writing into the memory. The end-address is the last address it may read or write into. A port may read or write into a memory only if its security classification allows it to do so. The read and write programs associated with ports are not shown here. Every time the parent object of a port sends completion signal to the port, its read/Write and scratchpad memory values will be reset to NIL. Next time the port reads or writes into any of these memories, would be only in the next cycle of computation. At that time the port would re-initialize the memory addresses by retrieving them from the current read/write and scratchpad memories of the clock-ring to which it is tuned. If security restrictions still allow it to do so.

Port-Cfn and port-Sfn are the functions that respectively process completion signals received by port from its parent object, and start signal received from agent that the port is tuned. Segment is the list of protocol functions, which will be presented to communications processor, whenever the port receives a completion signal from its parent object. Anytime the pathway of the port is changed the segment value of port will be reset to NIL. Next time the segment is needed it will be recomputed. Finally, n-port is the name of the port. The LISP value of port is its parent object, i.e. the object whose port it is.

2.6.5.2. TICC-Port Property List Accessing Functions

---

F91. (DE GET-WATCH-RING (port)
;/Returns the watch-ring attached to port./;
(GETPROP port 'watch-ring)]
F92. (DE PUT-WATCH-RING (port wr)
;/Puts watch-ring wr as the value of the port's watch-ring property and returns wr./;
(PUTPROP port 'watch-ring wr)]
F93. (DE GET-N-PORT (port)
;/Returns the name of the port.'/
(GETPROP port 'n-port)]
F94. (DE PUT-N-PORT (port X)
;/Puts X as the name of the port and returns X./;
(PUTPROP port 'n-port X)]
F95. (DE PORTP (X)
;/Returns T if X is a port, else NIL./;
(EQ (GETPROP port 'n-name) X)]
F96. (DE UPD-READ-MEMORY (port current)
;/Replaces the starting address of read-memory by current if (PORTP port) is true. Read memory addresses is a dotted pair, (s-address . e-address), where s-address the is the starting address and e-address is the ending address of the memory. Current here is the current starting address of the memory./;
(AND (PORTP port) (RPLACA (GET-READ-MEMORY port) current)]
F97. (DE UPD-WRITE-MEMORY (port current)
;/Replaces the starting address of write-memory by current if (PORTP port) is true. Current is the current starting address of memory./;
(AND (PORTP port) (RPLACA (GET-WRITE-MEMORY port) current)]
F98. (DE UPD-SCRATCHPAD (port current)
;/Replaces the starting address of read-memory by current if (PORTP port) is true. Current here is the starting address of memory./;
(AND (PORTP port) (RPLACA (GET-SCRATCHPAD port) current)]
F99. (DE GET-PORT-SFN (port)
;/Returns the ((<port>-Sfn) . <port>-Sfn-pending), of port./;

---

-continued (GETPROP port 'port-Sfn)]
F100. (DE GET-PORT-SFN-PENDING (port)
;/Returns the variable <port-Sfn>-pending./;
(CDR (GETPROP port 'port-Sfn)]
F101. (DE PUT-PORT-SFN (port Sfn)
;/Puts (Sfn . <Sfn>-pending) as the value of port-Sfn of port. Sfn is a function call, (<port>-Sfn), to the start function of port,/;
(PUTPROP port 'port-Sfn (CONS Sfn (CONCAT (CAR Sfn) '-pending))]
F102. (DE GET-PORT-CFN (port)
;/Returns ((<port>-Sfn) . <port>-Sfn-pending), where (<port>-Sfn) is the completion signal processing function of port and <port>Sfn-pending is its pending variable./;
(GETPROP port 'port-Cfn)]
F103. (DE GET-PORT-CFN-PENDING (port)
/;Returns the variable <port-Cfn>-pending.';
(CDR (GETPROP port 'port-Cfn))]
F104. There is no function F104.
F105.(DE GET-SEGMENT (port)
;/Returns the pathway segment of port. This is a list of start functions and completion functions associated with the TICC pathway starting at the port./;
(GETPROP port 'segment)]
F106.(DE PUT-SEGMENT (port segment)
;/Puts the pathway segment of port as the value of its "segment" property and returns it./;
(PUTPROP port 'segment segment)]

---

Ports are created and destroyed only by their parent objects. Creating and destroying objects is under the control of the Application. Only objects may create and destroy other objects. So these functions are not shown here.

2.6.5.3. Other Functions Associated with TICC-Ports

---

F107.(DE INI-PORT (port)
;/Initializes the property list of port and returns port./;
(PROG (LV)
(PUT-STATE port 'idle)
(UNLOCK port)
(PUT-WATCH-RING port NIL)
(PUT-PORT-CFN port (NCONS (SETQ LV (CONCAT port '-Cfn))))
(PUTD LV NIL)
(PUT-PORT-SFN port (NCONS (SETQ LV (CONCAT port '-Sfn))))
(PUTD LV NIL)
(PUT-SEGMENT port NIL)
(PUT-N-PORT port port)]

---

2.6.6. Predicates Relating Agents, Ports, Watch-rings and Clock-rings

---

F108.(DE TUNED-PORT-CRP (port cr)
;/Returns T if port is tuned to clock-ring, cr, else NIL./;
(EQ (CLOCK-RING-OF (GET-AGENT port)) cr)]
F109.(DE ACCESS-MEMORIESP (port cr)
;/Returns T if port can access the memories of cr. Ports tuned to any agent on cr or any descendant of an agent on cr can access memories of cr./;
(EQ (CLOCK-RING-OF (GET-AGENT port)) cr]
F110.(DE COMPATIBLE-PORTP (port cr)
;/Returns T if none of the ports of the parent object of port is tuned to cr, else NIL. This function is called before a port is tuned to a clock or watch-ring./;
(NULL (SOME (FUNCTION (LAMBDA (W) (TUNED-PORT-CRP port cr)))
(PORTS-OF (EVAL port))]
F111.(DE TUNED-OBJECT-CRP (object Cr)
;/Returns T if the agent tuned to a port of object is on Cr./;
(SOME (FUNCTION (LAMBDA (W) (TUNED-PORT-CRP W Cr)))
(PORTS-OF Object)]

-continued

```
F112.(DE TUNED-OBJECT-AGENTP (Obj agent)
    ;/Returns a T if Obj is tuned to agent. Object here is tuned to
        agent if one of its ports is tuned to the agent./;
    (SOME (FUNCTION (LAMBDA (W) (EQ (GET-AGENT W)
    agent)))
            (PORTS-OF Obj)]
F113.(DR COMPATIBLE-AGENTP (agent Cr)
    ;/Returns T if agent is compatible with clock-ring, Cr, that is,
        none of the ports of parent objects, of ports tuned to agent, is
        tuned to Cr. Else returns NIL. An agent can be attached to a Cr
        only if this function is true./;
    (NULL (SOME (FUNCTION (LAMBDA (W)
                    (TUNED-OBJECT-CRP
                        (EVAL (GET-PORT W)) Cr)))
            (GET-WATCH-RINGS Agent)]
F114.(DE DESCENDANTP (agent1 agent2)
    ;/Returns T if one of agent1 and agent2 is a descendant of the
        other, i.e. agent1 and agent2 have the same clock-ring./;
    (EQ (CLOCK-RING-OF agent1) (CLOCK-RING-OF
        AGENT2)]
F115.(DE CLOCK-RING-OF (agent)
    ;/Returns the clock-ring to which agent is attached. If agent is a
        monitor agent then returns the clock-ring attached to its
        ancestor agent, i.e., returns (CLOCK-RING-OF (GET-AGENT
        (EVAL agent))), where (EVAL agent) = wr is the watch-ring
        to which the monitor agent is attached. Returns NIL if agent
        does not have any clock-ring associated with it./;
    (SELECTQ (TYPE-OF agent)
        ('CR (EVAL agent))
        ('(IM OM) (CLOCK-RING-OF (GET-AGENT
        (EVAL agent))))
        NIL]
F116.(DE CLOCK-RINGOF-WR (wr)
    ;/Returns the clock-ring-of agent of wr./;
    (CLOCK-RING-OF (GET-AGENT wr))]
F117. (DE COMPATIBLE-WRP (agent wr)
    ;/Returns T if agent is compatible with the clock-ring of wr. Else
        returns NIL. A watch-ring may be attached to an agent or its
        descendant only if this function is true./;
    (COMPATIBLE-AGENTP agent (CLOCK-RING-OF wr))]
F118. (DE COMPATIBLE-AGENTSP (agents cr)
    ;/Returns T if none of the objects tuned to any agent in agents is
        also tuned to cr. Else returns NIL.;/
    (EVERY (FUNCTION (LAMBDA (W) (COMPATIBLE-AGENTP
        W Cr)))
        agents)]
F119.(DE EXISTSP (X)
    ;/Returns X if X is a TICC entity. Else NIL./;
    (GETHASH X Appln-hash-table)]
```

2.6.7. Properties of Application, Processor and Object 2.6.7.1. Property Lists of Application, Processor and Object The property lists are shown below:

Appln: (n-appln, objects, processors, hash-table)

Processor: (pl-upd-lst, semaphore, objects, n-processor)

Object: (appln, ports, n-object)

Application: N-appln is the name of an application. Value of objects property is the list of all objects in the application. The value of processors property is the list of all processors assigned to objects in application. LISP value of an application is the list of owners of application who have authority to dynamically change the application. This is not used in this implementation. Hash-table is the name hash-table used to register all names in the application. Applications may have other application dependent properties not used here.

Processor: This is the list of processors assigned to the application. Property n-processor is the name of the processor, which is of the form P<#>. Pl upd-lst is the list of protocol segments that need to be sent to the communication processor, C, in order to execute the pending segments of protocol functions. The value of Objects property is the list of all object instances assigned to the processor. Processors in an application may have other application dependent properties associated with it. They are not used here. The LISP value of a processor is the application to which it has been assigned.

Object: Appln is the application to which the object belongs. The value of ports property is the list of ports of the object. N-object is the name of object. The LISP value of an object is the processor to which it has been assigned. An object will have several other properties associated with it, properties which may be pertinent to given application. They are not used here.

2.6.7.2. Access Functions Associated with Application Property List

```
F120.(DE PUT-N-APPLN (X Name)
    ;/Puts Name as the name of application X,/;
    (PUTPROP X 'n-appln Name)]
F121.(DE GET-N-APPLN (X)
    ;/Returns the name of application X./;
    (GETPROP X 'n-appln]
F122.(DE OBJECTS-OF (X)
    ;/Returns the list of objects in an application or processor, X./;
    (GETPROP X 'objects)]
F123.(DE PUT-OBJECTS (X Lst)
    ;/Puts the objects in Lst as objects property value of X. Returns
        the list of all objects in X. X can be a processor or an
        Appln./;
    (PROG ((LV (GET-OBJECTS X)))
        (COND ((NULL LV) (PUTPROP X 'objects Lst))
            (T (MAPC (FUNCTION (LAMBDA (W) (ATTACH W
            LV))) Lst)
            LV]
F124.(DE ADD-OBJECT (X obj)
    ;/Adds obj as one of the objects of application or processor, X.
        Returns the list of all objects of X../;
    (PROG ((LV (GET-OBJECTS X)))
        (COND ((NULL LV) (PUTPROP X 'objects (NCONS obj)))
        (T (ATTACH obj LV)]
F125.(DE SUB-OBJECT (X obj)
    ;/Removes obj from being assigned to application or processor, X.
        Returns the list of remaining objects of X./;
    (OR (REMATOM obj (GET-OBJECTS X))
        (PUTPROP X 'objects NIL)]
F126.(DE GET-PROCESSORS (appln)
    ;/Returns the list of processors assigned to appln./;
    (GETPROP appln 'processors)]
F127.(DE PUT-PROCESSORS (appln Lst)
    ;/Adds processor names in 1st as processors assigned to appln.
        Returns the list of all processors assigned to appln./;
    (PROG ((LV (GET-PROCESSORS appln)))
        (COND ((NULL LV) (PUTPROP appln 'processors Lst))
            (T (MAPC (FUNCTION (LAMBDA (W) (ATTACH
            W LV))) Lst)
            LV]
F128.(DE ADD-PROCESSOR (appln processor)
    ;/Adds processor as one of the processors assigned to appln.
        Returns the list of all processors assigned to appln./;
    (PROG ((LV (GET-PROCESSORS appln)))
        (COND ((NULL LV)
            (PUTPROP appln 'processors (NCONS processor)))
            (T (ATTACH processor LV]
F129.(DE SUB-PROCESSOR (appln processor)
    ;/Removes processor as one of the processors assigned to appln.
        Returns the list of remaining processors assigned to appln./;
    (OR (REMATOM processor (GET-PROCESSORS appln))
        (PUTPROP appln 'processors NIL]
F130.(DE APPLICATIONP (X)
    ;/Returns T if X is an application name./;
    (EQ (GETPROP X 'n-appln) X)]
F131.(DE CREATE-APPLN ((Appln (GENSYM 'Appln)) size)
    ;/Creates an application named Appln./;
    (PUTPROP Appln 'processors NIL)
    (PUTPROP Appln 'objects NIL)
    (PUTPROP Appln (HASH-TABLE Name-hash-table size))
    (PUTHASH Appln Name-hash-table)
    (PUT-N-APPLN Appln Appln)]
```

-continued

```
F132.(DE MAKE-CURRENT (appln)
    ;/Makes appln the current application by setting the global variable
        Current-Appln to appln. Returns appln./;
    (SETQ Current-appln appln)]
F133.(DE REM-APPLN (Appln)
    ;/Removes registration of Appln./;
    (DESTROY Appln)]
```

2.6.7.3. Access Functions Associated with Processor Properties (objects, pending-lst, pl-upd-lst, smphore, n-processor).

GET-OBJECTS, PUT-OBJECTS, ADD-OBJECT, and SUB-OBJECT functions have already defined. Pl-upd-lst is a TCONC-list of segments. A TCONC-list is a list of the form, (CONS lst (LAST lst)). If $S_1$ is a segment consisting of protocol functions A, B, C and D, then $S_1$ will be the list (A B C D). The TCONC list containing only this segment will be (($S_1$) $S_1$). When a second segment, $S_2$, is added to the tail of this TCONC-list it will become (($S_1$ $S_2$) $S_2$). Thus as new segments are added the tail will grow longer and (CAR pl-upd-lst) will contain the list of all pending segments. These segments in (CAR pl-upd-lst) will be executed by TICC-DRIVER. In order to execute the segments in (CAR pl-upd-lst) the TICC-DRIVER will first transfer the segments in (CAR pl-upd-lst) of a processor X, to a local list of its own called X-pending-lst. Initially, pending-lst will be of the form (NIL. X), where X is the name the processor with which the pending-lst is associated. We call the pending-lst of processor X, x-pending-lst, and the pl-upd-lst of processor X, x pl-upd-lst.

If X-pl-upd-lst had n segments in it pending to be executed then X-pl-upd-lst (($S_1$ $S_s$ ... $S_n$) $S_n$).When pending segments in X-pl-upd-lst are transferred to X-pending-lst, the x-pending-lst will become, (($S_1 S_s$ ... $S_n$). X), and the semaphore of processor X will be set to T. At this point (CAR X-pending-lst) will be equal to ($S_1$ $S_s$ ... $S_n$). When all segments in (CAR X-pending-lst) are executed, TICC-DRIVER will clear (CAR X-pending-lst) of all the already executed segments, and reset X-pending-lst back to (NIL.X). At this point, if the semaphore of processor X is T, then the communication processor will skip updating X-pending-lst. If the semaphore is NIL, then it will replenish X-pending-lst once again with pending segments in X-pl-upd-lst which had accumulated in x-pl-upd-lst of processor X, and set the semaphore of processor X to back to T again. At this point when processor X seeks to add a new segment to X-pl-upd-lst, it will notice that the semaphore is T. It will, therefore, create a new pl-upd-lst, replace the old X-pl-upd-lst with the new one at exactly the same place as the old one was, and then append the new segment to this new X-pl-upd-lst. After doing this it will reset the semaphore to NIL. Thus, always the X-pending-lst and X-pl-upd-lst will be two distinct lists, and operations performed on one will not affect the other. This makes it possible for the TICC-DRIVER to continue its executions without being interrupted by the updates, and updates to continue without being interrupted by the TICC-DRIVER. X-pending-lst is updated by the Communication processor C, using the function, UPD-PENDING-LST, introduced earlier. Processor X updates X-pl-upd-lst, using the function (ADD-SEGMENT processor segment). With this preamble we may now proceed to present the functions. The LISP value of a processor is the application to which it has been assigned.

```
F134.(DE GET-PL-UPDATES (processor)
    ;/Returns the list of segments which have to be transferred to
        pending-lst for execution./;
    (GETPROP processor 'pl-updates)]
F135.(DE PUT-PL-UPDATES (processor lst)
    ;/Puts the tconc list, lst, as the value of property, pl-updates,
        of processor. This always creates a new pl-upd-lst./;
    (PUTPROP processor 'pl-updates (LCONC (NCONS) lst)]
F136.(DE ADD-SEGMENT (processor segment)
    /; Appends segment to the tconc list, pl-upd-lst, of processor.
    Returns pl-upd-lst. If semaphore of processor is T then installs
    a new tconc list (NIL) for pl-upd-lst and appends the new segment
    to it. Segment is a list of protocol functions of agents and
    ports in a TICC-pathway/;
    (COND ((UPDATEDP processor)
            (PUTPROP processor 'pl-upd-lst
                (TCONC (NCONS) segment)))
        (PUT-SEMAPHORE processor NIL))
        (T (TCONC (GETPROP processor 'pl-upd-lst) segment))]
F137.(DE UPDATEDP (processor)
    ;/Returns T or NIL. If it is T then it means that elements in
        the pl-updates list have been already transferred to pending-
        list. If it is NIL then elements in pl-updates have not yet
        been transferred to pending list./;
    (GETPROP processor 'semaphore)]
F138.(DE PUT-SEMAPHORE (processor TV)
    ;/Sets the semaphore of processor to truth value TV."
    (PUTPROP processor 'semaphore TV)]
F139.(DE PROCESSORP (X)
    ;/Returns T if X is the name of a processor./;
    (EQ (GETPROP X 'n-processor) X)]
F140.(DE PUT-N-PROCESSOR (X Name)
    ;/Puts Name as the name of processor X./;
    (PUTPROP X 'n-processor Name)]
F141.(DE CREATE-PROCESSOR ((Name (GENSYM 'P))
                (Appln Current-appln)))
    ;/Assigns the TICC-name, Name, to a processor. Returns Name.
    Adds Name as one of the processor names in Appln, and
    initializes pl-upd-lst to (NIL). Leaves all other
    properties undefined. Returns Name./;
    (ADD-PROCESSOR Appln Name)
    (PUTHASH Name Name-hash-table)
    (PUTPROP Name 'pl-upd-lst (NCONS))
    (PUTPROP Name 'n-processor Name)]
F142.(DE REM-PROCESSOR ((p-name (appln Current-appln)))
    /;Removes the processor called, p-name, from appln.
    Destroys its property list, removes p-name from hash-table,./;
    (SUB-PROCESSOR appln p-name)
    (DESTROY p-name)]
F143.(DE APPLN-OF (processor)
    ;/Returns the application to which the processor has been
        assigned./;
    (EVAL processor)]
```

2.6.7.4. Functions Associated with Properties of Object (appln, ports, n-object)

LISP value of an object is the processor to which it has been assigned. Value of appin property is the application to which the object belongs. Value of ports is the list of ports of object. The value of n-object is the name of the object.

```
F144.(DE APPLN-OF (obj)
    /;Returns the application name to which obj belongs. Every object
        should have an application name associated with it./;
    (GETPROP obj 'appln]
F145.(DE PUT-APPLN (obj appln)
    ;/Puts appln as the application of the object, obj./;
    (PUTPROP obj appln)]
F146.(DE PORTS-OF (obj)
    ;/Returns the list of ports of the object, obj./;
    (GETPROP obj 'ports]
F147.(DE PUT-PORTS (obj ports)
    ;/Puts ports as the list of ports of the object, obj. Returns
        the list of all ports of obj./;
```

-continued

```
        (PROG ((LV (PORTS-OF obj)))
            (COND ((NULL LV) (PUTPROP obj 'ports ports))
                (T (MAPC (FUNCTION (LAMBDA (W)
                    (ATTACH W LV))) ports)
                    LV]
F148.(DE ADD-PORT (obj port)
    ;/Adds port to the list of ports of object, obj. Returns the
        list of all ports of obj./;
    (PROG ((LV (PORTS-OF obj)))
        (COND ((NULL LV) (PUTPROP obj 'ports (NCONS port)))
            (T (ATTACH port LV])
F149.(DE SUB-PORT (obj port)
    ;/Removes port from the list of ports of object, obj. Returns
        the list of remaining ports of obj./;
    (OR (REMATOM port (PORTS-OF obj))
        (PUTPROP obj 'port NIL]
F150.(DE ASSIGNEDP (obj processor)
    ;/Returns obj if obj is assigned to processor, else NIL./;
    (EQ (EVAL obj) processor)]
F151.(DE APPLICATION-OF (obj)
    ;/Returns the application to which obj belongs./;
    (GETPROP obj 'appln)]
F152.(DE PUT-APPLN (obj appln)
    ;/Puts appln as the application to which obj belongs./;
    (PUTPROP obj 'appln appln)]
F153.(DE PROCESSOR-OF (obj)
    ;/Returns the name of the processor assigned to obj./;
    (EVAL obj)]
F154.(DE ASSIGN (obj proc)
    ;/Puts proc as the processor of object, obj. Returns proc./;
    (ADD-OBJECT proc obj)
    (SET obj proc)]
F155.(DE OBJECTP (X)
    ;/Returns T if X is the name of an object, else NIL./;
    (EQ (GETPROP X 'n-object) X)]
F156.(DE PUT-N-OBJECT (X Name)
    ;/Puts Name as the name of object X./;
    (PUTPROP X 'n-object Name)]
```

2.6.8. Functions Used for Security Enforcement (SECUREP X Y msg-role): This function is used by agents' start signal-processing functions to determine whether a message that is being forward satisfies an application's security specifications. A message will be transmitted only if SECUREP returns T. It is also used by CSM to determine whether a given connection to a TICC-pathway violates security specifications or not. A pathway connection will be made only if SECURP returns T. SECUREP performs 4 integer operations (half a nano-second each in a 2-gigahertz Xeon processor), two comparisons (again half a nanosecond each) and two fetch operations (2 nanoseconds each), which are the most time consuming operations in security checking. Security checking with in a signal processing protocol function will take almost as much time as the protocol function itself. Since TICC reduces communication latencies dramatically one can afford to spend the additional checking necessary to enforce security at this level.

This kind of security enforcement has several advantages: One can dynamically monitor security enforcement, one can dynamically encrypt and decrypt messages as necessary, also one can enforce restrictions like, "X can communicate with Y only a given number of times." Because of the level at which security is enforced in TICC one may thus prevent an object from receiving inputs from another object more than once at a given time, or sending outputs to another object more than once. Thus an object may be prevented from reading from a disc more than once, or copying a disc more than once. Security restrictions of this kind are not enforceable in current technology.

(CK&SET-S-VARS agent msg-role); This function is used by agents to determine whether application security permits them to forward a message to ports that are tuned to them. It is possible that a given message may be forwarded to some of the ports tuned to an agent and not to others. By attaching monitor agents to the delivery side of a watch-ring that connects an agent to a port that is tuned to it, high security messages may be dynamically encrypted and decrypted as and when needed by attaching monitors to watch-rings.

(CK&SET-C-VAR port agent msg-role): A port uses this to check whether it is secure to send a completion signal to the agent that is tuned to it. May send halt signal, h, if SECUREP returns NIL, or take other appropriate actions by sending a notification.

(NOTIFY X Y): This function is used to notify a security violation in message transmission when it occurs. Message delivery that violates security will be blocked from being delivered. It is up to a system implementer to decide what NOTIFY should do.

(NOTIFY-VIOLATION X Y): This function is used to notify security violation while making connections to TICC-pathways. In this implementation it does the same as NOTIFY except for a different message that is printed out.

By appropriately designing these five functions, and associating appropriate security classifications with objects, agents, ports and rings, a system implementer may implement the kind of security environment that is needed for an application.

```
F157.(DE SECUREP (X Y (msg-role 0))
    ;/Returns T if it is secure for X to send a message to Y, else NIL.
        Security class of X and Y is a pair of integers (class . role).
        It is secure if (class-of(X) =< class-of(Y)] or [Class-of(X)-
        Role-of(X)] =< [CLASS-of(Y) + Role-of(Y) – msg-role]. It may be
        noted, while X may be able to send a message to Y, Y may not able
        to send a message to X. Default msg-role value is 0./;
    (PROG ((Xsc (GET-SC X)) (Ysc (GET-SC Y)))
        (OR (NOT (GREATERP (CAR Xsc) (CAR Ysc)))
            (NOT (GREATERP (MINUS (CAR Xsc) (CDR Xsc))
                    (MINUS (PLUS (CAR Ysc)
                    (CDR Ysc)) msg-role]
F158.(DE CK&SET-S-VARS (agent msg-role)
    ;/(GET-AGENT-CFNS returns a list whose elements are of the form
        (port (agent-Cfn-port) agent-s-port agent-Cfn-port-pending),
        where agent-s-port is the variable used by agent to send start
        signal to port. Before setting agent-s-port to T, for each port
        tuned to agent, this function checks whether security
        restrictions are satisfied. If they are not then executes
        (NOTIFY agent port) to update security violation record and print
        out a message. If security is not satisfied then does not set
        agent-s-port to T. Returns NIL./;
    (MAPC (FUNCTION (LAMBDA (W)
            (COND ((SECUREP agent (CAR W) msg-role)
                    (SET (CADDR W) T))
                ((T (NOTIFY agent (CAR W))))))
        (GET-AGENT-CFNS agent)]
F159.(DE CK&SET-C-VAR (port agent msg-role port-c-agent obj-c-port)
    ;/Sets port-c-agent to T if security permits. Otherwise
        notifies security violation and does not set port-c-agent./;
    (COND ((SECUREP port agent msg-role)
                (SET port-c-agent obj-c-port))
            (T (NOTIFY port agent)]
F160.(DE NOTIFY (X Y)
    ;/Prints out a message notifying that port or agent X has attempted
        to send a message to a prohibited recipient Y. Saves (LIST X
        Y int) in the global variable Security-violations. Returns NIL.
        Increases int by 1 for every security violation at X. /;
    (PRINTMSG "Security violation: " X " trying to send
        a message to " Y
        ", in violation of security rules. Message blocked.")
    (PROG ((LV (ASSOCQ X Security-violations)) (LV1 (CDDR LV)))
```

-continued

```
        (COND ((NULL LV) (ATTACH (CONS X Y 1)
          Security-violations))
               (T (RPLACA LV1 (ADD1 (CAR LV1))]
F161.(DE NOTIFY-VIOLATION (X Y)
       ;/Notifies an attachment violation by X, trying to attach to a
       clock or watch ring Y./;
       (PRINTMSG "Security violation: " agent " trying to attach to ring
       " ring. Attempt blocked.")
       (PROG ((LV (ASSOCQ X security-violations)) (LV1 (CDDR LV)))
        (COND ((NULL LV) (ATTACH (CONS X Y 1)
          Security-violations))
               (T (RPLACA LV1 (ADD1 (CAR LV1))]
```

2.6.9. Functions that Define Signal Exchange Protocol Functions

There are basically six different kinds of protocol functions used in this design:

Agent-Sfn, which an agent uses to send start signals to ports that are tuned to it;

Agent-Cfn-port for every port tuned to an agent, which an agent uses to process completion signals received from ports that are tuned to it;

Next-Sfn, which an agent uses to send a start signal to the next agent on it's clock-ring on sensing satisfaction of agreement protocol;

Prev-Sfn, which an agent used to receive start signal sent to it by its previous agent;

Port-Sfn, which is used by a port to process start signals sent by its agent and send start signal to its parent object;

Port-Cfn, which is used by an agent to process completion signals received from its parent object and forward them to the agent it is tuned to.

The protocol functions of monitor agents attached to watch-rings are slightly different from those used by agents connected to clock-rings. Also, monitors on the delivery side (input monitors) of watch-ring are different from monitors on the dispatch side (output monitors). This gives rise to the various functions described in this section. We begin with WAIT-FN. This function is inserted usually in front of an agent-Sfn to temporarily halt protocol execution. In order to accommodate updates. When an agent is locked the WAIT-FN will cause the communications processor to wait until it gets unlocked, before it executes the agent's agent-Sfn. It is used only in front of the agent-Sfn. The various functions are briefly described first before their definitions are presented.

(WAIT-FN X): This function is used to make the communications processor wait till X has been unlocked. Usually, locks are used in TICC only for temporarily stopping execution of an agent-Sfn, which an agent uses to send start signals to ports that are tuned to it.

(DEFINE-AGENT-SFN agent (cr (CLOCK-RING-OF agent)): This defines the function that implements the start signal forwarding protocol, used by agents to send start signals to ports that are turned to them. The name of the function defined by this define function will have the form, <agent>-Sfn, where <agent> is the name of the agent in the function arguments.

(DEFINE-AGENT-CFN port (agent (GET-AGENT port))): This defines the function that is used by an agent to process completion signals received by the agent from a port that is tuned to it. The name of the function defined by this define function will have the form, <agent>-Cfn-<port>, where <agent> is the name of the agent in the function arguments, and <port> is the port tuned to <agent>.

(DEFINE-NEXT-SFN agent (next (GET-NEXT agent)) This defines the function that is used by an agent to send a start signal to its next agent, after it has sensed satisfaction of agreement protocol. The name of the function defined by this define function will have the form, <agent>-next-sfn, where <agent> is the name of the agent in the function arguments.

(DEFINE-PREV-SFN agent) This defines the function that is used by an agent to receive the start signal sent to it by its previous agent. The name of the function defined by this function is of the form <agent>-prev-Sfn, where agent is the argument.

(DEFINE-PORT-SFN port): This defines the function used by a port to process a start signal received from the agent that is tuned to it. The name of the function defined by this define function will have the form, <port>-Sfn, where <port> is the name of the port in the function argument.

(DEFINE-PORT-CFN port agent (GET-AGENT port))): This defines the function used by a port to process completion signals received from its parent object. The name of the function defined by this define function will have the form, <port>-Cfn, where <port> is the name of the port in the function argument.

(DEFINE-IM-SFN i-agent (wr (EVAL i-agent))): This defines the function that is used by an input monitor (i-monitor) to process start signals received from an agent. I-monitors are attached to delivery sides of watch-rings to monitor inputs that flow into ports that are attached to the watch-rings. The name of the function defined by this define function will have the form, <i-agent>-Stn, where <i-agent> is the name of the i-agent in the function arguments.

(DEFINE-IM-CFN m-port (i-agent (GET-AGENT m-port))): Same as DEFINE-AGENT-CFN. In this case agent will be an i-monitor agent, i-agent, and port will be a monitor port, m-port. The name of the function defined by this define function will have the form, <i-agent>-Sfn-<m-port>, where <i-agent> is the name of the i-agent in the function arguments and <m-port> is the name of m-port in the arguments.

(DEFINE-IM-NEXT-SFN i-agent): This defines the function that is used by an i-monitor to send start signals to its next i-monitor or to a port, as the case may be. The name of the function defined by this define function will have the form, <i-agent>-next-sfn, where <i-agent> is the name of the i-agent in the function argument.

(DEFINE-IM-PREV-SFN i-agent cr): This defines the function used by an input monitor to receive start signal from its previous agent. The name of the function defined by this function is of the form <agent>-prev-Sfn.

(DEFINE-OM-SFN o-agent (wr (EVAL o-agent))): This defines the function that is used by an output monitor on the dispatch side of a port, to process completion signals received from the port. The o-agent will use this function also to send start signals to ports tuned to it. These will be the monitor ports, o-ports. The name of the function defined by this define function will have the form, <o-agent>-Sfn, where <o-agent> is the name of the o-agent in the function arguments.

(DEFINE-OM-CFN o-port (o-agent (GET-AGENT o-port))): Same as DEFINE-AGENT-CFN. The function defined here is used by an o-agent to process completion signals received from o-ports that are tuned to it. The name of the function defined by this define function will have the form, <o-agent>-Sfn-<o-port>, where <o-agent> is the name of the o-agent in the function arguments, and <o-port> is the name of o-port in the arguments.

(DEFINE-OM-NEXT-SFN o-agent): Same as DEFINE-IM-NEXT-SFN. The function defined by this function is used by o-agent to forward the completion signals it received to its next o-agent on the dispatch side, or to a CR-agent that is next to it on its watch-ring. The name of the function defined by this define function will have the form, <o-agent>-next-Sfn, where <o-agent> is the name of the i-agent in the function arguments.

(DEFINE-OM-PREV-SFN o-agent cr): This function defines the function that is used by an output monitor to receive completion signal sent by a port or its previous agent. The name of the function define by this function has the form <agent>-prev-Sfn.

All signal-processing functions, defined by the above define-functions, will have no arguments. They use special (global) control signal variables to send and receive control signals. Control signal variables have the following format: X will use X-c-Y, to send completion signal, c, to Y. X will use the variable, X-s-Y, to send a start signal s to Y. When an agent, named A, senses satisfaction of agreement protocol, the state of satisfaction will be specified by three variables: A-CT, A-CD and A-CH. When agreement protocol is satisfied, only one of these three variables will be true. The action taken by A-next-Sfn is specified by these variables are as follows: In the following let <next-A> be the name of agent that is next to A on its clock-ring.

A-CT=T: Switch memories of the parent clock ring of agent A, and set A-s-<next-A> to T.

A-CD=T: Set A-s-<next-A> to T without switching the memories of the parent clock ring of A.

A-CH=T: Halt computations around the clock-ring of A by not setting A-s-<next-A> to T, With this preamble we may now proceed to present the various protocol function definition functions.

F162.(DE WAIT-FN (X)

;/Waits until X becomes unlocked and returns T./;

(LOOP WHILE (LOCKEDP X)  DO (WAIT))

F163. (DE DEFINE-PREV-SFN (agent (cr (AND (BOUNDP agent) (EVAL agent))))

;/This defines the function that is used by agent to sense the start signal sent to it by its previous agent on a clock-ring. When agent is detached from clock-ring this function is set to NIL. Agent-Sfn is set to NIL only when ports are detuned from it. Installs the function call into "prev-Sfn" property of agent. Returns the name of the newly defined function./;

(AND (AGENTP agent) (CLOCK-RINGP cr)

(PROG ((prev-Sfn (CONCAT agent '-prev-Sfn))

(s-var (CONCAT cr '-s-var)))

[EVAL (LIST 'DE prev-Sfn NIL (LIST 'PROG1 s-var (LIST 'SETQ 's-var NIL))]

(EVAL (LIST 'COMPILE prev-Sfn))

(PUT-PREV-SFN agent (NCONS prev-Sfn))]

F164. (DE DEFINE-AGENT-SFN (agent (cr (CLOCK-RING-OF agent)))

;/This <agent>-prev-Sfn to receive start signal from its previous agent. This defines the function <agent>-Sfn and returns the function call, (<agent>-Sfn), which it also puts as the value of agent property, "agent-Sfn." <Agent>-Sfn returns T, if successful, else returns NIL (i.e. if there are no ports tuned to agent or there are security violations). Normally, communications processor executes this function. But when a watch-ring is attached to an agent by CSM, after the attachment CSM will execute this function to send a start signal to the port of the newly attached watch-ring./;

(AND cr (BOUND-AGENTP agent)

```
(PROG    ((agent-Sfn (GET-AGENT-SFN agent))

(pending (CDR agent-Sfn))

(msg-role-var (GET-MSG-ROLE-VAR cr))

(prev-Sfn (GET-PREV-SFN agent)))

[EVAL (LIST 'DE (CAAR agent-Sfn) NIL (LIST 'AND prev-Sfn (LIST 'PROGN (LIST 'PUT-STATE agent ''busy)

(LIST 'PROG1

(LIST 'CK&SET-S-VARS agent msg-role-var)

(LIST 'SETQ pending NIL))]

(EVAL (LIST 'COMPILE agent-Sfn))

Agent-Sfn]
```

F165. (DE DEFINE-AGENT-CFN (port (agent (GET-AGENT port)))

;/Works only when agent is the name of an agent. Defines and compiles the agent-Cfn, <port>-Cfn-<agent>, and puts (<port> <port>-cfn-<agent>) in the ALIST, which is the value of the agent property, "agent-Cfn". <Agent> is the agent to which port is tuned. Returns, (<agent>-cfn-<port>) if agent is non-NIL, else returns NIL. Uses the special variable <port>-c-<agent> defined by the <port>-Cfn, calls <agent>-next-Sfn when agreement protocol is satisfied. <Agent>-Cfn-<port> returns the value returned by <agent>-next-Sfn. DEFINE-AGENT-CFN is called when port is tuned to agent. In the following the variable agent-Cfn-port is a list of the form (port (Cfn) agent-s-port Cfn-pending), where Cfn is of the form <agent>-Cfn-<port>./;

(AND (AGENTP agent)

(PROG ((port-c-agent (CONCAT port '-c- agent))

```
(agent-Cfn-port (ADD-AGENT-CFN (NCONS (CONCAT agent '-Cfn- port))))

(CD (CONCAT agent '-CD))

(CT (CONCAT agent '-CT))

(CH (CONCAT agent '-CH))

(#completed (CONCAT agent '-#completed))

(pending (CADDDR agent-Cfn-port)))

(EVAL (LIST 'DECLARE (LIST 'SPECIAL port-c-agent CD CH completed pending CT)))

(EVAL (LIST 'DE (CAADR agent-Cfn-port) NIL (LIST 'SELECTQ port-c-agent (LIST T (LIST 'SETQ CD NIL)

(LIST 'SETQ CH NIL)

(LIST 'SETQ CT T))

(LIST 'D (LIST 'SETQ CH NIL))

NIL)

(LIST 'AND CH (LIST 'SETQ CD NIL))

(LIST 'SETQ port-c-agent NIL)

(LIST 'SETQ #completed (LIST 'ADD1 #completed))

(LIST 'SETQ pending NIL)

(LIST 'AND (LIST 'EQ (LIST '#OF-PORTS agent)

#completed)

(LIST 'PROGN (LIST 'SETQ #completed 0)

(GET-NEXT-SFN agent)))]
```

F166.(DE DEFINE-NEXT-SFN (agent (cr (CLOCK-RING-OF agent)))

/;This function defines <agent>-next-Sfn, for agent and puts a function call, (<agent>-next-Sfn), as the value of agent property "next-Sfn". Returns the name of the newly defined function. The behavior of <Agent>-next-Sfn has been already described. By definition all variables, except those, which have been specifically declared as being unspecial, are special variables. <Agent>-next-Sfn returns T. This function is called only when agreement protocol is satisfied. So, every time it is called it is bound to succeed. This define function is called when an agent is attached to a clock-ring./;

(PROG ((next-Sfn (GET-NEXT-SFN agent))

(CD (CONCAT agent '-CD))

(CH (CONCAT agent '-CH))

(CT (CONCAT agent '-CT)))

(cr-s-var (CONCAT cr '-s-var)))

[EVAL (LIST 'DE (CAR next-Sfn) NIL (LIST 'COND (LIST CT (LIST 'SWITCH-MEMORIES cr)

(LIST 'SETQ CT NIL)

(LIST 'SETQ CD (LIST 'SETQ CH T))

(LIST 'SETQ cr-s-var T))

(LIST CD (LIST 'SETQ CH T)

(LIST 'SETQ cr-s-var T))

(LIST CH (LIST 'SETQ CD T)))

(LIST 'PUT-STATE agent ''idle)

cr-s-var]

(EVAL (LIST 'COMPILE next-Sfn))

next-Sfn]

F167.(DE DEFINE-PORT-SFN (port (agent (GET-AGENT port)))

;/Defines and compiles the port-Sfn, <port>-Sfn, installs the function call, (<port>-Sfn), as the property value of the "port-Sfn" property of port and returns this function call. Uses special variable, <agent>-s-<port>, where <agent> is the agent tuned to this port. This variable was declared as special in the <agent>-Sfn. Declares special variables, <port>-s-<obj>, where <obj> is the parent object of port, and <obj>-c-<port>, which is the special variable used by the parent object of port to send completion signal to port. This is called when port is tuned to an agent./;

(AND agent (PROG ((port-Sfn (GET-PORT-SFN port))

(agent-s-port (CONCAT agent '-s- port))

(obj (EVAL port))

(port-s-obj (CONCAT port '-s- obj))

(obj-c-port (CONCAT obj '-c- port))

(pending (CDR port-Sfn)))

(EVAL (LIST 'DECLARE (LIST 'SPECIAL agent-s-port pending obj-c-port port-s-obj)))

(SET obj-c-port (SET port-s-obj NIL))

[EVAL (LIST 'DE (CAAR port-Sfn) NIL (LIST 'AND agent-s-port (LIST 'PROGN (LIST 'PUT-STATE port 'busy)

(LIST 'SETQ agent-s-port NIL)

(LIST 'SETQ pending NIL)

```
                    (LIST 'SETQ port-s-obj T)]

(EVAL (LIST 'COMPILE port-Sfn))

port-Sfn]

F168.(DE DEFINE-PORT-CFN (port (agent (GET-AGENT port)))

/;Defines and compiles the function <port>-Cfn, and puts the
      function call, (<port>-Cfn), as the value of the property "port-
      Cfn" of the port. All variables except those declared as being
      unspecial as special variables. Returns NIL if port is not tuned
      to any agent. This is called when agent is tuned to port./;

(AND agent (PROG ((port-Cfn (GET-PORT-CFN port))

(obj (EVAL port))

(obj-c-port (CONCAT obj '-c- port))

(pending (CDR port-Cfn))

(port-c-agent (CONCAT port '-c- agent))

(msg-role-var (GET-MSG-ROLE-VAR (CLOCK-RING-OF agent)))

(EVAL (LIST 'DECLARE (LIST 'SPECIAL obj-c-port pending port-c-agent msg-role-var)))

(SET port-c-agent NIL)

(EVAL (LIST 'DE (CAAR port-Cfn) NIL (LIST 'AND obj-c-port (LIST 'PROGN (LIST 'CK&SET-C-VAR port agent msg-role-var)

(LIST 'SETQ port-c-agent T))

(LIST 'SETQ obj-c-port NIL)
```

```
                    (LIST 'PUT-STATE port ''idle)

(LIST 'SETQ pending NIL)

port-c-agent))))

(EVAL (LIST 'COMPILE port-Cfn))

port-Cfn]

F269. (DE DEFINE-IM-PREV-SFN (i-agent (wr (AND (BOUNDP i-agent)

(EVAL i-agent))))

;/Defines the function that is used by i-agent to trap start signal
      sent by an agent to the port it is tuned to.  This function is
      used by <i-agent>-Sfn./;

(AND (AGENTP i-agent)(WATCH-RINGP wr)

(PROG ((prev-Sfn (CONCAT i-agent '-prev-Sfn))

(agent (GET-AGENT wr))

(port (GET-PORT wr)))

(AND agent port (PROGN (EVAL (LIST 'DE prev-Sfn NIL (CONCAT agent '-s- port)))

(EVAL (LIST 'COMPILE prev-Sfn))

prev-Sfn]

F270. (DE DEFINE-OM-PREV-SFN (o-agent (wr (AND (BOUNDP o-agent)

(EVAL o-agent))))

;/Defines the function that is used by o-agent to trap completion
      signal sent by a port to the agent it is tuned to.  This function
      is used by <0-agent>-Sfn./;

(AND (AGENTP o-agent)(WATCH-RINGP wr)

(PROG ((prev-Sfn (CONCAT o-agent '-prev-Sfn))
               ...
```

```
                    (agent (GET-AGENT wr))

(port (GET-PORT wr)))

(AND agent port (PROGN (EVAL (LIST 'DE prev-Sfn NIL (CONCAT port '-c- agent)))

(EVAL (LIST 'COMPILE prev-Sfn))

(PUT-PREV-SFN o-agent (NCONS prev-Sfn))

prev-Sfn]

F171.(DE DEFINE-IM-SFN (i-agent (wr (EVAL i-agent))

(cr (CLOCK-RING-OF i-agent)))
```

;/This defines the function, <i-agent>-Sfn, that is used by an
input monitor, i.e., monitor attached to the delivery side of a
watch-ring, to trap a start signal that is sent by an agent to
its port using the <i-agent>-prev-Sfn. A function call to <i-
agent>-Sfn is in the property value of "agent-Sfn" property of i-
agent. The only difference between the <i-agent>-Sfn and
<agent>-SFN of a CR-agent is that the former does not reset start
signal variable to NIL. The defining function returns the name
of the defined function. <I-agent>-Sfn will return T if
successful, else NIL. This defining function is called when i-
agent is attached to watch-ring./;

```
    (AND cr (WATCH-RINGP wr)(TUNED-AGENTP i-agent)

(PROG ((agent-Sfn (GET-AGENT-SFN i-agent))

(agent (GET-AGENT wr))

(port (GET-PORT wr))

(agent-s-port (CONCAT agent '-s- port))

(pending (CDR agent-Sfn))

(msg-role-var (GET-MSG-ROLE-VAR cr))
```

```
                    (prev-Sfn (GET-PREV-SFN i-agent)))
        [EVAL (LIST 'DE (CAAR agent-Sfn) NIL
                      (LIST 'COND
                          (LIST prev-Sfn
                              (LIST 'PUT-STATE i-agent 'busy)
                              (LIST PROG1
                                  (LIST 'CK&SET-S-VARS i-agent
                                                        msg-role-var)
                                  (LIST 'SETQ pending NIL)))]
            (EVAL (LIST 'COMPILE agent-Sfn))
        agent-Sfn]

F172.(DE DEFINE-IM-CFN (m-port (i-agent (GET-AGENT m-port)))
    ;/Same as DEFINE-AGENT-CFN. This is called when m-port (monitor
        port) is tuned to i-agent. But does not redefine it, if it had
        been already defined./;
    (PROG ((Cfn (GET-AGENT-CFN i-agent m-port)))
        (OR (GETD (CAADR Cfn)) (DEFINE-AGENT-CFN m-port i-agent)]

F173.(DE DEFINE-IM-NEXT-SFN (i-agent
                        (next-Sfn (GET-NEXT-SFN i-agent)))
    ;/Same as DEFINE-NEXT-SFN, but for the difference that this sends to
        its next agent the signal it trapped from its parent watch-ring.
        This is called when i-agent is attached to a watch-ring.
        Replaces the existing next-Sfn definition with the new one../;
    (PROG ((CH (CONCAT i-agent '-CH))
           (CT (CONCAT i-agent '-CT))
           (CD (CONCAT i-agent '-CD))
           (#completed (CONCAT i-agent '-#completed)))
```

```
         [EVAL (LIST 'DE (CAR next-Sfn) NIL (LIST 'COND (LIST CT (LIST 'SWITCH-MEMORIES (CLOCK-RING-OF i-agent))

(LIST 'SETQ CT NIL)

(LIST 'SETQ CD (LIST 'SETQ CH T)))

(LIST CD (LIST 'SETQ CH T))

(LIST CH (LIST 'SETQ CD T)))

(LIST 'PUT-STATE i-agent ''idle)

T]

(EVAL (LIST 'COMPILE next-Sfn))

next-Sfn]

F174.(DE DEFINE-OM-SFN (o-agent (wr (EVAL o-agent))

(cr (CLOCK-RING-OF o-agent)))

;/This function is used to trap the completion signal sent by a port
     to its agent in order to monitor the outputs being sent out by
     the port.  Defines function only if s-vars is non-NIL.  This is
     called when o-agent is attached to watch-ring./;

(AND cr (WATCH-RINGP wr)(TUNED-AGENTP o-agent)

(PROG ((agent-Sfn  o-agent))

(port-c-agent (CONCAT (GET-PORT wr) '-c-

(GET-AGENT wr)))

(pending (CADR agent-Sfn))

(prev-Sfn (GET-PREV-SFN o-agent)

(msg-role-var (GET-MSG-ROLE-VAR (CLOCK-RING-OF o-agent))))

[EVAL (LIST 'DE (CAAR agent-Sfn) NIL
```

```
                    (LIST 'AND prev-Sfn (LIST 'PROGN (LIST 'PUT-STATE o-agent ''busy)

(LIST 'PROG1

(LIST 'CK&SET-S-VARS o-agent msg-role-var)

(LIST 'SETQ pending NIL))]

(EVAL (LIST 'COMPILE agent-Sfn))

agent-Sfn]

F175.(DE DEFINE-OM-CFN (o-port (o-agent (GET-AGENT o-port)))

;/Same as DEFINE-AGENT-CFN.  This is called when o-agent is tuned to
      o-port./;

(DEFINE-AGENT-CFN o-port o-agent)]

F176.(DE DEFINE-OM-NEXT-SFN (o-agent)

;/Same as IM-NEXT-SFN/;

(DEFINE-IM-NEXT-SFN o-agent)]
```

2.6.10. Communications Processor Functions

```
F177.(DE SEGMENT-DRIVER (segment)

;/Segment is a list of protocol functions.  Evaluates the protocol
      functions in the segment in left to right order.  At any point in
      the evaluation, continues evaluation only if the last evaluated
      function returns T.  Returns NIL./;

(LOOP WHILE (EVAL (CAR segment)) DO (SETQ segment (CDR segment)))

NIL]

F178.(DE TICC-DRIVER ((Appln Current-appln)

(processors (GET-PROCESSORS Appln)))
```

2.6.10. Communications Processor Functions

---

F177.(DE SEGMENT-DRIVER (segment)
    ;/Segment is a list of protocol functions. Evaluates the protocol
    functions in the segment in left to right order. At any point in
    the evaluation, continues evaluation only if the last evaluated
    function returns T. Returns NIL./;
    (LOOP WHILE (EVAL (CAR segment)) DO (SETQ segment (CDR segment)))
    NIL]

F178.(DE TICC-DRIVER ((Appln Current-appln)
              (processors (GET-PROCESSORS Appln)))
    /;Appln is the name of an application. Processors is the list of
    processors being used in the application. Initializes the
    pending list, X-pending-lst to (NIL . X), for each processor X
    and then calls UPD-PENDING-LST to replace NIL in (NIL . X) by
    pending segments of processor X. Then for each segment of each
    X-pending-lst calls SEGMENT-DRIVER to execute the segment. After
    all the segments in X-pending-lst are executed, empties this
    list. Then calls UPD-PENDING-LST to replenish X-pending-lst with
    pending segments, which might have since accumulated in X-pl-upd-
    lst and continues operations all over again./;
    (PROG((PLs (MAPCAR (FUNCTION (LAMBDA (X) (CONS NIL X)))
                       processors)))
      ;/This initializes the pending list, X-pending-lst, of each
    processor, X, to the form (NIL. X)./;
    (MAPC (FUNCTION (LAMBDA (pl) (UPD-PENDING-LST pl))) PLs)
    ;/ MAPC presents pending-lst pl for each processor X to UPD-
      PENDING-LST in the order they appear in PLs. Each pl that
      is presented to UPD-PENDING-LST will be of the form (NIL .
      X), where X is a processor. UPD-PENDING-LST replaces NIL
      in (NIL . X) by the list of pending segments in X-pl-upd-
      lst of processor X, and sets the semaphore of processor X
      to T. After this replacement, pl will have the form $((S_1\ S_2\ ...\ S_k)\ .\ X)$,
      where $(S_1\ S_2\ ...\ S_k)$ is the list of pending
      segments that are being presented to C by processor X./;
    (LOOP WHILE (NULL HALT-DRIVER) DO
       (MAPC (FUNCTION (LAMBDA (pl)
                (MAPC (FUNCTION (LAMBDA (seg)
                            (SEGMENT-DRIVER seg)))
                    (CAR pl))
                (RPLACA pl NIL)
                (UPD-PENDING-LST pl)))
            PLs))
      ;/, There are two MAPC functions here, the outer MAPC and the
    embedded MAPC. The outer MAPC presents each pl in PLs to the
    embedded MAPC. Each pl in PLs will initially be of the form $((S_1$
    $S_2\ ...\ S_k)\ .\ X)$, where X is a processor and $S_1$'s are segments of
    protocol functions that are pending to be executed. (CAR pl) = $(S_1\ S_2\ ...\ S_k)$.
    The embedded MAPC presents each segment, $S_1$, in (CAR
    pl) to the SEGMENT-DRIVER. When all segments in (CAR pl) have
    been executed, the outer MAPC function sets CAR of pl to NIL and
    calls UPD-PENDING-LST with pl as its argument. UPD-PENDING-LST
    will take pl, which now will have the form (NIL . X), and replace
    NIL with new segments that may now be pending in X-pl-upd-lst of
    processor X. This will bring pl back to the form $((S_1\ S_2\ ...\ S_n)\ .$
    $X)$. After doing this the outer MAPC will present to embedded
    MAPC the next pl in PLs. This process will continue till all the
    pl's in PLs are emptied and replenished. Since outer MAPC is
    repeatedly executed until HALT-DRIVER is set to T, this process
    will continue for ever until terminated./;]

F179.(DE UPD-PENDING-LST (pl)
    ;/Pl is of the form (NIL. X), where X is the name of a processor.
    If (UPDATEDP X) is T, i.e., the semaphore of processor X is T,
    then does nothing. Else, i.e., if the semaphore of processor X
    is NIL, then replaces NIL in pl = (NIL. X), with contents of X-
    pl-upd-lst and sets the semaphore of processor to T. It is
    possible for processor X to append new segments to X-pl-upd-lst
    during this transfer process, without interfering with the
    transfer./;
    (OR (UPDATEDP (CDR pl))
      (PROGN (RPLACA pl (CAR (GET-PL-UPDATES (CDR X))))
            (PUT-SEMAPHORE (CDR X) T)]

2.6.11. CCL Compiler Functions for Creating and Updating Segments and Pending Lists When the CCL compiler encounters the CCL (Causal Communication Language) statement of the form, "@(c)→P," in source code of an object, the compiler will create object code that correspond to the two LISP statements, "(SETQ @-c-P T)" and the main function of this section, "(GET-SEGMENT-OF-PORT (PROCESSOR-OF @) P)". The object will use this code to get a segment of protocol functions, whose execution will cause the intended message transfer to occur, and append it to X-pl-upd-lst, where x=(PROCESSOR-OF @). The "segment" property of port P will hold the segment that should be thus appended to X-pl-upd-lst. The value of this "segment" property will be recomputed if the pathway associated with port P had changed since the last time it was used.

Processors performing updates to TICC-pathways, will sense the "pending" signal of every protocol function associated with pathways on which updates have to be performed, and perform the updates only when the pending signal becomes NIL. While doing the updates pertinent agents in the pathways that are being updated would be locked, so that none of the pathway protocol functions associated with them would get executed while the pathway is being updated. Diagrams in FIG. 10 to FIG. 15 show the segments for the various typical cases, which may arise in a TICC-network. Cases in which a monitor agent is attached to a watch-ring of another monitor-agent are not shown. Segments for such cases may be easily computed using pathway tracings similar to the ones shown in FIGS. 10 through 15.

FIG. 10 shows a segment from port P1 of object O1 to ports P2, P3 and P4 of objects O2, O3 and O4. Port P1 sends completion signal c to agent A1, which sends start signal s to agent A2, which forwards this start signal to all ports, P2, P3 and P4 of objects O2, O3 and O4 that are tuned to it. The sequence of protocol functions for this pathway segment is SEGMENT: (P1-Cfn, A1-Cfn-P1, Wait-Fn(A2), A2-Sfn, P2-Sfn, P3-Sfn, P4-Sfn), as shown in the figure.

Wait-Fn(A2) is inserted in front of A2-sfn in the above segment. This Wait-Fn will delay the execution of A2-Sfn until its lock has been released. This will temporarily prevent agent A2 from sending start signals to ports P2, P3 and P4 that are tuned to it. CSM may lock agents, when necessary, in order to prevent interference with on going pathway updates. During execution of the above segment by SEGMENT-DRIVER if agent A2 had been locked then SEGMENT-DRIVER will wait until agent A2 becomes unlocked, before continuing with execution of the rest of the segment. Such Wait-Fns appear in all the segments displayed in FIGS. 10 through 15.

FIG. 11 shows the pathway segment from port P1 of object O1 to monitor ports P2, P3 and P4, of objects O2, O3 and O4, via monitor agent A1 on the dispatch-side of the watch-ring shown in the figure. In this case port P1 of object O1 sends a completion signal c via dispatch-side of the watch-ring in the figure. This completion signal is trapped by the monitor agent A1, which then sends start signals to all ports, P2, P3 and P4 of objects O2, O3 and O4 that are tuned to it. The segment of protocol functions in this case is, SEGMENT: (P1-Cfn Wait-Fn(A1) A1-Sfn P2-Sfn P3-Sfn P4-Sfn), as shown in the figure.

FIG. 12 shows the protocol segment in the case where the start signal sent by agent A2 in the figure is trapped by monitor agent, A3, on the delivery side of the watch-ring attached to agent A2. Here the monitor agent A3 forwards the start signal it trapped to all its monitor ports P2, P3 and P4 of objects O2, O3 and O4. The segment starts with port P1 of object O1 sending a completion signal c via dispatch-side of watch-ring attached to it. Agent A1 may respond to the receipt of this completion signal by sending start signal to agent A2. The segment of protocol functions in this case is, SEGMENT: (P1-Cfn, A1-Cfn-P1, Wait-Fn(A2), A2-Sfn, Wait-Fn(A3), A3-Sfn, P2-Sfn, P3-Sfn, P4-Sfn), as shown in the figure. In this case provision is made to lock either agent A2 in the figure, or the monitor agent A3, or both.

FIG. 13 shows the segment of protocol functions when a monitor port, port P2 of object O2 in the figure, sends completion signal c to its agent, A1 attached to the dispatch-side of the watch-ring in the figure. In this case when agent A1 detects satisfaction of agreement protocol, it will forward the completion signal it received from port P1 of object O1 to agent A2 in the figure. A2 may then send a start signal s to agent A3, who will forward it along the delivery-side of its watch-ring to the sort of object O5 to which it is tuned. But on its way along the delivery-side of the watch-ring, this signal will be trapped by the monitor agent A3, who will forward it to all its tuned ports, P3, P4 and P5 of objects O3, O4 and O5. The segment of protocol functions in this case is, SEGMENT: (P2-Cfn, A1-Cfn-P2, A2-Cfn-P1, Wait-Fn (A3), A3-Sfn, Wait-Fn(A4), A4-Sfn, P3-Sfn, P4-Sfn, P5-Sfn), as shown in the figure.

FIG. 14 shows the segment when port P1 of the monitoring object O3 sends completion signal c to its agent A1. Here agent A1 will send start signal s to port P2 of object O1. The segment in this case is, SEGMENT: (P1-Cfn, A1-Cfn-P1, P2-Sfn), as shown in the figure.

FIG. 15 shows two cases, where monitor agents, A1 on delivery-side and A3 on dispatch-side, receive completion signals c from their respective ports. In this case the delivery and dispatch sides of the watch-ring have, another monitor A2 and A4, respectively, attached to them. On the dispatch-side segment starts with port P1 of object O2 sending a completion signal c to its agent A1. A1 sends completion signal to agent A2, which then sends start signals s to all ports P3, P4 and O5 of objects O3, O4 and O5, that are tuned to it. The segment in this case is, SEGMENT1: (P1-Cfn, A1-Cfn-P1, Wait-Fn(A2), A2-Sfn, P3-Sfn, P4-Sfn, P5-Sfn).

Similarly, on the delivery side the segment begins with port P6 of object O6 sending a completion signal to agent A3. A3 then sends start signal s to agent A4, who forwards it to ports P7, P8 and P9 of objects O7, O8 and O9. The segment in this case is, SEGMENT2: (P6-Cfn, A3-Cfn-P6, Wait-Fn(A4), A4-Sfn, P7-Sfn, P8-Sfn, P9-Sfn), as shown in the figure.

Functions used to generate the various segments presented above are defined below. The only function that is used by TICC-Compiler is the toplevel function, GET-SEGMENT-OF-PORT. In our latency calculations we assumed that the standard number of protocol functions in a segment would be (n+3) if an agent had, on the average, n ports tuned to it. We did not count here the WAIT-FN. This comes into play only when pathways are being updated, and this should not be a frequent occurrence. Also one may notice in paragraph 244 (FIG. 13) above, n=3. But, the segment length is 8, without counting the WAIT-EN, instead of being (n+3)=6. This is the case whenever monitors are attached to watch-rings. The cost of monitoring is always increased latency and delay. Since in TICC monitors may be recursively attached to watch-rings of other monitors, there is in principle no limit to number of protocol functions a segment may contain. Such recursive data monitoring is, however, extremely unlikely to occur in practice. Even if it does (as it might in intelligence operations) it should be used with great care. Also, data monitoring should never be a natural part of computing in application systems. It should normally represent an exceptional situation. In calculating latency we excluded all exceptional situations.

```
F180.(DE GET-SEGMENT-OF-PORT (processor port)
    ;/This function is called by TICC-Compiler, when parent object of
    port executes causal statement of the form "(@(c) → P)"
    statement, where @ is the self-reference for the parent object of
    port and P is the port. When "(@(c) → P)" is executed by
    object, @ would send a completion signal to its port, P. A list
    of protocol functions, called segment, consisting of start and
    completion signal processing functions of agents/ports that are
    in the pathway connected to port P, is constructed and attached
    to pl-upd-lst of the processor of parent object @./;
    (PUT-READ-MEMORY port (PUT-WRITE-MEMORY port NIL))
    ;/Resets the read and write memories of port to NIL. The next time
    port reads and writes into these memories the memories might have
    been switched. The first time a port reads or writes into the
    read/write memories of its clock-ring it will initialize these
    memory to the correct addresses./;
    (ADD-SEGMENT processor
                    (SET-UP-PENDING-FLAGS
                        (OR (GET-SEGMENT port)
                            (MAKE-PORT-SEGMENT port))
    ;/ADD-SEGMENT adds a new segment to the pl-upd-lst of processor.
    SET-UP-PENDING-FLAGS initializes all pending flags of protocol
    functions in the just formed segment to T. The segment is
    obtained from the "segment" property of port if it is there. If
    "segment" property is NIL, then a new segment is computed using
    MAKE-PORT-SEGMENT function. This new segment will then be
    installed in the "segment" property of port./;]
F181. (DE SET-UP-PENDING-FLAGS (seq-vars)
    ;/Seg-vars is (segment. p-vars), where p-vars is a list of
    pending-vars associated with the protocol functions in the
    segment. This sets every pending-var in p-var to T and returns
    the segment containing only the protocol functions./;
        (MAPC (FUNCTION (LAMBDA (W) (SET W T))) (CDR seg-vars))
        (CAR seg-vars)]
F182.(DE MAKE-PORT-SEGMENT (port (wr (GET-WATCH-RING port)))
    ;/A new pathway segment for port has to be constructed because
    pathway has changed, since it was used last time. This function
    constructs the new segment and puts it as the value of "segment"
    property of port. Returns the segment./;
      [PROG ((agent (GET-AGENT port)))
        (AND agent
        (PROG ((o-monitor (GET-FITST-OM port))
                (segment (NCONS))
                (p-vars (NCONS))
                (Fn (GET-PORT-CFN port)))
            (TCONC segment (CAR Fn))
            (TCONC p-vars (CDR Fn))
            (COND (o-monitor
                    (TCONC segment (LIST 'WAIT-FN o-monitor))
                    (TCONC segment
                            (CAR (SETQ Fn (GET-AGENT-SFN o-monitor))))
                    (TCONC p-vars (CDR Fn))
                    (UPD-DELIVERY-SEGMENT o-monitor segment
                                                    p-vars))
                  ((MONITORP agent)
                    (UPD-MONITOR-SEGMENT port agent segment
                                                    p-vars))
                  ((CR-AGENTP agent)
                    (UPD-CR-AGENT-SEGMENT port agent segment
                                                    p-vars)))
            (PUT-SEGMENT port (CONS (CAR segment) (CAR p-vars)))]
F183.(DE O-MONITORP (agent)
    ;/Returns T if agent is an o-monitor, else NTL./;
    (EQ (TYPE-OF agent) 'OM)]
F184.(DE I-MONITORP (agent)
    ;/Returns T if agent is an i-monitor, else NIL./;
    (EQ (TYPE-OF agent) 'IM)]
F185.(DE MONITORP (agent)
    ;/Returns T if agent is an O or I monitor, else NIL./;
    (OR (O-MONITORP agent) (I-MONITORP agent))]
F186.(DE UPD-DELIVERY-SEGMENT (agent segment p-vars)
    ;/Updates segment and p-vars, respectively, with delivery side
    monitor's start protocol function and its pending variables, if
```

-continued

```
              there is a monitor on the delivery side, else updates with the
              start protocol function of port tuned to agent and its pending
              variable. Agent here can be a CR, OM or IM agent. Returns NIL./;
              (PROG ((i-monitor (GET-FIRST-IM wr)) Fn)
                (COND [i-monitor
                          (TCONC segment
                              (CAR (SETQ Fn (GET-AGENT-SFN i-monitor))))
                          (TCONC p-vars (CDR Fn))
                          (MAPC (FUNCTION (LAMBDA (W)
                                              (SETQ Fn (GET-PORT-SFN (GET-PORT W))
                                              (TCONC segment (CAR Fn))
                                              (TCONC p-vars (CDR Fn))))
                                  (GET-WATCH-RINGS i-monitor)]
                      [T (MAPC (FUNCTION (LAMBDA (W)
                                              (SETQ Fn (GET-PORT-SFN (GET-PORT W)))
                                              (TCONC segment (CAR Fn))
                                              (TCONC p-vars (CDR Fn))))
                                  (GET-WATCH-RINGS agent)]
F187. (DE UPD-MONITOR-SEGMENT (port agent segment p-vars)
              ;/Agent here is a o-monitor or i-monitor. This function is used
              by MAKE-PENDING-LST in response to a completion signal received
              by a port. This takes care of the case, where the agent to which
              port is tuned is itself a monitor agent. Segment and p-vars are
              TCONC lists of pending agent/port protocol functions and pending
              variables. Puts into the tail of these appropriate additional
              protocol functions and pending variables and returns NIL.
              Considers three cases: the next agent of agent is also a monitor
              agent, next agent is a CR-agent (or o-monitor) or the next agent
              is actually a port (or i-monitor). Returns NIL./;
              (PROG ((Fn (GET-AGENT-CFN agent port)))
                  (TCONC segment (CAR Fn))
                  (TCONC p-vars (CADDDR Fn))
                  (COND [(MONITORP (SETQ agent (GET-NEXT agent)))
                              (TCONC segment (LIST 'WAIT-FN agent))
                              (TCONC segment
                                  (CAR (SETQ Fn (GET-AGENT-SFN agent))))
                              (TCONC p-vars (CDR Fn))
                              (UPD-DELIVERY-SEGMENT agent segment p-vars)]
                          [(CR-AGENTP agent)
                              (UPD-CR-AGENT-SEGMENT port agent segment p-vars)]
                          [(PORTP agent)
                              (TCONC segment (CAR (SETQ Fn (GET-PORT-SFN agent))))
                              (TCONC p-vars (CDR Fn))]
                      NIL]
F188.(DE UPD-CR-AGENT-SEGMENT (port agent segment p-vars)
              /;Called from MAKE-PORT-SEGMENT. Takes care of the case where
              the agent tuned to port is a CR-agent. Adds to the tail of
              segment, which is a TCONC list, the appropriate additional
              protocol functions and returns NIL. Updates the tail of p-vars
              with the appropriate pending variables./;
              (PROG ((Fn (GET-AGENT-CFN agent port)))
                  (TCONC segment (CAR Fn))
                  (TCONC p-vars (CADDDR Fn))
                  (SETQ agent (GET-NEXT agent))
                  (TCONC segment (LIST 'WAIT-FN agent))
                  (TCONC segment (CAR (SETQ Fn (GET-AGENT-SFN agent))))
                  (TCONC p-vars (CDR Fn))
                  (UPD-DELIVERY-SEGMENT agent segment p-vars)
              NIL]
```

2.6.12. CSM Functions to Create, Install and Remove Pathway Components

It should be noted; an application system might have several CSM instances. Different processors would execute different CSM instances. The following should always hold true: a pathway or a pathway component might be removed or destroyed, or otherwise modified, only by the same CSM instance that created it. Also, all components of a pathway should always be installed by the same CSM instance. This will avoid race conditions during dynamic pathway updating processes. Controls needed to enforce this requirement are not shown in the functions below. One may introduce such controls as follows: Associate with each pathway and pathway component a "created-by" property. The value of this property would be the CSM instance that created the pathway. Modifications on a pathway would be allowed only if they were being attempted by the same CSM instance that created the pathway.

2.6.12.1 Clock-ring Creation and Destruction Functions

```
F189. (DE CREATE-CR (Cr (units 256) (sc '(0.0)) processor)
          ;/Creates a new clock-ring, Cr and initializes all the property
          values in the property list of the clock-ring, Cr. Installs and
          initializes its first agent. This function is used only for
          newly created clock-rings. Returns the name of first agent on
          Cr. Allocates units of words (default value 256) of memories for
          read/write memories and one fourth of it for the scratchpad
```

2.5.12.2. Agent Creation and Installation Functions

Create agent creates and initializes an instance of agent. A newly created agent may be installed on a clock-ring or installed as a monitor on delivery or dispatch side of a watch-ring. When it is installed some of its protocol functions will be defined. All the protocol functions will be defined only when an agent gets tuned to a port. When an agent is created, if it is not being attached to any other TICC component with an already assigned security classification, it would get the security classification NIL. Later it would acquire the classification of the first TICC component to which it was being attached. An agent may be installed on a clock-ring, or attached to a watch-ring, only if its security-classification matches with the security classification of the clock-ring or watch-ring. A violation of this condition will result in a notification being generated. In the following we use the term "tuning" to refer to the operation which gives the capability to a port, to access the read, write and scratchpad memories of a clock-ring, if security considerations permit such access. Thus, if A is the agent connected to a clock-ring, C, then ports tuned to A would, of course, have the capability to access all the clock-ring memories, if security considerations permit. The agent A would be connected to its tuned ports via watch-rings. Also, when tuned to each other, agent A and ports tuned to it would be listening to each other, in order to receive control signals from each other. Watch-rings may have monitor agents attached to them and these monitor agents would be tuned to monitor ports.

We use the term "tuning monitors" to the operation, which gives access rights to monitor ports, to access the memories of clock-ring C. A monitor port would acquire this right when clock-ring memory addresses are copied into the property list of monitor ports. If a monitor port is tuned to a monitor agent, A, then this monitor port would have read/write access rights only to the memories of clock-ring, cr, where cr=(CLOCK-RING-OF A). These addresses would be removed after each cycle of computation. Thus every time a new computation begins these rights would have to be restored. Every time a pathway is changed, all ports whose segments are affected by it will be reset to NIL. The functions used to do this are all presented in the miscellaneous functions section, at the end of this chapter.

```
memory of the clock-ring. Allocate-mem returns (s-address . e-
address), where s-address is the starting address and e-address
is the ending address. This function returns first agent
installed on the clock-ring. ALLOCATE-MEM is not a LISP
function. The memory allocated by ALLOCATE-MEM is outside
the scope of LISP garbage collector and is protected./;
(COND ((EXISTSP Cr)
        (PRINTMSG "From CREATE-CR:" Cr "exists
        already as a TICC
name. Please use a different name."))
      (T (OR Cr (SETQ Cr (GEN-NAME 'CR processor)))
        (PROG ((Agent1 (CONCAT Cr '-Agent1))
               (msg-role-var (CONCAT Cr '-msg-role-var))
               (cr-s-var (CONCAT Cr '-s-var)))
          (EVAL (LIST 'DECLARE (LIST 'SPECIAL
          cr-s-var Cr
                                    Agent1 msg-role-var)))
          (SET cr-s-var NIL)
          (SET msg-role-var (CDR sc))
          (PUT-READ-MEMORY Cr
          (ALLOCATE-MEM units))
          (PUT-WRITE-MEMORY Cr (ALLOCATE-MEM
          units))
          (PUT-SCRATCHPAD Cr (ALLOCATE-MEM
                              (QUOTIENT units 4)))
          (PUT-AGENTS Cr (NCONS Agent1))
          (PUT-SC Cr sc)
          (PUT-N-CLOCK-RING Cr Cr)
          (SET Cr Agent1)
          (INI-FIRST-AGENT Agent1 Cr)))]
F190. (DE DESTROY-CR (Cr flag)
    ;/Destroys the clock-ring and removes it from the name space,
    only if none of the agents on the ring have ports tuned to
    them, if flag is NIL. If flag is, T, then detaches all agents
    from clock-ring. Detunes all ports that were tuned to Cr.
    Returns T if successful, else returns NIL. In all cases keeps
    watch-rings still attached to their respective ports and
    agents./;
    (COND ((NULL (CLOCK-RINGP Cr))
            (PRINTMSG "From DESTROY-CR:" Cr "is not a clock-
ring."))
          ((AND (NULL FLAG) (BOUND-CRP Cr))
            (PRINTMSG "From DESTROY-CR: Some agents
            on" Cr "are
still tuned to ports. Use (DESTROY-CR " Cr " T) to detach all
agents on" Cr "and destroy Cr."))
          (flag (DETACH-ALL-AGENTS Cr)
            (DESTROY (CONCAT Cr '-s-var))
            (DESTROY (GET-MSG-ROLE-VAR Cr))
            (DESTROY Cr)]
```

---

```
F191. (DE CREATE-AGENT (Agent sc processor)
    ;/Creates a new agent with specified security-class (default value
    NIL) and returns Agent. Processor that creates the agent would
    be the processor that executes this code./;
    (COND ((AGENTP Agent)
            (PRINTMSG "From CREATE-AGENT: " Agent " already exists.))
          (T (OR Agent (SETQ Agent (GEN-NAME 'A processor)))
            (PROG ((#completed (CONCAT Agent '-#completed)))
              (EVAL (LIST 'DECLARE (LIST 'SPECIAL #completed
                                                  Agent)))
              (SET #completed 0)
              (PUT-SC Agent sc)
              (INI-AGENT Agent)]
    Note: INI-AGENT is function number F252.
F192. (DE INI-AGENT-FNS (agent)
    ;/Initializes <agent>-Sfn, <agent>next-Sfn, <agent>-prev-Sfn and
    installs them in the agent property list. Sets <agent>-Cfns
    property to NIL. Returns agent. This function is called by INI-
    AGENT./;
    (PROG ((Fn (CONCAT agent '-Sfn)))
      (PUTD Fn NIL)
      (PUT-AGENT-SFN agent (NCONS Fn))
```

-continued

```
        (PUT-AGENT-CFNS agent NIL)
        ;/CFNS of an agent will get defined only when agent is tuned
    to ports./;
        (PUTD (SETQ Fn (CONCAT agent '-next-Sfn)) NIL)
        (PUT-NEXT-SFN agent (NCONS Fn))
        (PUTD (SETQ Fn (CONCAT agent '-prev-Sfn)) NIL)
        (PUT-PREV-SFN agent (NCONS Fn))]
        agent]
F193. (DE INSTALL-AGENT (agent prev (cr (EVAL prev)))
    ;/Installs agent on clock ring cr just after the previous agent,
    prev. Re-initializes cr and agents on cr, and returns agent.
    Resets the segment property of relevant ports to NIL. It is
    possible that agent is already tuned to some ports./;
    (COND ((NULL (CLOCK-RINGP cr)) (PRINTMSG "From INSTALL-AGENT:"
        prev "is not attached to a clock-ring."))
            ((NULL prev) (PRINTMSG "From INSTALL-AGENT: The previous
        agent should be specified."))
            ((NEQ (EVAL prev) cr) (PRINTMSG "From INSTALL-AGENT: The
        previous agent" prev "is not attached to clock-ring" cr"."))
            ((NULL agent)
                (INSTALL-AGENT1 (GEN-NAME 'A (PROCESSOR-OF @))
                            prev Cr))
            ((NULL (COMPATIBLE-AGENTP agent cr)) (PRINTMSG "From
        INSTALL-AGENT:" agent "is not compatible with " cr"."))
            (T (INSTALL-AGENT1 agent prev cr)]
F194. (DE INSTALL-AGENT1 (agent prev cr)
    ;/Does the work for INSTALL-AGENT. Returns agent. Does not do
    any argument checking. It is possible that agent is already
    tuned to some ports. Agent is assumed to be already
    initialized./;
    (PROG ((LV1 (GET-SC agent))
            (LV2 (GET-SC prev))
            (next (GET-NEXT prev)))
        (COND   ((AND LV1 (LESSP (CAR LV1) (CAR LV2)))
                (NOTIFY-VIOLATION agent cr))
                (T   (LOCK agent)
                    (LOOP WHILE (PENDING-AGENTP prev) DO (WAIT))
                    (LOCK prev)
                    (INI-SEGMENTS agent prev)
                    (PUT-SC agent LV2)
                    (SET agent cr)
                    (PUT-TYPEOF agent 'CR)
                    (ADD-AGENT cr agent)
                    (PUT-PREV agent prev)
                    (PUT-NEXT prev agent)
                    (PUT-NEXT agent next)
                    (PUT-PREV next agent)
                    (DEFINE-NEXT-SFN prev next)
                    (DEFINE-NEXT-SFN agent next)
                    (DEFINE-PREV-SFN agent cr)
                    (TUNE-A-MONITORS agent)
                    (UNLOCK agent) (UNLOCK prev)
                    agent]
F195. (DE INSTALL-I-MONITOR (i-agent wr prev)
    ;/Installs a monitor agent, i-agent, on the delivery side of
    watch-ring, wr, next to the previous i-monitor, prev, if any on
    the same watch-ring, wr. If prev is NIL then installs agent as
    the first monitor on the delivery side of wr. Initializes wr and
    agent and returns i-agent. I-agent is assumed to be already
    initialized./;
    (COND ((NULL (WATCH-RINGP wr)) (PRINTMSG "From INSTALL-I-
        MONITOR:" wr "is not a watch-ring."))
            ((AND prev (NEQ (EVAL prev) wr))
            (PRINTMSG "From INSTALL-I-MONITOR: "prev " is not
        attached to watch-ring, " wr"."))
            ((NULL i-agent)
                (INSTALL-I-MONITOR1 (GEN-NAME 'A (PROCESSOR-OF @))
                            prev wr))
            ((EVAL i-agent) (PRINTMSG "From INSTALL-I-MONITOR: Agent
        "i-agent" is already attached to a watch or clock ring."))
            ((NULL (COMPATIBLE-WRP i-agent wr)) (PRINTMSG "From
        INSTALL-I-MONITOR: Agent " i-agent " is not compatible with
        the clock-ring of watch-ring, " wr"."))
            (T (INSTALL-I-MONITOR1 i-agent prev wr))]
F196. (DE INSTALL-I-MONITOR1 (i-agent prev wr)
    ;/Does the work for INSTALL-I-MONITOR. Does security check.
    Returns i-agent. I-monitor may be attached at any time without
    interference with pending protocol functions. If prev is NIL
    then makes i-agent the first agent on the watch-ring./;
```

-continued

```
(PROG ((LV1 (GET-SC i-agent))
       (LV2 (GET-SC wr))
       (LV (GET-FIRST-IM wr))
       (agent (GET-AGENT wr))
       (cr (CLOCK-RING-OF agent)))
      (COND ((AND LV1 (LESSP (CAR LV1) (CAR LV2)))
             (NOTIFY-VIOLATION i-agent wr))
              ((NULL prev) (PUT-NEXT i-agent (OR LV (GET-PORT wr)))
                          (AND LV (PUT-PREV LV i-agent))
                          (PUT-FIRST-IM wr i-agent)
                          (PUT-PREV i-agent agent))
            (T (PUT-PREV i-agent prev)
               (PUT-NEXT i-agent (GET-NEXT prev))
               (PUT-NEXT prev i-agent)))
      (INI-SEGMENTS i-agent (I-MONITORP prev))
      (INI-IM-SEGMENTS i-agent prev)
      (ADD-I-MONITOR wr i-agent)
      (AND cr (TUNE-I-MONITORS i-agent))
      (PUT-TYPEOF i-agent 'IM)
      i-agent]
F197. (DE INSTALL-O-MONITOR (o-agent wr prev)
      ;/Installs a monitor agent, o-agent, on the dispatch side of
      watch-ring, wr, next to prev watch-ring if there was one. If
      prev is NIL then installs agent as the first o-monitor on the
      dispatch side of wr. Initializes wr and o-agent and returns o-
      agent./;
      (COND ((NULL (WATCH-RINGP wr)) (PRINTMSG "From INSTALL-O-
      MONITOR: "
      wr " is not a watch-ring."))
           ((AND prev (NEQ (EVAL prev) wr))
            (PRINTMSG "From INSTALL-O-MONITOR: " prev " is not attached
      to watch-ring, " wr"."))
           ((NULL o-agent)
            (INSTALL-O-MONITOR1
                     (CREATE-AGENT (GEN-NAME 'A (PROCESSOR-OF @)))
                             wr prev))
           ((NULL (COMPATIBLE-WRP o-agent wr)) (PRINTMSG "From INSTALL-
      I-MONITOR: Agent " o-agent " is not compatible with the clock-
      ring of the watch-ring, " wr"."))
           (T (INSTAL-O-MONITOR1 o-agent prev wr))]
F198. (DE INSTALL-O-MONITOR1 (o-agent prev wr)
      ;/Does the work for INSTALL-O-MONITOR. Returns o-agent./;
      (PROG ((LV1 (GET-SC o-agent))
             (LV2 (GET-SC wr))
             (LV (GET-FIRST-OM wr))
             (cr (CLOCK-RING-OF (GET-AGENT wr)))
             (port (GET-PORT wr)))
            (COND ((AND LV1 (LESSP (CAR LV1) (CAR LV2)))
                   (NOTIFY-VIOLATION o-agent wr))
                  ((NULL prev)
                   (PUT-NEXT o-agent (OR LV agent))
                   (AND LV (PUT-PREV LV o-agent))
                   (PUT-FIRST-OM wr o-agent)
                   (PUT-PREV o-agent port)
                   (PUT-SEGMENT port NIL))
                  (T (PUT-PREV o-agent prev)
                     (PUT-NEXT o-agent (GET-NEXT prev))
                     (PUT-NEXT prev o-agent)))
            (INI-SEGMENTS o-agent (AND (O-MONITORP prev) prev))
            (INI-OM-SEGMENTS o-agent (AND (O-MONITORP prev) prev))
            (PUT-TYPEOF o-agent 'OM)
            (ADD-O-MONITOR wr o-agent)
            (AND cr (TUNE-O-MONITORS o-agent))
            o-agent]
```

2.6.12.3. Watch-Ring Creation, Attachment and Tuning Functions

Create-wr function creates and initializes a watch-ring. A watch-ring may be created only in the context of either an agent or a port. One of its ends will come attached with the agent or port, in whose context it was created. The other end will remain free if both agent and port are not specified. One may tune a port to a watch-ring already connected to an agent, by connecting its free end to the port. Similarly, one may tune an agent to a watch-ring already connected to a port, by connecting its free end to the agent. The tuning process will bestow to the port the capability to access the memories of the clock-ring of the agent it is tuned to; it will also define all the necessary protocol functions of the tuned (agent, port) pair and define all shared variables. This will make it possible for each item to listen to its tuned partner.

Detuning a port from an agent (or vice-versa) will remove from the port its capability to access the memories of the clock-ring of the agent, it will remove all the protocol functions that were defined at the time of tuning, and all the shared variables that the protocol functions used. Thus, after detuning an agent and a port, they would not be listening to each other anymore. Such detuning may be done by detaching agent/port from the watch-ring that connects them. The various kinds of detachment functions are presented in the next sub-section.

```
F199. (DE CREATE-WR (Wr Port Agent)
      ;/Creates and initializes all property values of the new watch-
      ring, Wr, and returns Wr. A new watch-ring can be created only
      in the context of a port or agent. (PROCESSOR-OF @) is the
      processor that executes this function./;
       (COND ((NULL (OR Agent Port))
               (PRINTMSG "From CREATE-WR: " Watch-ring can be created
      and initialized only in the context of an agent or port. Please
      specify at least one of them."))
              ((AND port (OR (NULL (PORP port)) (GET-WATCH-RING port)))
                (PRINTMSG "From CREATE-WR: " Port " is either not a port
      or is already connected to a watch-ring."))
              ((AND agent (NULL (AGENTP agent)))
                (PRINTMSG "From CREATE-WR: " Agent " is not an agent."))
              ((AND wr (MEMQ wr (GET-WATCH-RINGS agent)))
                (PRINTMSG "From CREATE-WR: " Agent " is already connected
      to watch-ring, " wr"."))
              (T (OR wr (SETQ wr (GEN-NAME 'WR (PROCESSOR-OF @))))
                 (EVAL (LIST 'DECLARE (LIST 'SPECIAL Wr)))
                 (PUTHASH Wr Name-hash-table)
                 (PUT-N-WATCH-RING Wr Wr)
                 (PUT-PORT Wr Port)
                 (COND (Agent (PUT-SC Wr (GET-SC Agent)))
                       (Port (PUT-SC Wr (GET-SC Port))))
                 (AND Port Agent
                   (COND ((EVAL Agent)
                            (TUNE-PORT-TO-AGENT wr agent ring port))
                         (T (TUNE-PORT-TO-FREE-AGENT wr agent ort))))
                 (PUT-AGENT Wr Agent)
                 (PUT-I-MOITORS Wr NIL)
                 (PUT-O-MONITORS Wr NIL)
                 (PUT-FIRST-IM Wr NIL)
                 (PUT-FIRST-OM Wr NIL)
                 Wr]
F200. (DE ATTACH-WR-TO-AGENT (wr agent (port (GET-PORT wr)))
        ;/Attaches watch-ring to agent, if it is not already so
        attached. If watch-ring is not already attached to an agent it
        should be attached to a port, since watch-rings can be created
        only in the context of an agent or port. Tunes port to agent by
        initializing agent-Sfn, agent-Cfn, port-Sfn and port-Cfn, sets
        port memories to cr memory addresses, where cr is the clock-ring
        to which agent is attached, if agent is attached Initializes
        agent, wr, port and clock-ring and returns wr. Initializes all
        monitor Sfns if there are monitors attached to the watch-ring.
        Watch-ring can be attached to agent even if agent is busy.;/
        (PROG ((ring (AND (BOUNDP agent) (EVAL agent))))
          (COND ((GET-AGENT wr) (PRINTMSG "From ATTACH-WR-TO-AGENT:
        Watch-ring " wr " is already attached to an agent."))
                ((NULL (AGENTP agent))
                  (PRINTMSG "From ATTACH-WR-TO-AGENT: " agent " is not an
        agent."))
                ((NULL ring) (TUNE-PORT-TO-FREE-AGENT wr agent port))
                ((WATCH-RINGP ring)
                  (COND ((NULL (SETQ ring (CLOCK-RING-OF agent)))
                          (TUNE-PORT-TO-FREE-AGENT wr agent port))
                        (T (TUNE-PORT-TO-AGENT wr agent ring port))))
                ((CLOCK-RINGP ring)
                  (TUNE-PORT-TO-AGENT wr agent ring port))]
F201. (DE TUNE-PORT-TO-FREE-AGENT (wr agent (port (GET-PORT wr)))
      ;/Agent here is free, i.e., (CLOCK-RING-OF agent) = NIL. Port is
      already attached to watch-ring wr. The watch-ring wr is being
      attached to agent. Tunes port to agent. Initializes agent-Cfn-
      port, agent-Sfn, port-SFN, port-CFN for agent and port, and for
      all monitor agents attached to watch-ring. No security check is
      needed; because it is done dynamically at the time messages are
      transferred. Thus a port at a lower level of security may be
      attached to an agent at a higher level of security. Returns
      agent./;
      (ADD1-#OF-PORTS agent)
      (ADD-WATCH-RING agent wr)
      (ADD-AGENT-CFN agent port (NCONS (CONCAT agent '-Cfn- port)))
      (PUT-AGENT wr agent)
      (PUT-AGENT port agent)
      (DEFINE-AGENT-CFN port agent)
```

```
        (DEFINE-PORT-CFN port agent)
        (DEFINE-PORT-SFN port agent)
        ;/AGENT-SFN need not be defined again, because it dynamically
        takes care of ports being tuned to or detuned from agents.
        Monitors attach to watch-ring are not being tuned here because
        agent is free./;
        (INI-SEGMENTS NIL (GET-PREV agent))
        agent]
F202. (DE TUNE-PORT-TO-AGENT (wr agent cr (port (GET-PORT wr)))
    ;/Agent here is not free, i.e. (CLOCK-RING-OF agent) is not NIL.
    This tunes the port to an agent by attaching the wr to agent. Wr
    is already attached to port and port has been already
    initialized. Agent is also already initialized and attached to a
    clock-ring. An agent is initialized when it is installed on a
    clock-ring or a watch-ring. In this case all monitor ports
    attached to wr via monitor agents, have to be tuned to the clock-
    ring, cr, of the agent. The following protocol functions are
    defined and installed: Agent-Sfn, Agent-Cfn, port-Sfn and port-
    Cfn. For every monitor agent attached to watch-ring, wr, and all
    descendants of those monitor agents, their respective prev-Sfn,
    agent-Sfn, next-Sfn and agent-Cfn are defined and installed.
    Also, for ports tuned to those monitor agents their respective
    port-Cfn are defined. Returns agent. If agent is busy, then
    after attaching wr to agent, a start signal is sent to port, and
    immediately after this, port-Sfn is evaluated. In this case the
    wr just attached to agent can be viewed as a monitor probe
    (Figure 7). It is possible that agent is a monitor agent
    attached to a watch-ring./;
        (ADD1-#OF-PORTS agent)
    ;/If agent is busy, this will prevent satisfaction of agreement
    protocol until the agent receives completion signal from the port
    that is just being tuned to it. If agent has already sensed
    satisfaction of agreement protocol, then this new wr will get
    into play the next time the agent is started. Watch-ring may be
    attached to an agent even if agent is busy./;
        (ADD-WATCH-RING agent wr)
        (PUT-AGENT wr agent)
        (PUT-AGENT port agent)
        (DEFINE-AGENT-SFN agent cr)
        (DEFINE-AGENT-CFN port agent)
        (DEFINE-PORT-CFN port agent)
        (DEFINE-PORT-SFN port agent)
        (TUNE-WR-MONITORS wr)***
        (PUT-SEGMENT port NIL)
        (INI-SEGMENTS NIL (GET-PREV agent))
        (PUT-SEGMENT port NIL)
        (AND (BUSYP agent)
             (PROGN (SET (CONCAT agent '-s- port) T)
                    (EVAL (NCONS port-SFN))))
        agent]
F203. (DE TUNE-WR-MONITORS (wr (agent (GET-AGENT wr))
                                (cr (CLOCK-RING-OF agent))
                                (port (GET-PORT wr)))
    ;/Defines all the start-signal protocol functions for monitors
    attached to wr, if agent, port and cr are all specified. Returns
    T if successful, else NIL./;
    (AND agent port cr
         (PROGN (MAPC (FUNCTION (LAMBDA (W)
             (TUNE-I-MONITORS W wr cr)
                (GET-I-MONITORS wr))
              (MAPC (FUNCTION (LAMBDA (W) (TUNE-O-MONITORS W wr cr)))
                 (GET-O-MONITORS wr))
         T]
F204. (DE TUNE-I-MONITORS (i-agent wr cr)
    ;/Defines i-agent-Sfn, for i-agent and all its descendants, and
    defines i-agent-next-Sfn, i-agent-prev-Sfn and i-agent-Cfn if
    they are not already defined. Returns NIL./;
        (DEFINE-IM-NEXT-SFN i-agent)
        (DEFINE-IM-PREV-SFN i-agent)
        (DEFINE-IM-SFN i-agent wr cr)
        (MAPC (FUNCTION (LAMBDA (W)
                                (TUNE-WR-MONITORS W i-agent cr)
                                (DEFINE-IM-CFN (GET-PORT W) i-agent)))
             (GET-WATCH-RINGS i-agent))]
F205. (DE TUNE-O-MONITORS (o-agent wr cr)
    ;/Defines o-agent-Sfn, for o-agent and all its descendants, and
    defines o-agent-next-Sfn, o-agent-prev-Sfn and o-agent-Cfn if
    they are not already defined. Returns NIL./;
        (DEFINE-OM-NEXT-SFN o-agent)
```

```
    (DEFINE-OM-PREV-SFN o-agent)
    (DEFINE-OM-SFN o-agent wr cr)
    (MAPC (FUNCTION (LAMBDA (W)
            (DEFINE-OM-CFN (GET-PORT W) o-agent)
            (TUNE-WR-MONITORS W o-agent cr)))
          (GET-WATCH-RINGS o-agent))]
F206. (DE ATTACH-WR-TO-PORT (wr port (agent (GET-AGENT wr))
                                  (obj (EVAL port)))
    ;/Attaches watch-ring to port, if it is not already so attached.
    If watch-ring is not already attached to a port it should be
    attached to an agent, since watch-rings can be created only in
    the context of an agent or port. Tunes port to agent by
    initializing prev-Sfn, agent-Cfn, port-Sfn and port-Cfn, sets
    port memories to cr memory addresses, where cr is the clock-ring
    to which agent is attached, if agent is attached to a cr. If
    agent is not attached to a clock-ring then does not define port-
    Sfn for agent and monitor agents. Initializes agent, wr, port
    and clock-ring and returns wr. Initializes all monitor Sfns if
    there are monitors attached to the watch-ring. Watch-ring can be
    attached to port even if agent is busy. Obj is the parent object
    of port. Returns port.;/
    (PROG ((LV (GET-PORT wr))
           (ring (AND (BOUNDP agent) (EVAL agent))) cr)
      (COND (LV (PRINTMSG "From ATTACH-WR-TO-PORT: Watch-ring " wr "
    is already attached to the port " LV"."))
            ((NULL (PORTP port))
             (PRINTMSG "From ATTACH-WR-TO-PORT: " port " is not an
    port."))
            ((NULL ring) (TUNE-PORT-TO-FREE-AGENT wr agent port))
            (WATCH-RINGP ring)
              (COND ((NULL (SETQ cr (CLOCK-RING-OF agent)))
                     (TUNE-PORT-TO-FREE-AGENT wr agent port))
                    (T (TUNE-PORT-TO-AGENT wr agent cr port))))
            ((CLOCK-RINGP ring)
             (TUNE-PORT-TO-AGENT wr agent ring port))]
```

It may be noted, there are no port creation and destruction functions here because they will be a part application system objects. So also there are no functions presented here for creating and destroying instances of objects.

2.5.12.4. Functions to Detach and Detune Agents and Ports

There are four kinds of detach operations:
1. Detaching agents from clock-rings,
2. Detaching Monitor agents from watch-rings,
3. Detaching Watch-rings from agents,
4. Detaching Watch-rings from ports.

```
F207. (DE DETACH-AGENT (agent
                       (ring (AND (BOUNDP agent)
                             (EVAL agent))))
    ;/Detaches agent from clock or watch ring, ring. Detunes all
    ports tuned to agent from clock-ring memories. Keeps all ports
    still tuned to agent. Returns agent. Initializes prev-Sfn and
    Next-Sfn of agent to NIL. Keeps agent-Cfns and agent-Sfn
    unchanged. Puts agent in the Free-agents list. Free agents are
    those agents who are not attached to any clock or watch ring, but
    may have ports tuned to them. Flag is set to T when this function
    is called by DETACH-ALL-AGENTS, in order to avoid certain
    unnecessary operations./;
    (COND ((NULL (AGENTP agent)) (PRINTMSG "From
    DETACH-AGENT: "
    agent " is not an agent."))
          ((NEQ (EVAL agent) ring) (PRINTMSG "From
          DETACH-AGENT: "
    agent is not attached to " ring "."))
          ((CR-AGENTP agent) (DETACH-CR-AGENT agent ring
          flag))
          ((IM-AGENTP agent) (DETACH-I-MONITOR agent ring
          flag))
          ((OM-AGENTP agent) (DETACH-O-MONITOR agent ring
          flag))]

F208. (DE DETACH-CR-AGENT (agent
                         (cr (AND (BOUNDP agent)
                              (EVAL agent)))))
    ;/Detaches agent from its clock-ring and resets the clock-ring.
    Sets protocol functions prev-Sfn and next-Sfn of agent to NIL.
    Keeps all ports tuned to agent. Keeps agent-Cfns unchanged.
    Attaches agent to Free-agents list. Returns agent. Returns NIL
    if cr is not a clock-ring and agent is not an agent. If clock-
    ring has no agents after this agent is removed, then destroys
    clock-ring. If none of the remaining agents on clock-ring are
    bound, then attaches clock-ring to Free-clock-rings./;
    (AND (AGENTP agent) (CLOCK-RINGP cr)
      (PROG ((prev (GET-PREV agent)))
        (LOOP WHILE (PENDING-AGENTP agent) DO (WAIT))
        (LOCK prev)
        (LOCK agent)
        (SET agent NIL)
        (PUT-TYPEOF agent NIL)
        (DETUNE-A-MONITORS agent)
        (INI-SEGMENTS agent prev)
        (SUB-AGENT cr agent)
        (PUT-NEXT agent (PUT-PREV agent NIL))
        (PUT-NEXT prev next)
        (PUT-PREV next prev)
        (ATTACH agent Free-agents)
        (UNLOCK prev)
        (UNLOCK agent)
        (PUTD (CONCAT agent '-prev-Sfn) NIL)
        (PUTD (CONCAT agent '-next-Sfn) NIL)
        (COND ((NULL (GET-AGENTS cr))
               (DESTROY cr)
               (PRINTMSG "From DETACH-CR-AGENT: " agent "
        detached
```

-continued

```
            from clock-ring and , " cr " destroyed."))
                ((NULL (BOUND-CRP cr))
                    (PRINTMSG "From DETACH-CR-AGENT: " agent "
                detached
            from Clock-ring, " cr ", and " cr " is free.")
                    (ATTACH cr Free-clock-rings)))
        agent]
F209. (DE INI-AGENT-SFN (agent)
        ;/Initializes agent-Sfn to return NIL, but keeps the agent-Sfn
        property of agent unchanged. Returns NIL./;
        (PUTD (CAAR (GET-AGENT-SFN agent)) NIL)]
F210. (DE INI-NEXT-SFN (agent)
        ;/Initializes next-Sfn of agent to always return NIL, but keeps
        the next-Sfn property of agent unchanged. Returns NIL./;
        (PUTD (CAR (GET-NEXT-SFN agent)) NIL)]
F211. (DE INI-PREV-SFN (agent)
        ;/Initializes prev-Sfn of agent to return always NIL, but keep
        the next-Sfn property of agent unchanged./;
        (PUTD (CAR (GER-PREV-SFN agent)) NIL)]
F212. (DE DETACH-IM-AGENT   (i-agent
                            (wr (AND (BOUNDP i-agent)
                                (EVAL i-agent)))
        ;/Removes the i-agent from wr, attaches i-agent to Free-agents
        and resets wr. Returns i-agent./;
        (AND   (AGENTP i-agent)
               (WATCH-RINGP wr)
            (PROG ((next (GET-NEXT i-agent))
            (prev (GET-PREV i-agent))
                (agent (GET-AGENT wr)) (cr (CLOCK-RING-OF
                agent)))
            (AND cr
                (PROGN  (LOOP WHILE (PENDING-AGENTP i-agent)
                            DO (WAIT))
                        (LOCK i-agent)))
                (SET i-agent NIL)
            (INI-SEGMENTS i-agent) (INI-IM-SEGMENTS i-agent prev)
            (DETUNE-I-MONITORS i-agent)
            (SUB-I-MONITOR wr i-agent)
            (COND  ((EQ i-agent (GET-FIRST-IM wr))
                    (COND ((AGENTP next)  (PUT-FIRST-IM wr
                                            next)
                                        (PUT-PREV next agent))
                        (T (PUT-FIRST-IM NIL))))
                ((AGENTP next)  (PUT-NEXT prev next)
                                (PUT-PREV next prev))
                (T (PUT-NEXT prev next)))
            (AND cr (UNLOCK agent))
            (ATTACH i-agent Free-agents)
            (PRINTMSG "From DETACH-IM-AGENT: " i-agent "
            detached from
            watch-ring, "wr".")
            i-agent]
F213. (DE DETACH-OM-AGENT   (o-agent
                            (wr (AND (BOUNDP o-agent)
                                (EVAL o-agent)))
        ;/Detaches o-agent from wr, attaches o-agent to Free-agents and
        resets wr. Returns o-agent./;
        (AND (AGENTP o-agent) (WATCH-RINGP wr)
            (PROG  ((next (GET-NEXT o-agent))
                    (prev (GET-PREV o-agent))
                    (agent (GET-AGENT wr))
                    (cr (CLOCK-RING-OF o-agent))
                    (port (GET-PORT wr)))
            (AND cr (PROGN   LOOP WHILE (PENDING-AGENTP
                                o-agent) DO (WAIT))
                            (LOCK o-agent))
            (SET o-agent NIL)
            (INI-SEGMENTS o-agent) (INI-OM-SEGMENTS o-agent)
            (DETUNE-O-MONITORS o-agent)
            (SUB-O-MONITOR o-agent wr)
            (COND  ((EQ o-agent (GET-FIRST-OM wr))
                    (COND ((OM-AGENTP next)  (PUT-FIRST-OM
                                                wr next)
                                            (PUT-PREV next
                                            port.))
                        (T (PUT-FIRST-OM wr NIL)))
                    (PUT-SEGMENT port NIL))
                ((OM-AGENTP next)   (PUT-NEXT prev next)
                                    (PUT-PREV next prev))
                (T (PUT-NEXT prev next)]
```

-continued

```
            (AND cr (UNLOCK o-agent))
            (PRINTMSG "From DETACH-OM-AGENT: " o-agent "
            detached from
            watch-ring," wr".")
            (ATTACH o-agent Free-agents)
            o-agent]
F214. (DE DETACH-ALL-AGENTS (Cr)
        ;/Detaches all agents from Cr. Detunes all ports tuned to Cr
        from the Cr. Keeps each agent of Cr tuned to all ports that it
        was already tuned to. When the last agent is detached from Cr it
        is destroyed. Returns T./;
        (MAPC   (FUNCTION (LAMBDA (W) (DETACH-CR-AGENT
                    W Cr)))
                (GET-AGENTS Cr))
        T]
F215. (DE DETACH-ALL-IM-AGENTS (wr)
        ;/Detaches all I-monitors from the delivery side watch-ring wr
        and returns wr./;
        (PROG ((agent (GET-AGENT wr))
        (cr (CLOCK-RING-OF agent)))
            (AND cr   (PROGN (LOOP WHILE (PENDING-AGENTP
                                agent) DO (WAIT))
                            (LOCK agent)))
            (MAPC  (FUNCTION (LAMBDA (W) (DETACH-IM-AGENT
                        W wr))
                    (GET-I-MONITORS wr))
            (PUT-FIRST-IM wr NIL)
            (PUT-I-MONITORS wr NIL)
            (AND cr (UNLOCK agent))
            wr]
F216. (DE DETACH-ALL-OM-AGENTS (wr)
        ;/Detaches all O-monitors from the dispatch side watch-ring wr
        and returns wr./;
        (PROG ((agent (GET-AGENT wr))
        (cr (CLOCK-RING-OF agent)))
            (AND cr (PROGN    (LOOP WHILE (PENDING-AGENTP
                                agent) DO(WAIT))
                            (LOCK agent)))
            (MAPC  (FUNCTION (LAMBDA (W) (DETACH-
                    OM-AGENT W wr))
                    (GET-O-MONITORS wr))
            (PUT-FIRST-OM wr NIL)
            (PUT-O-MONITORS wr NIL) (AND cr (UNLOCK agent))
            wr]
F217. (DE DETACH-ALL-MONITORS (wr)
        /;Detaches all Input and Output monitors attached to wr and
        returns wr./;
        (DETACH-ALL-IM-AGENTS wr)
        (DETACH-ALL-OM-AGENTS wr)]
F218. (DE DETACH-WR-FROM-AGENT (wr flag)
        ;/Detaches watch-ring from agent. Keeps the watch-ring attached
        to port, if there was already a port attached to it. Keeps all
        the monitors on watch-ring if there is a port attached to it,
        unless the flag is T. Destroys watch-ring wr if there is no port
        attached to it. Returns T if successful, else NIL./;
        (PROG   ((agent (GET-AGENT wr))
                (LV (AND (BOUNDP agent) (EVAL agent))))
            (COND ((NULL (WATCH-RINGP wr))
                (PRINTMSG "From DETACH-WR-FROM-AGENT:
                " wr "is not a
        watch-ring))
                ((NULL agent)
                (PRINTMSG "From DETACH-WR-FROM-AGENT:
                No agent is
        attached to " wr"."))
                (T (DETACH-WR-FROM-AGENT1 wr agent flag)]
F219. (DE DETACH-WR-FROM-AGENT1 (wr agent flag)
        ;/Does the job for DETACH-WR-FROM-AGENT.
        Does no argument
        checking. Destroys wr if it becomes isolated. Destroys agent if
        it has no other watch-rings attached to it. If agent is a CR-
        agent, then destroys clock-ring of agent, if it has no agents on
        it after removing this agent./;
        (PROG   ((cr (CLOCK-RING-OF agent))
                (port (GET-PORT wr)) #of-ports)
            (AND cr (PROGN    (LOOP WHILE (PENDING-AGENTP
                                agent) DO (WAIT)
                            (LOCK agent)))
```

-continued

```
       (PUT-SEGMENT (GET-PORT wr) NIL)
       (INI-AGENT-SEGMENTS agent)
       (PUT-AGENT wr NIL)
       (INI-WR-SEGMENTS wr)
       (DETUNE-WR-MONITORS wr)
       (COND [port (REM-AGENT-CFN agent port)
                   (REM-PORT-SFN port)
                   (REM-PORT-CFN port)
                   (SETQ #of-ports (SUB1-#OF-PORTS agent))
                   (AND flag (DESTROY-monitors wr))
                   (PUT-SC wr (GET-SC port))
                   (COND ((ZEROP #of-ports)
                          (REM-PREV-SFN agent T)
                          (REM-NEXT-SFN agent T)
                          (REM-AGENT-SFN agent T)
                          (MAPC (FUNCTION (LAMBDA (W)
                                           (DESTROY-WR W)))
                                (GET-WATCH-RINGS agent))
                          (DESTROY agent)
                          (cr  (DEFINE-AGENT-SFN agent cr)
                               (UNLOCK agent)]
                   [cr  (DEFINE-AGENT-SFN agent cr)
                        (DESTROY-WR wr)
                        (UNLOCK agent)]
                   [T (DESTROY-WR wr)]]
       T]
F220. (DE DETACH-WR-FROM-PORT (wr flag)
     ;/Detaches watch-ring from port. Keeps the watch-ring attached
     to agent, if there was already an agent attached to it. Keeps
     all the monitors on watch-ring, unless the flag is T. Returns
     wr./;
     (PROG ((port (GET-PORT wr)))
           (COND ((NULL (WATCH-RINGP wr))
                  (PRINTMSG "From DETACH-WR-FROM-PORT: " wr "
                   is not a
                  watch-ring"))
                 ((NULL port)
                  (PRINTMSG "From DETACH-WR-FROM-PORT:
                   No port is
                  attached to " wr"."))
                 (T (DETACH-WR-FROM-PORT1 wr port flag)]
F221. (DE DETACH-WR-FROM-PORT1 (wr port flag)
     ;/Does the job for DETACH-WR-FROM-PORT without any
     argument checking. Returns T./;
     (PROG    ((agent (GET-AGENT wr)) (cr (CLOCK-RING-OF
               agent))
              #of-ports)
       (AND cr (PROGN   (LOOP WHILE (PENDING-AGENTP
                        agent) DO (WAIT))
                        (LOCK agent)))
       (INI-WR-SEGMENTS wr)
       (INI-AGENT-SEGMENT agent)
       (DETUNE-WR-MONITORS wr)
       (INI-WR-SEGMENTS wr)
       (PUT-SEGMENT port NIL)
       (REM-PORT-CFN port)
       (REM-PORT-SFN port)
       (PUT-WATCH-RING port NIL)
       (PUT-PORT wr NIL)
       (COND  (agent (REM-AGENT-CFN agent port)
                     (PUT-SC wr (GET-SC agent))
                     (AND  (ZEROP (SUB1-#OF-PORTS agent)
                           (DETACH-AGENT agent))
                     (AND cr (UNLOCK agent))
                     (T (DESTROY-MONITORS wr) (DESTROY wr)))
       T]
```

2.6.13. Functions for Removing Protocol Functions

Only six different kinds of protocol functions were defined in Section 2.6.9. The functions performed by them are summarized again below:

<agent>-prev-Sfn: This is used by agents on clock-rings to sense start signals sent to them by their previous agents. Monitor agents on watch-rings do not use this.

<agent>-Sfn for agents: This is used by agents on a clock-ring to send start signals to all ports tuned to them, after they sense the start signal sent to them by their previous agents. Input and output monitor agents use variations of this.

<agent>-Cfn-port: These are used by an agent to sense and respond to completion signals sent to them by a port that is tuned to it. When agent senses satisfaction of completion signal it will issue a call to <agent>-next-Sfn to send a start signal, and/or take other appropriate actions, in response to satisfaction of agreement protocol. Input and output monitor agents use variations of this.

<agent>-next-Sfn: This is used by an agent when it senses satisfaction of agreement protocol. Input and output monitor agents use variations of this.

<port>-Sfn: This function is used by a port to receive start signal from agent tuned to it and send start signal to its parent object.

<port>-Cfn: This is used by a port to receive completion signals from its parent object and send completion signals to agent tuned to it.

Each one of these comes with its own associated special (global) variables. The functions presented below removes these protocol functions from agents and ports by resetting them to NIL and destroying all associated global variables. They destroy these functions if flag is T. The variable names and function names are all removed from LISP OBLIST when they are destroyed. Thus the identity of these variables and functions will be completely lost.

```
F222. (DE REM-PREV-SFN (agent flag)
     ;/The <agent>-prev-Sfn is created when agent is initialized and
     installed on a clock-ring. It is reset here to always return
     NIL. Usually this will happen when agent is detached from a
     clock-ring. It is removed and destroyed if flag is T. Returns
     T./;
     (PROG ((fn (CAR (GET-PREV-SFN agent))))
           (COND   ((NULL fn))
                   (flag  (LOOP WHILE (PENDING-AGENTP
                          agent) DO (WAIT))
                          (PUTD fn NIL)
                          (PUT-PREV-SFN agent NIL)
                          (DESTROY fn)
                          (PRINTMSG "From REM-PREV-SFN:
                          " fn " destroyed."))
                   (T     (LOOP WHILE (PENDING-AGENTP agent)
                          DO (WAIT))
                          (PUTD fn NIL)
                          (PRINTMSG "From REM-PREV-SFN:
                          " fn " rest
                          to NIL.")))
       T]
F223. (DE REM-NEXT-SFN (agent flag)
     ;/If flag is NIL then sets next-Sfn to NIL. If flag is T then
     destroys next-Sfn and all special variables associated with
     it. Returns T./;
     (PROG ((Sfn (GET-NEXT-SFN agent)))
           (COND   ((NULL Sfn))
                   (flag  (LOOP WHILE (PENDING-AGENTP
                          agent)
                          DO (WAIT))
                          (DESTROY-NEXT-SFN-VARS agent
                          (CAR Sfn))
                          (PRINTMSG "From REM-NEXT-SFN:
                          Function "
     next-Sfn " destroyed."))
                   (T     (LOOP WHILE (PENDING-AGENTP agent)
                          DO (WAIT))
                          (PUTD (CAR Sfn) NIL)
                          (PRINTMSG "From REM-NEXT-SFN:
                          Function "
                          next-Sfn
     " set to NIL.")))
       T]
```

-continued

F224. (DE DESTROY-NEXT-SFN-VARS (agent Sfn)
;/Destroys all the special variables associated with next-Sfn.
Also destroys the Sfn name, it's pending variable and sets
next-Sfn property of agent to NIL. Returns T./;
(PUTD Sfn NIL)
(DESTROY (CONCAT agent '-CT))
(DESTROY (CONCAT agent '-CD))
(DESTROY (CONCAT agent '-CH))
(DESTROY (CONCAT agent '-#completed))
(DESTROY Sfn)
(PUT-NEXT-SFN agent NIL))
T]
F225. (DE REM-AGENT-SFN (agent flag)
;/If flag is NIL, then sets the start function of agent,
<agent>-Sfn, to NIL and destroys all special variables
associated with it. Also removes and destroys all Cfns of
agent. If flag is T then destroys the start function and sets
agent-Sfn property to NIL. Returns T./;
(LOOP WHILE (PENDING-AGENTP agent) DO (WAIT))
(LOCK agent)
(PROG   ((Sfn (GET-AGENT-SFN agent))
        (prev (GET-PREV agent))
        (pending (CDR Sfn))
        (ring (EVAL agent)))
   (REM-ALL-CFNS agent)
   (COND   ((NULL Sfn))
           (flag   (PUTD (SETQ Sfn (CAAR Sfn)) NIL)
                   (PUT-AGENT-SFN agent NIL)
                   (DESTROY Sfn) (DESTROY pending)
                   (PRINTMSG "From AGENT-SFN:
                   Function " Fn "
destroyed."))
           (T    (PUTD (SETQ Sfn (CAAR Sfn)) NIL)
                 (PRINTMSG "From AGENT-SFN:
                 Function " Fn " set to
NIL.")))
   (UNLOCK agent)
T]
F226. (DE REM-AGENT-CFN (agent port (Cfns (GET-AGENT-CFNS
agent)))
;/Removes and destroys the agent-CFN associated with agent
and port. Returns T./;
(REM-AGENT-CFN1 agent (ASSOCQ port Cfns))]
F227. (DE REM-AGENT-CFN1 (agent X flag)
;/X here is the list (port port-Cfn-agent agent-s-port port
Cfn-agent-pending). This function is
called by
REM-AGENT-CFN
and REM-ALL-AGENT-CFNs. Returns T. Destroys also
all global
variables associated with the Cfn. Flag is set to T when all
agent Cfns are being removed./;
     (AND X (PROG ((Cfn (CAADR X)) (pending
     (CADDDR X)))
        (DO WHILE (EVAL pending) DO (WAIT))
        (PUTD Cfn NIL)
        (DESTROY (CONCAT (CAR X) '-c- agent))
        (DESTROY (CADDR LV))
        (DESTROY pending)
        (DESTROY Cfn)
        (OR flag (PUT-AGENT-CFNS agent (DREMOVE
        X Cfns)))
        (PRINTMSG "FROM REM-AGENT-CFN: Function
        " Cfn "
destroyed.")
T)]
F228. (DE REM-ALL-CFNS (agent)
;/Removes all Cfns of agent and resets agent-Cfns property value
to NIL. Returns T./;
(MAPC (FUNCTION (LAMBDA (W) (REM-AGENT-
CFN1 agent W T))
    (GET-AGENT-CFNS agent))
(PUT-AGENT-CFNS agent NIL)
T]
F229. (DE REM-ALL-AGENT-FNS (agent)
;/Destroys all protocol functions associated with agent and all.
special variables. Returns T./;
(REM-NEXT-SFN agent T)
(REM-PREV-SFN agent T)

-continued (REM-AGENT-SFN agent T);/This removes all agent
Cfns as well./;
T]
F230. (DE REM-PORT-SFN (port)
;/Removes and sets the start function of port to NIL. Destroys
the special variables <agent>-s-<port> that is associated with
it. Returns T./;
(PROG ((Sfn (GET-PORT-SFN port)))
  (DO WHILE (EVAL (CDR Sfn)) DO (WAIT))
  (REM-AGENT-CFN agent port)
  (DESTROY (CONCAT (GET-AGENT port) '-s- port))
  (PUT-SEGMENT port NIL)
  (PUTD (SETQ Sfn (CAAR Sfn)) NIL)
  (PRINTMSG "From REM-PORT-SFN: Function " (CAR
  Sfn) "
  reset to
NIL.")
T]
F231. (DE REM-PORT-CFN (port (agent (GET-AGENT port))
;/Resets the function that is used by port to send completion
signal to the agent that is tuned to it, to NIL. Removes and
destroys <port>-c-<agent> signal variable. Returns T./;
(PROG ((Cfn (GET-PORT-CFN port)))
  (DO WHILE (EVAL (CDR Cfn)) DO (WAIT))
  (DESTROY (CONCAT port '-c- agent))
  (PUTD (SETQ Cfn (CAAR Cfn)) NIL)
  (PRINTMSG "From REM-PORT-CFN: Function, " Cfn "
  reset to
NIL.")
T]

2.6.14. Destroy Functions for Pathway Components

Always a clock-ring is destroyed when all its agents are detached from it. So also a watch-ring, whose agent and port have been detached from it, is also destroyed. Isolated agents, who are detached from both clock and watch-rings are also automatically destroyed. Otherwise, they are classified as free agents and kept in the Free-agents list. When a component is detached all the affected protocol functions are either reset to NIL or destroyed. When a component is destroyed all protocol functions and variables associated with the component are also destroyed. These destroyed items will leave unused memory, which will be automatically be garbage collected by LISP garbage collector, except for the memories allocated to clock-rings, whose recovery and reuse would have to be managed separately. Once components are detached they may be destroyed in any manner one chooses without interfering with the operations of an application system. Writing functions that do the various destroy operations just involves of book keeping. One has to make sure that no unnecessary item are kept in the memory.

We have already seen the DESTROY-CR function. Other destroy functions are given below.

F232. (DE DESTROY-AGENT (agent)
;/Detaches and isolates the agent and destroys it. Returns T./;
(COND ((NULL (AGENTP agent))
    (PRINTMSG "From DESTROY-AGENT: "agent" is not an
    agent.))
    ((CR-AGENTP (DESTROY-CR-AGENT agent))
    ((IM-AGENTP agent) (DESTROY-IM-AGENT agent))
    ((OM-AGENTP agent) (DESTROY-OM-AGENT agent)))]
F233. (DE DESTROY-CR-AGENT (agent)
;/Detaches and isolates the CR-agent, agent, and destroys it./;
(PROG ((cr (EVAL agent)))
  (AND cr (DETACH-CR-AGENT agent))
  (REM-ALL-AGENT-FNS agent)
  (MAPC  (FUNCTION (LAMBDA (W) (DETACH-WR-
         FROM-AGENT W agent)))

```
                (GET-WATCH-RINGS agent))
            (DESTROY agent)]
F234. (DE DESTROY-WR (wr)
        ;/Detaches wr from its agent and port and destroys it. Detaches
        all monitors attached to wr.
        But does not destroy them, if flag
        is NIL. If flag is T then recursively destroys all monitors
        reachable from wr. But none of the monitor objects in the
        network or their ports would be destroyed./;
        (AND (GET-AGENT wr)
             (DETACH-WR-FROM-AGENT wr T))
             /;This will also destroy the agent if there are no other ports
             tuned to it./;
        FROM-(AND (GET-PORT wr)
                  (DETACH-WR-FROM-PORT wr T))
        FROM-(DESTROY-IM-AGENTS wr)
        (DESTROY-OM-AGENTS wr)
        (REM-ALL-PORT-FNS (GET-PORT wr))
        (DESTROY wr)
        (PRINTMSG "From DESTROY-WR:
        The watch-ring "wr" and all
        monitors reachable from it have been destroyed.")
        T]
F235. (DE DESTROY-IM-AGENTS (wr)
        ;/ Destroys all I-monitor agents attached to wr and all monitors
        reachable from it. Does not destroy any monitor objects or
        their ports./;
        (MAPC (FUNCTION (LAMBDA (W)
              (REM-ALL-AGENT-FNS W)
              (MAPC   (FUNCTION (LAMBDA (X)
                      (DESTROY-WR X)))
                      (GET-WATCH-RINGS W))
              (GET-I-MONITORS wr))
        T]
F236. (DE DESTROY-OM-AGENTS (wr)
        ;/ Destroys all O-monitor agents attached to wr and all monitors
        reachable from it. Does not destroy any monitor objects or
        their ports./;
        (MAPC  (FUNCTION (LAMBDA (W)
               (REM-ALL-AGENT-FNS W)
               (MAPC    (FUNCTION (LAMBDA (X)
                        (DESTROY-WR X)))
                        (GET-WATCH-RINGS W))
               (GET-O-MONITORS wr))
        T]
F237. (DE DESTROY-MONITORS (wr)
        /;Destroys all i-monitors and o-monitors of watch-ring wr and all
        those that are reachable from wr. Returns T./;
        (DESTROY-IM-AGENTS wr)
        (DESTROY-OM-AGENTS wr)
        T]
```

2.6.15. Pathway Creation and Destruction Functions

```
F238. (DE CREATE-PATHWAY (port1 port2)
        ;/Creates a new pathway between port1 and port2, if application
        security permits it, and sends a start signal to port1. Returns
        port1 if successful, else NIL./;
        (COND   ((NULL (PORTP port1))
                (PRINTMSG "From CREATE-PATHWAY:
                "port1" is not a
        port."))
                ((NULL (PORTP port2))
                (PRINTMSG "From CREATE-PATHWAY:
                "port2" is not a
        port."))
                ((NULL (COMPATIBLE-PORTSP port1 port2))
                (PRINTMSG "From CREATE-PATHWAY:
                Both ports "port1" and
        " port2" belong to the same object."))
                ((NULL (SECUREP port1 port2))
                (NOTIFY-VIOLATION port1 port2)
                (PRINTMSG "From CREATE-PATHWAY:
                Unauthorized attempt by
                port1" to connect to "port2"."))
                (T (SETUP-PATHWAY port1 port2))]
F239. (DE COMPATIBLE-PORTSP (port1 port2)
        ;/Returns T if they do not both belong to the same object."
        (NEQ (EVAL port1) (EVAL port2))]
F240. (DE SETUP-PATHWAY (port1 port2)
        ;/Sets up the pathway between the ports and sends start signal to
        port1, and executes the start function of port1, when pathway is
        ready. The pathway is constructed in the following order. First
        a watch-ring is created in the context of port1. Then a clock-
        ring is created in the same context. This will come with an
        agent, agent1, attached to it. The value of agent1 will be the
        clock-ring. Then a second agent, is created. A second watch-
        ring is created in the context of port2. This watch-ring is then
        attached to agent. And then, finally agent is attached to the
        clock-ring. This will succeed only if the agent has the right
        security class that is consistent with the security class of
        port1. Once the pathway establishment is complete, the CSM
        would inject a start signal into port1 and execute immediately
        thereafter execute its start protocol function. This will inform
        port1 that a pathway has been established. Port1 will inform
        its parent object about this, which may then take appropriate
        action./;
        (PROG   ((processor (EVAL (EVAL port1)))
                (wr (CREATE-WR (GEN-NAME 'WR processor)
                port1)) (sc (GET-SC port1))
                (agent1 (CREATE-CR (GEN-NAME 'CR processor)
                256 sc))
                (cr (EVAL agent1))
                (agent (CREATE-AGENT (GEN-NAME 'A
                processor) sc)))
                (ATTACH-WR-TO-AGENT wr agent1 port1))
                (SETQ wr (CREATE-WR (GEN-NAME 'WR
                processor) port2))
                (ATTACH-WR-TO-AGENT wr agent port2)
                (AND    (INSTALL-AGENT agent agent1 cr)
                        (PROGN  (SET (CONCAT
                                agent1 '-s- port1) T)
                                (EVAL (CAR (GET-PORT-
                                SFN port1))]
F241. (DE DESTROY-PATHWAY (port1 port2)
        ;/Destroys the pathway between port1 and port2./;
        (PROG ((agent1 (GET-AGENT port1)) (agent1 (GET-AGENT
        port2)))
        (DESTROY (GET-WATCH-RING port1))
        (DESTROY (GET-WATCH-RING port2))
        (DESTROY-CR-AGENT agent1)
        (DESTROY-CR-AGENT agent2)
        (DESTROY cr)]
        2.6.16. Miscellaneous Functions
F242. (DE DETUNE-PORT-FROM-CR (port)
        ;/Resets read-memory, write-memory and scratchpad addresses of
        port to NIL. Returns port. Port here is still tuned to an agent./;
        (DO WHILE (PENDING-PORTP port) DO (WAIT))
        (PUTPROP port 'segment NIL)
        (PUTPROP port 'read-memory NIL)
        (PUTPROP port 'write-memory NIL)
        (PUTPROP port 'scratchpad NIL)
        (PRINTMSG "From DETUNE-PORT-FROM-CR:
        "port" detuned
        from its
        clock-ring.")
        port]
F243. (DE PENDING-AGENTP (agent)
        ;/Returns T if agent is busy or the agent-Sfn is pending
        execution./;
        (OR (BUSYP agent) (EVAL (CDR (GET-AGENT-SFN agent))]
F244. (DE PENDING-PORTP (port)
        ;/Returns T if port is busy, or the agent tune to port is busy or
        port-Sfn is pending execution./;
        (OR    (BUSYP port) (PENDING-AGENTP
                (GET-AGENT port))
                (EVAL (CDR (GET-PORT-SFN port))]
F245. (DE INI-PORT-FNS (port)
        ;/Initializes <port>-Sfn and <port>-Cfn and installs them in the
        port property list. Returns port./;
        (PROG ((Fn (CONCAT port '-Sfn)))
              (PUTD Fn NIL)
              (PUT-PORT-SFN port (NCONS Fn))
```

```
            (PUTD (SETQ Fn (CONCAT port '-Cfn)) NIL)
            (PUT-AGENT-CFN port (NCONS Fn))
            port]
F246. (DE PENDINGP (Fn)
        ;/Returns T if function is in the pending list, i.e., has not yet
        been executed./;
        (EVAL (CONCAT Fn '-pending))]
F247. (DE DESTROY-ALL-TRIVIALS NIL
        ;/Destroys all trivial functions (ones that always return NIL)
        if they are not in any segments of pending lists of Appln./;
        (MAPC   (FUNCTION (LAMBDA (W) (OR (PENDINGP W)
                        (DESTROY W))))
                Trivial-functions)]
F248. (DE INI-FIRST-AGENT (agent cr)
        ;/Initializes the first agent of cr and returns agent. No port is
        tuned to the agent. All signal processing functions are NIL.
        Returns agent./;
            (PUT-TYPE-OF agent 'CR)
            (INI-AGENT-FNS agent)
            (PUT-STATE agent 'idle)
            (PUT-NEXT agent agent)
            (PUT-PREV agent agent)
            (PUT-WATCH-RINGS agent NIL)
            (PUT-#OF-PORTS agent 0)
            (PUT-SC agent (GET-SC cr))
            (SET agent cr)
            agent]
F249. (DE GEN-NAME (X processor)
        ;/Generates a name using X and the processor ID./;
        (GENSYM (CONCAT X '- (GET-N-PROESSOR processor) '-)]
F250. (DE DESTROY (X)
        ;/Destroys atom X: Destroys it's property list, makes it
        unbound, removes it from Name-hash-table, sets any function
        definition associated with it to NIL and removes it from OBLIST
        of LISP. Returns T./;
        (REMPROPLIST X)
        (MAKUNBOUND X)
        (PUTD X NIL)
        (REMHASH X Name-hash-table)
        (PRINTMSG "From DESTROY: "X" destroyed.")
        (REMOB X)
        T]
F251. (DE INI-PORT (port obj)
        ;/Initialized port by registering it in the Name-hash-table, and
        initializing its protocol functions, port-Sfn and port-Cfn.
        Declares special variables port-s-obj and obj-c-port, where obj
        is the port's parent object./;
        (OR   (AND port (GET-PORT-SFN port))
              (PROGN    (port-s-obj (CONCAT port '-s- obj))
                        (obj-c-port (CONCAT obj '-s- port)))
                        (EVAL (LIST 'DECLARE (LIST 'SPECIAL
                        port-s-obj
                                port obj-c-port)))
                        (AND obj (SET port Obj))
                        (PUTHASH port Name-hash-table)
                        (INI-PORT-FNS port)
                        (PUT-STATE port 'idle)
                        (PUT-N-PORT port port)]
F252. (DE INI-AGENT (agent ring)
        ;/Initializes the property list of agent, all agent protocol
        functions, declares special variables associated with agent,
        registers agent in the Name-hash-table and returns agent. Ring
        is a clock or watch ring to which agent has been attached./
        (OR (AND agent (GET-AGENT-SFN agent))
            (PROGN   (AND ring (SET agent ring))
                     (INI-AGENT-FNS Agent)
                     (PUT-STATE Agent 'idle)
                     (PUT-#OF-PORTS Agent 0)
                     (PUTHASH agent Name-hash-table)
                     (UNLOCK Agent)
                     (PUT-N-AGENT Agent Agent)]
F253. (DE INI-SEGMENTS (agent prev)
        ;/Initializes the segments of ports that are tuned to agent and
        its previous agent, prev, to NIL and returns NIL./;
        (MAPC    (FUNCTION (LAMBDA (W) (PUT-SEGMENT
                 (GET-PORT W)
                 NIL)))
                 (GET-WATCH-RINGS
                 agent))
        (MAPC    (FUNCTION (LAMBDA (W)
                 (PROG ((o-agent (LAST-O-MONITOR W)))
                    (COND    (o-agent (INI-SEGMENTS o-agent))
                             (T (PUT-SEGMENT (GET-PORT W)
                             NIL)))
                 (GET-WATCH-RINGS prev))]
F254. (DE LAST-O-MONITOR (wr (agent (GET-AGENT wr)))
        ;/Returns the o-monitor on the watch-ring wr which is just before
        the agent of the watch-ring./;
        (SOME   (FUNCTION (LAMBDA (W)
                (AND (EQ (GET-NEXT
                W) agent)
                        (SETQ wr W)))
                (GET-O-MONITORS wr))
        wr]
F255. (DE GET-CR-AGENT (agent)
        ;/If agent is CR agent, then returns it. If agent is a monitor
        agent, i.e., i-agent or o-agent, then returns the ancestor this
        monitor agent, that is a CR-agent./;
        (SELECTQ  (TYPEOF agent)
                  (CR agent)
                  ((IM OM) (GET-CR-AGENT (GET-AGENT (AND
                  (BOUNDP agent)
                              (EVAL agent)))))
                  NIL]
F256. (DE INI-OM-SEGMENTS (o-agent)
        ;/O-agent here is an OM agent. Resets to NIL the segment
        properties of ports affected as a result of a watch-ring attached
        to o-agent being removed. The action is the same if o-agent
        itself is removed./;
        (PROG ((prev (GET-PREV o-agent)))
           (COND   ((O-MONITORP prev) (INI-SEGMENT NIL prev))
                   (T    (PUT-SEGMENT prev NIL))]
F257. (DE INI-IM-SEGMENTS (i-agent prev)
        ;/Resets to NIL segments of ports affected by a change in pathway
        going out of i-agent. Action taken is the same if i-agent itself
        had been removed./;
        (SELECTQ (TYPE-OF prev)
            (IM (COND     ((EQ prev (GET-AGENT (EVAL i-agent))
                          (INI-IM-SEGMENT prev
                          (GET-PREV prev))
                          (T (INI-SEGMENTS NIL prev))))
            (OM (INI-OM-SEGMENTS prev))
            (CR (INI-SEGMENTS NIL (GET-PREV prev)))
            NIL]
F258. (DE INI-AGENT-SEGMENTS (agent (prev (GET-PREV agent))
        ;/Agent is being detached. Initializes the segments of all ports
        affected by this agent's detachment. Agent may be a
        CR, IM or OM agent./;
        (INI-SEGMENTS agent)
        (SELECTQ  (TYPE-OF agent)
                  (CR (INI-SEGMENTS NIL prev))
                  (IM (INI-IM-SEGMENTS agent prev))
                  (OM (INI-OM-SEGMENTS agent))
                  NIL]
F259. (DE INI-WR-SEGMENTS (wr)
        ;/Initializes all segments associated with all ports tuned to
        monitors on wr to NIL./;
        (MAPC   (FUNCTION (LAMBDA (W)
                (INI-IM-SEGMENTS W)))
                (GET-I-MONITORS wr))
        (MAPC   (FUNCTION (LAMBDA (W)
                (INI-OM-SEGMENTS W)))
                (GET-O-MONITORS wr))]
F260. (DE DETUNE-WR-MONITORS (wr)
        ;/Initializes to NIL all protocol functions of all monitors on
        the watch-ring wr. The watch-ring has just been detuned from
        agent. Undoes what INI-MONITOR-SNFS does. Returns T./;
        (MAPC   (FUNCTION (LAMBDA (W)
                (DETUNE-I-MONITORS W))
                (GET-I-MONITORS wr))
        (MAPC   (FUNCTION (LAMBDA (W)
                (DETUNE-O-MONITORS
                W))
                (GET-O-MONITORS wr))
        T]
F261. (DE DETUNE-I-MONITORS (i-agent)
        ;/Resets to NIL all the protocol functions of i-agent and all its
        descendants. I-agent has just been DETUNEd from cr. Returns
```

-continued

```
        T./;
        (INI-AGENT-FNS o-agent)
        (MAPC   (FUNCTION (LAMBDA (W)   (DETUNE-I-
                                         MONITORS W)
                                        (INI-PORT-FNS W)))
                (GET-WATCH-RINGS i-agent))
        T]
F262. (DE DETUNE-O-MONITORS (o-agent)
        ;/Resets to NIL all the protocol functions of o-agent and all its
        descendants. O-agent has just been DETUNEd from cr. Returns
        T./;
        (INI-AGENT-FNS o-agent)
        (MAPC   (FUNCTION (LAMBDA (W)   (DETUNE-O-
                                         MONITORS W)
                                        (INI-PORT-FNS W)))
                (GET-WATCH-RINGS o-agent))
        T]
F263. (DE TUNE-A-MONITORS (agent)
        ;/Tunes all monitors attached to all watch-rings of agent./;
        (MAPC   (FUNCTION (LAMBDA (W)
                            (TUNE-WR-MONITORS W)))
                (GET-WATCH-RINGS agent)]
F264. (DE DETUNE-A-MONITORS (agent)
        ;/DETUNEs all monitors attached to all watch-rings of agent./;
        (MAPC   (FUNCTION (LAMBDA (W) (DETUNE-WR-
                                       MONITORS W))
                (GET-WATCH-RINGS agent)]
F265. (DE REM-ALL-PORT-FNS (port)
        ;/Resets all port protocol functions to NIL and destroys all
        shared variables./;
        (REM-PORT-SFN port) (REM-PORT-CFN port)]
```

What is claimed is:

1. In a software for a parallel processing application, A, composed of software objects (programs) called cells, cells together constituting the program of parallel processing application, a method for using the new Technology for Integrated Computation and Communication (TICC) to specify and implement guaranteed asynchronous high-speed buffer-free parallel communications among cells, without assistance from an operating system, this being the primary characteristic of integration of computation and communication;

each cell being a program or a canonical representation of a program containing at least six ports, said cell being the parent-cell of said ports attached to the said cell, wherein cell-to-port attachments enabling said port and said cell to exchange data with each other and ports being themselves software objects;

cells running in parallel with each other on multiple processors with each cell running in its own assigned processor or some cells running concurrently in processors that they share with other cells, at least one of the processors being dedicated as communications processor, each communications processor being associated with one or more cells, being called client-cells of said communication processor and said communications processor being called communications-server of each said client-cell, no client-cell having more than one communications-server associated with it;

communications processors enabling cells to communicate with each other in parallel asynchronously, using their respective ports via specially established pathways that connect message sending ports to message receiving ports, each said pathway containing its own unique pathway-memory to hold a message that is being delivered, each pathway containing a finite number of agents to coordinate and synchronize message transfers and enforce security, pathways, agents and pathway-memories being themselves software objects defined by programs;

agents on said pathway being organized into a ring around pathway-memory of said pathway wherein each agent has a next agent, the next agent of the last agent being the first agent, this ring being referred to as agent-ring of said pathway;

models of TICC-sequential and TICC-parallel computations being such that no port would receive a second message while its parent cell was still working on the first received message so that no pathway-memory ever contains a buffer with message queue of more than one message, thus making it possible to have communications, free of buffers holding message queues, hereafter referred to as buffer-free communications;

message sending ports being connected to one of the agents on the agent-ring of pathway, said message-receiving ports being similarly connected to another agent on said agent-ring of said pathway, said another agent being next to the agent to which said message sending ports were connected, each message sending port sending a signal to the agent it is connected, after receiving a signal from its own parent-cell to send off a message in pathway-memory of said pathway to said message receiving ports, said agent then sending a signal to its next agent and said next agent then broadcasting signals to all ports in said message receiving port-group, each port in said message receiving port group then posting a new message receipt signal on its parent-cell, thus causing message in said pathway-memory to be delivered to parent-cells of ports in said message receiving ports;

protocols for cell to port, port to agent, agent to agent, agent to port and port to cell signal exchanges being executed by said communications processors, without assistance from said operating system, causing signals to travel along a pathway from said message sending ports to said message receiving ports and eventually establishing a context in which parent-cells of message receiving ports may receive and respond to messages in the pathway-memory of said pathway;

The method comprising the following steps:

dynamically allocating real memories to pathway-memories;

specifying port-groups containing ordered collections of one or more distinct ports such that no two ports in a port-group have the same parent-cell, the number of parent-cells of ports in a port-group being the same as the number of ports in that port-group, each port-group thus forming a corresponding cell-group consisting of ordered collection of parent-cells of ports in that port-group, said cell-group being always associated with said port-group;

dynamically establishing pathways between pairs of distinct port-groups, and for some other port-groups, if any, establishing a self-loop pathway from each of the said other port-group to itself, always making sure that each port in port-group is connected to only one pathway, said pathways and said port-groups together constituting the software network of parallel processing application;

cells exchanging messages and responding to received messages as they receive them, in parallel with each other in said multiple processors with designated communication processors, using pathways in the software network to exchange messages, the said program of application together with said software network constituting the application system;

dynamically modifying existing pathways in said software network of application A without service interruption and without loss of data flowing through pathways in the said software network of application A, while cells in said program of application A are running their respective programs in parallel;

in each pathway in the network of application A connecting a message sending port-group to a message receiving port-group, tuning each port in said message sending and message-receiving port-groups to its parent-cell, and tuning ports in said message sending and said message receiving port groups to agents they are respectively connected to, said tuning causing each (port, parent-cell) and (port, agent) pair on said pathway to always listen to each other every time they exchange signals, no parent-cell, port or agent wasting time waiting for synchronization in order to send signals, thus facilitating high-speed message delivery, and no parent-cell, port or agent ever missing to receive and respond correctly and promptly to received signals, thus guaranteeing message delivery across said pathway from said message sending ports to said message receiving ports;

specifying group-to-group parallel communications among port-groups of said software network of application A, through use of Causal Communication Language (CCL) statements, which may be freely intermixed with any conventional programming language statements used to define programs of cells, ports and agents, CCL statements appearing in program of cell specifying signal exchange between said cell and its ports, CCL statements appearing in program of port specifying signal exchange either between said port and its parent-cell or between said port and agent tuned to said port, CCL statements appearing in an agent specifying signal exchange either between said agent and port tuned to said agent or between said agent and its next agent;

building a CCL-sequence for each pathway in said software network and for each port connected to said pathway that may send messages via said pathway, being hereafter called a sending-port, each such CCL-sequence being a concatenation of CCL statements appearing in cells, ports and agents in said application system, whose execution would cause signals to be transmitted from the parent-cell of said sending-port to parent-cells of all ports in message receiving port-group connected to said pathway, CCL statements appearing in said CCL-sequence of said sending-port being in the following order: first CCL statement specifying signal to be sent by parent-cell of said sending-port to said sending-port itself, second CCL statement specifying signal to be sent from said sending-port to agent tuned to said sending-port, third CCL statement specifying signal to be sent from said agent to its next agent on the agent-ring of pathway connected to said sending-port, fourth CCL statement specifying signals to be broadcast from said next agent to all ports in the message receiving port-group of said pathway, and the last CCL statement specifying signals to be sent from each port in said message receiving port-group to its parent-cell, there being one such CCL-sequence for each sending-port in said software network, execution of protocols associated with all CCL-sequences of all sending-ports in a message sending port-group, in the order CCL statements appear in said CCL-sequences, causing message in pathway-memory of pathway connected to said message sending port-group to be delivered to all parent-cells of ports in the message receiving port-group of said pathway for each message sending-port in a message sending port-group presenting to communications-server of its parent-cell the CCL-sequence of said sending-port, when message in pathway-memory of pathway connected to said sending-port is ready to be sent, said communications-server executing CCL statements in each CCL-sequence presented to it, in the order CCL statements appear in said CCL-sequence, communications-server executing without fail every CCL-sequence presented to it in order they were presented, thus causing messages sent by every sending-port in every message sending port-group to be delivered to its corresponding message receiving port-group;

each parent-cell of each port in said message receiving port-group, when activated to run the program of said parent-cell in a processor of said multiprocessor system, polling ports of said parent-cell in a predetermined cyclic order one port at a time to check for presence of a new message delivered to said port, cyclic polling continuing until said parent-cell terminates its operations based on satisfaction of predefined conditions or based on receipt of an interrupt signal from another cell, for any port of said parent-cell polling said port being in one of two modes: responding immediately to delivered new message at the polled port and then proceeding to poll its next port, if new message is indeed present at the polled port at the time of polling said polled port, else proceeding immediately to poll the next port of said polled port, if no new message is present at the polled port at the time of polling said polled port, or waiting at said polled port for a new message to arrive, responding to said new message when it arrives and then polling the next port of said polled port;

parent-cell of each port in a message receiving port-group hereinafter called the receiving-port, responding to received new message at said receiving-port, only after all parent-cells of all ports in said message receiving port-group had completed all of their respective computations triggered by receipt of said new message and had written their respective response messages in the pathway-memory of pathway connected to said message receiving port-group, messages so written in said pathway-memory by all said parent-cells of ports in the said message receiving port-group being the joint-response-message, parent-cell of each said receiving-port then presenting CCL-sequence of said receiving-port to communications-server of said parent-cell, thereby causing said joint-response-message to be eventually delivered back to cells that sent said new message; and each pathway-memory supporting computations performed by parent-cells of ports tuned to said pathway-memory while parent-cells are responding either to message received from said pathway-memory, by providing execution environment for programs that respond to said received message, so that said message in said pathway-memory need not be copied in order for said parent-cells to respond to said message.

2. A method as recited in claim 1 further including the following steps for defining each port by:
- tuning each port to the pathway-memory of pathway connected to that port, with restriction that no two ports of a cell could be tuned to the same pathway-memory, to enable said port to give read/write access to said pathway-memory only to its parent-cell, there by protecting said pathway-memory;
- specifying pathway establishment security conditions for each port, said port being responsible to check satisfaction of specified pathway establishment security conditions before allowing a pathway to be established and connecting said port to that pathway;
- allowing said pathway to be established only if pathway connecting said port-group to another port-group does not violate specified pathway establishment security conditions, reporting in a predetermined manner attempts made to establish pathways that violated said specified pathway establishment security conditions; gathering and reporting data on their performance to a specialized System-Doctor-Cell running in its own dedicated processor, in parallel with cells, to facilitate dynamic monitoring of application system performance, reporting time-outs and poor performance, and thus providing infrastructure for implementing programs for self-diagnosis and self-repair; and
- activating its parent-cell on receipt of a new message, if said parent-cell had not been already activated, and thereafter each port to efficiently cause appropriate thread to be scheduled and executed without assistance from said operating system, based on said new message class, in order to correctly respond to said new message.

3. A method as recited in claims 1 or 2 further including following steps for defining each agent by:
- specifying for each connected (agent, port) pair message security conditions to be enforced by said (agent, port) pair, so that no message is delivered by said agent to said port unless specified message security conditions are satisfied;
- enforcing specified message security conditions by dynamically monitoring security status so that no port that is tuned to an agent receives message from any other port in violation of specified message security conditions, and maintaining and reporting appropriate records on all violations of specified message security conditions when they occur;
- tuning agents to ports in a message sending port-group connected to a pathway, to synchronize and coordinate messages sent out in parallel by parent-cells of ports in said sending port-group making sure no message would be sent out until parent-cells of all ports in said sending port-group had fully completed their respective computations and had fully written out their respective messages into said pathway-memory of pathway connected to said sending port-group, and delivering messages sent out by said parent-cells exactly once to each port in the receiving port-group connected to said pathway, even though each parent-cell of each port in said sending port-group sends messages in parallel, independent of each other; and
- tuning agents to ports in a message receiving port-group connected to a pathway, to synchronize and broadcast message in pathway-memory of said pathway to every port in said receiving port-group in each cycle of computation, said agent being responsible to protect and preserve data in pathway-memory of said pathway until parent-cells of all ports in said receiving port-group had fully received the delivered message and responded to that message.

4. Method as recited in claims 1, 2 or 3, further including the following steps:
- installing new cells with ports attached to them, hereinafter referred to as monitor cells, ports of monitor cells being referred to as monitor-ports, defining monitor-port-groups consisting of ordered collections of distinct monitor-ports of distinct monitor-cells, no monitor-port-group containing more than one monitor-port of any monitor-cell, installing pathways among selected pairs of monitor-port-groups, installing isolated new agents not connected to any pathway, said new agents being called monitor-agents, selecting monitor-port-groups not already connected to a pathway and connecting each selected monitor-port-group to an already installed monitor-agent, tuning said monitor-agent to monitor-ports in said monitor-port-group connected to said monitor-agent, the network consisting of monitor-cells together with all installed pathways and installed monitor-agents being the monitor-network;
- dynamically attaching monitor-agents in said monitor-network to selected points in pathways of said software network, the selected points being points next to an agent in an agent-ring of a pathway already in the software network or a point in the part of a pathway in the software network that connects an agent in said pathway to a port it is tuned to, or connecting directly and tuning a monitor-port not connected to any pathway or any monitor-agent in said monitor-network, to an agent in a pathway of software network, all of this being done without service interruption, the monitor-network thus installed on a software network becoming a part of said software network enlarging the said software network, each monitor-cell in said monitor-network operating in parallel with all other cells in said enlarged software network, each in its own designated processor of a multiprocessor;
- for each port in the software network that may send out a message, referred to as the sending-port, dynamically re-computing CCL-sequence of said sending-port as and when needed, to correctly route message that is being sent via pathway connected to said sending-port via monitor network that may be attached to pathway connected to said sending-port; and
- dynamically installing as many monitor-networks on a software network as necessary, as and when needed, allowing for the possibility of installing monitor-networks on other monitor-networks already installed on a software network.

5. A method as recited in claim 4 further including the following steps:
- dynamically installing monitor network on agents tuned to port-groups in a software network, in a manner such that computations performed by parent-cells of said port-groups tuned to said agents may be temporarily suspended and data associated with suspended parent-cells may be selectively examined for the purpose of debugging an application program;
- dynamically installing monitor network consisting of programs needed to reconfigure an application system according to specified reconfiguration criteria, without service interruption and without loss of any of the benefits already obtained from computations done up to the time of reconfiguration, if such reconfiguration was consistent with correct operation of application system; and dynamically installing monitor network needed to test new versions of cells in exactly the same context in which their older versions function, new versions receiving exactly the same input messages that their older versions receive in every cycle of computation, in parallel with said older versions, and replace said older versions with their corresponding said new versions, after testing has been successfully completed, all without service interruption, thus making possible dynamic evolution of application systems.

6. A method as recited in one of claims 1 through 5 above, implemented in hardware or software, including the following steps:

using agents, ports, or their equivalents, to compile CCL statements or their equivalents to sequences of protocols and presenting protocols to one or more dedicated communications processors, which execute presented protocols in parallel with computations performed by cells and cause messages to be delivered to their intended recipients via already established pathways in said software network;

specifying and enforcing pathway and message security conditions;

dynamic monitoring, debugging, reconfiguring and updating of an application system, consisting of cells that constitute the program of application and pathways that constitute the software network of application, in parallel with ongoing parallel computations being performed by cells in a multiprocessing computer with multiplicity of processors, using dynamically installed monitor-networks; and using ports, and System-Doctor-Cell running on a dedicated processor, to detect possible malfunctions, start automatic diagnosis, and repair procedures, if such procedures had been already designed and built into application system, or else report possible malfunctions in a predetermined manner.

* * * * *